(12) United States Patent
Yasumura

(10) Patent No.: US 7,339,801 B2
(45) Date of Patent: Mar. 4, 2008

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 13 days.

(21) Appl. No.: 11/398,359

(22) Filed: Apr. 5, 2006

(65) Prior Publication Data

US 2006/0227576 A1 Oct. 12, 2006

(30) Foreign Application Priority Data

| Apr. 8, 2005 | (JP) | ............................. 2005-111787 |
| Apr. 15, 2005 | (JP) | ............................. 2005-118167 |
| Apr. 28, 2005 | (JP) | ............................. 2005-133078 |

(51) Int. Cl.
*H02M 3/335* (2006.01)

(52) U.S. Cl. ........................ 363/21.02; 363/37; 363/40; 363/131

(58) Field of Classification Search ................. 363/16, 363/21.01, 21.02, 21.04, 21.1, 37, 40, 41, 363/97, 131
See application file for complete search history.

(56) References Cited

U.S. PATENT DOCUMENTS

| 4,128,868 | A | 12/1978 | Gamble |
| 5,274,543 | A | 12/1993 | Loftus, Jr. |
| 6,285,567 | B1 | 9/2001 | Kennedy |
| 6,310,792 | B1 | 10/2001 | Drobnik |
| 6,366,476 | B1 | 4/2002 | Yasumura et al. |
| 6,483,721 | B2 | 11/2002 | Terashi et al. |
| 6,515,875 | B2 | 2/2003 | Yasumura et al. |
| 6,583,999 | B1 | 6/2003 | Spindler et al. |
| 6,654,259 | B2 | 11/2003 | Koshita et al. |
| 6,687,137 | B1 | 2/2004 | Yasumura et al. |
| 6,831,846 | B2 | 12/2004 | Yasumura et al. |
| 6,930,893 | B2 | 8/2005 | Vinciarelli |
| 6,934,167 | B2 | 8/2005 | Jang et al. |
| 7,054,167 | B2 | 5/2006 | Yasumura et al. |
| 7,095,629 | B2 * | 8/2006 | Yasumura ..................... 363/16 |
| 7,167,384 | B2 * | 1/2007 | Yasumura ................ 363/21.02 |
| 7,209,369 | B1 * | 4/2007 | Yasumura ..................... 363/16 |

(Continued)

FOREIGN PATENT DOCUMENTS

JP 06-327246 A 11/1994

(Continued)

*Primary Examiner*—Jessica Han
(74) *Attorney, Agent, or Firm*—Lerner, David, Littenberg, Krumholz & Mentlik, LLP

(57) ABSTRACT

The present invention provides a voltage resonant converter that achieves ZVS over the entire allowable load range. A switching power supply circuit includes a class-E resonant converter as its primary-side switching converter that is supplied with a DC input voltage arising from the rectification and smoothing of a commercial AC voltage by a rectifier circuit (including a smoothing capacitor Ci). A choke coil of a primary-side series resonant circuit in the class-E switching converter is used as a primary winding N1 in an isolation converter transformer PIT. The total coupling coefficient between the primary side and secondary side is set to about 0.65 by the coupling coefficient of the isolation converter transformer PIT itself and equivalent parallel connection between a choke coil L10 and the primary winding N1. The resonant frequency fo1 of a primary-side parallel resonant circuit and the resonant frequency fo2 of the primary-side series resonant circuit are set to almost the same value of about 60 kHz.

5 Claims, 21 Drawing Sheets

U.S. PATENT DOCUMENTS 7,218,534 B2 *  5/2007  Yasumura ................ 363/21.02
7,242,595 B2 *  7/2007  Yasumura ................ 363/21.02

FOREIGN PATENT DOCUMENTS

| | | |
|---|---|---|
| JP | 2000-152617 A | 5/2000 |
| JP | 2000134925 A | 5/2000 |
| JP | 2003-235259 A | 8/2003 |
| JP | 2004-194105 A | 7/2004 |

* cited by examiner

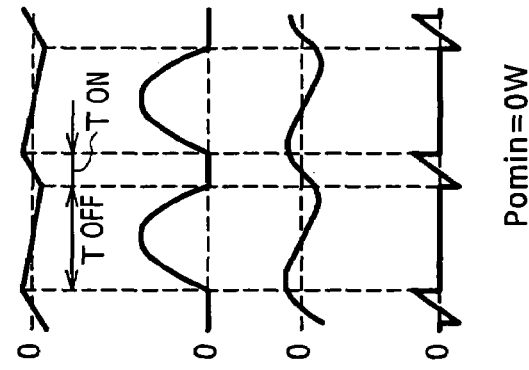
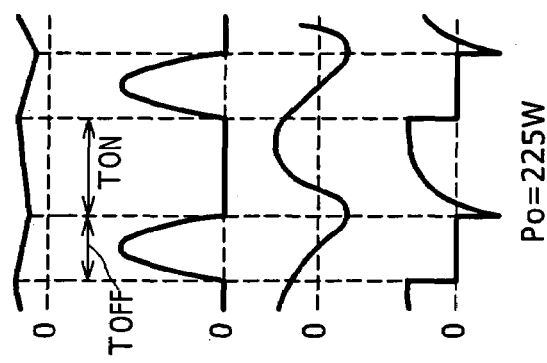
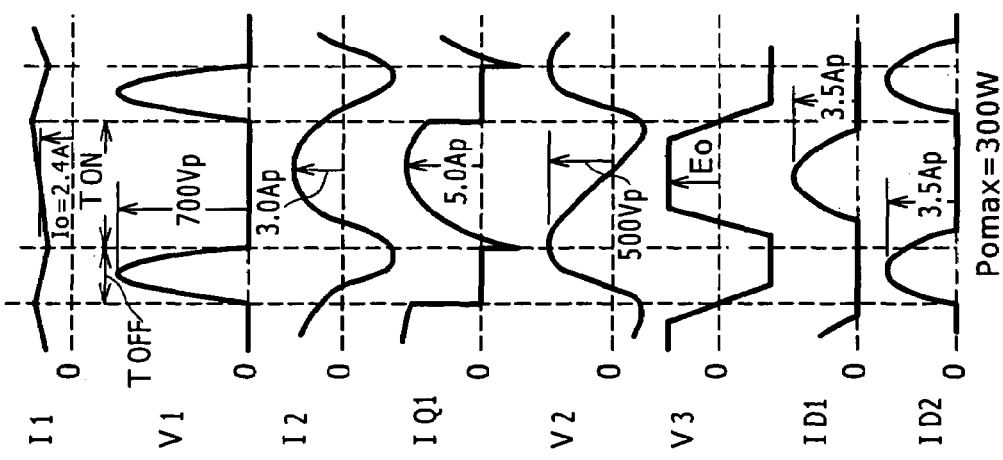

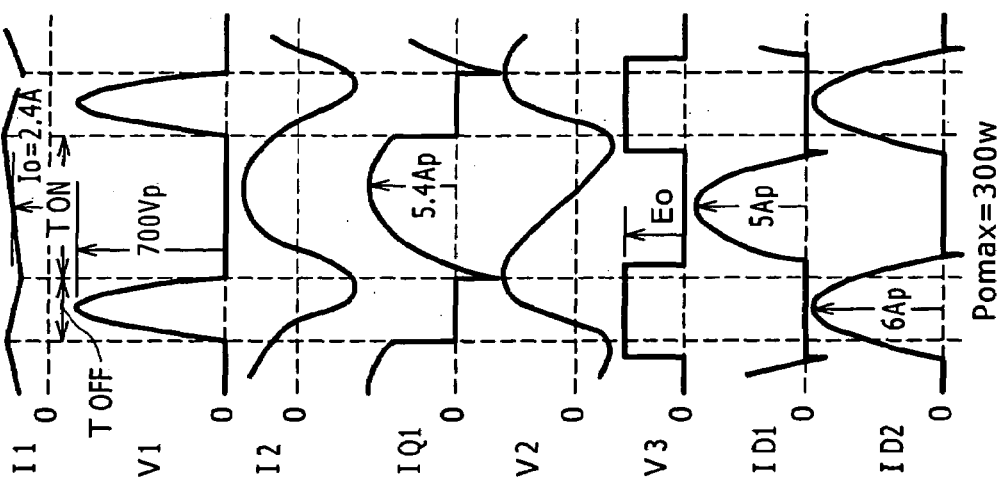
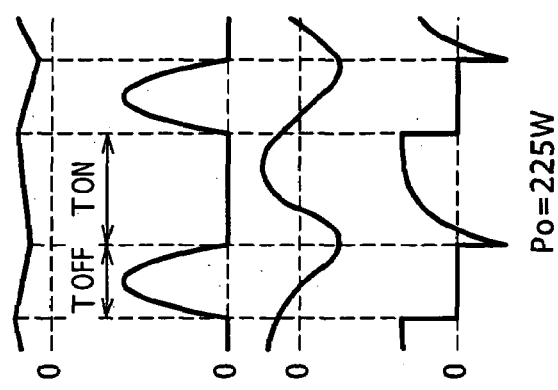
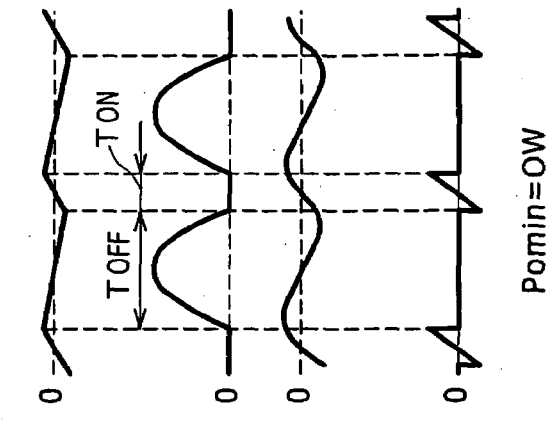

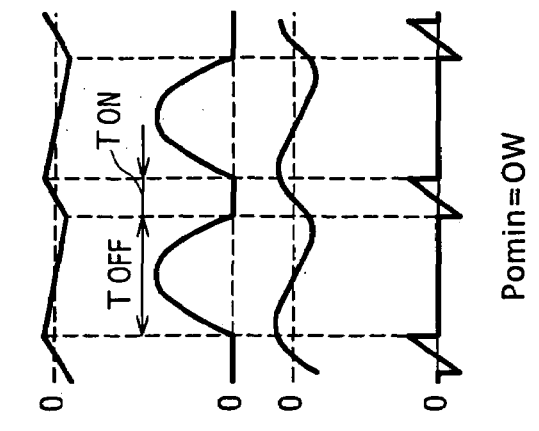
FIG. 8C  Pomin=0W
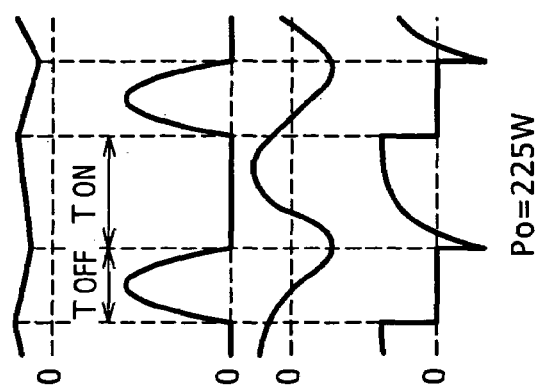
FIG. 8B  Po=225W
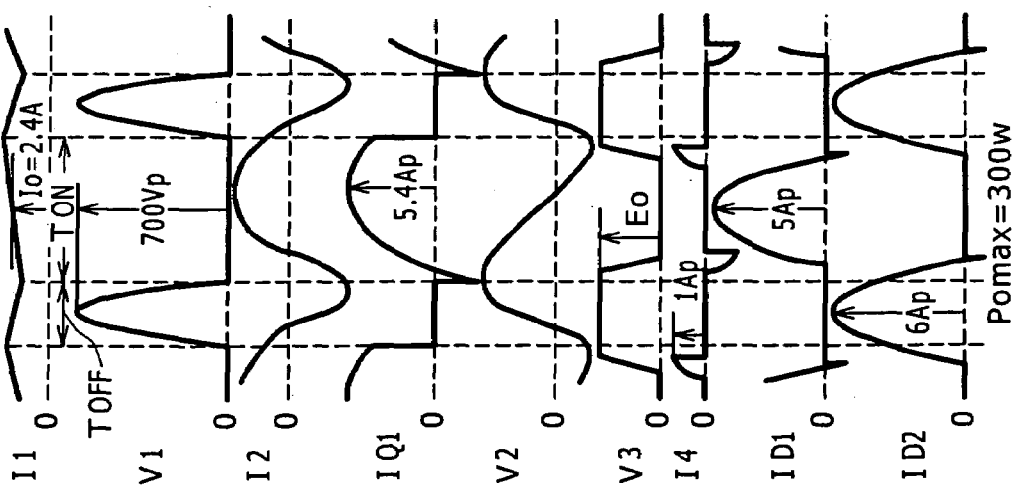
FIG. 8A  Pomax=300W (PRIOR ART)

(PRIOR ART)

SWITCHING POWER SUPPLY CIRCUIT

CROSS-REFERENCE TO RELATED APPLICATIONS

The present application claims priority from Japanese Patent Application No. JP 2005-111787, JP 2005-118167 and JP 2005-133078 filed with the Japanese Patent Office on Apr. 8, 2005, Apr. 15, 2005 and Apr. 28, 2005, respectively, the disclosure of which is hereby incorporated by reference herein.

BACKGROUND OF THE INVENTION

The present invention relates to a switching power supply circuit including a voltage resonant converter.

As types of a so-called soft switching power supply that employs a resonant converter, a current resonant type and a voltage resonant type have been widely known. Currently, half-bridge current resonant converters formed of a two-transistor switching element have been widely employed since they can easily be put into practical use.

However, since characteristics of high-breakdown-voltage switching elements are currently being improved for example, problems about breakdown voltage associated with putting voltage resonant converters into practical use are being cleared up. Furthermore, it is known that a single-ended voltage resonant converter formed of a one-transistor switching element is advantageous over a one-transistor current resonant forward converter with regard to input feedback noises and noise components of a DC output voltage line.

FIG. 19 illustrates one configuration example of a switching power supply circuit including a single-ended voltage resonant converter, disclosed in Japanese Patent Laid-Open No. 2000-134925.

In the switching power supply circuit of FIG. 19, a voltage from a commercial alternating-current power supply AC is rectified and smoothed by a rectifying and smoothing circuit formed of a bridge rectifier circuit Di and a smoothing capacitor Ci, to thereby generate a rectified and smoothed voltage Ei as the voltage across the smoothing capacitor Ci.

The lines from the commercial power supply AC are provided with a noise filter that includes a pair of common mode choke coils CMC and two across-line capacitors CL, and removes common mode noises.

The rectified and smoothed voltage Ei is input to the voltage resonant converter as a DC input voltage. The voltage resonant converter has a single-ended configuration including a one-transistor switching element Q1 as described above. The voltage resonant converter in this circuit is separately excited. Specifically, the switching element Q1 formed of a MOS-FET is switch-driven by an oscillation and drive circuit 2.

A body diode DD of the MOS-FET is connected in parallel to the switching element Q1. In addition, a primary-side parallel resonant capacitor Cr is connected in parallel to the channel between the drain and source of the switching element Q1.

The primary-side parallel resonant capacitor Cr and the leakage inductance L1 of a primary winding N1 in an isolation converter transformer PIT form a primary-side parallel resonant circuit (voltage resonant circuit). This primary-side parallel resonant circuit offers voltage resonant operation as the switching operation of the switching element Q1.

In order to switch-drive the switching element Q1, the oscillation and drive circuit 2 applies a gate voltage as a drive signal to the gate of the switching element Q1. Thus, the switching element Q1 implements switching operation with the switching frequency dependent upon the cycle of the drive signal.

The isolation converter transformer PIT transmits switching outputs from the switching element Q1 to the secondary side.

The isolation converter transformer PIT is constructed of an EE-shaped core that is formed by combining E-shaped cores composed of a ferrite material for example. Furthermore, the primary winding N1 and a secondary winding N2 are wound around the center magnetic leg of the EE-shaped core, with the winding part being divided into the primary side and secondary side.

In addition, a gap with a length of about 1.0 mm is provided in the center leg of the EE-shaped core in the isolation converter transformer PIT, so that a coupling coefficient k of about 0.80 to 0.85 is obtained between the primary side and the secondary side when the coupling coefficient k has such a value, the coupling degree between the primary and secondary sides may be regarded as loose coupling, and thus it is difficult to obtain the saturation state. The value of the coupling coefficient k is a factor in setting the leakage inductance (L1).

One end of the primary winding N1 in the isolation converter transformer PIT is interposed between the switching element Q1 and the positive electrode of the smoothing capacitor Ci. Thus, the transmission of switching outputs from the switching element Q1 is allowed. In the secondary winding N2 of the isolation converter transformer PIT, an alternating voltage induced by the primary winding N1 is generated.

On the secondary side, a secondary-side series resonant capacitor C2 is connected in series to one end of the secondary winding N2, and therefore the leakage inductance L2 of the secondary winding N2 and the capacitance of the secondary-side series resonant capacitor C2 form a secondary-side series resonant circuit (current resonant circuit).

Furthermore, connected to this secondary-side series resonant circuit are rectifier diodes Do1 and Do2 and a smoothing capacitor Co, to thereby form a voltage-doubler half-wave rectifier circuit. This voltage-doubler half-wave rectifier circuit generates, as the voltage across the smoothing capacitor Co, a secondary-side DC output voltage Eo with the level twice that of an alternating voltage V2 induced in the secondary winding N2. The secondary-side DC output voltage Eo is supplied to a load, and is input to a control circuit 1 as a detected voltage for constant-voltage control.

The control circuit 1 detects the level of the secondary-side DC output voltage Eo input as a detected voltage, and then inputs the obtained detection output to the oscillation and drive circuit 2.

According to the level of the secondary-side DC output voltage Eo indicated by the detection output, the oscillation and drive circuit 2 controls the switching operation of the switching element Q1 so that the secondary-side DC output voltage Eo is kept constant at a certain level. That is, the oscillation and drive circuit 2 generates and outputs a drive signal for achieving intended switching operation. Thus, stabilization control of the secondary-side DC output voltage Eo is achieved.

FIGS. 20A to 20C and 21 show results of experiments on the power supply circuit in FIG. 19. For the experiments, the power supply circuit of FIG. 19 was designed to include major parts with the following characteristics.

The core of the isolation converter transformer PIT employed an EER-35 core, and a gap in the center leg thereof was designed to have a gap length of 1 mm. The numbers of turns of the primary winding N1 and the secondary winding N2 were set to 39 T and 23 T, respectively. The induction voltage level per one turn (T) in the secondary winding N2 was set to 3 V/T. The coupling coefficient k of the isolation converter transformer PIT was set to 0.81.

The capacitance of the primary-side parallel resonant capacitor Cr was set to 3900 pF. The capacitance of the secondary-side series resonant capacitor C2 was set to 0.1 µF. Accordingly, the resonant frequency fo1 of the primary-side parallel resonant circuit was set to 230 kHz, and the resonant frequency fo2 of the secondary-side series resonant circuit was set to 82 kHz. Therefore, the relative relationship between the resonant frequencies fo1 and fo2 can be represented as fo1≈2.8×fo2.

The rated level of the secondary-side DC output voltage Eo was 135 V. The allowable load power range was from the maximum load power Pomax of 200 W to the minimum load power Pomin of 0 W.

FIGS. 20A to 20C are waveform diagrams showing the operation of the major parts in the power supply circuit in FIG. 19, with reflecting the corresponding switching cycle of the switching element Q1. FIG. 20A shows a voltage V1, a switching current IQ1, a primary winding current I1, a secondary winding current I2, and secondary-side rectified currents ID1 and ID2, when the load power is the maximum load power Pomax of 200 W. FIG. 20B shows the voltage V1, the switching current IQ1, the primary winding current I1, and the secondary winding current I2, when the load power is intermediate load power Po of 120 W. FIG. 20C shows the voltage V1 and the switching current IQ1 when the load power is the minimum load power Pomin of 0 W.

The voltage V1 is the voltage obtained across the switching element Q1, and has a waveform like those in FIGS. 20A to 20C. Specifically, the voltage level is at 0 level during the period TON when the switching element Q1 is in the on-state, while a sinusoidal resonant pulse is obtained during the period TOFF when it is in the off-state. This resonant pulse waveform of the voltage V1 indicates that the operation of the primary-side switching converter is voltage resonant operation.

The switching current IQ1 is the current flowing through the switching element Q1 (and the body diode DD). The switching current IQ1 flows with the illustrated waveforms during the period TON, while it is at 0 level during the period TOFF.

The primary winding current I1 flowing through the primary winding N1 is the current resulting from the synthesis between the current flowing as the switching current IQ1 during the period TON and the current flowing to the primary-side parallel resonant capacitor Cr during the period TOFF.

The rectified currents ID1 and ID2, illustrated only in FIG. 20A, flowing through the rectifier diodes Do1 and Do2 as the operation of the secondary-side rectifier circuit have sinusoidal waveforms like the illustrated ones. The waveform of the rectified current ID1 indicates the resonant operation of the secondary-side series resonant circuit more dominantly than the waveform of the rectified current ID2.

The secondary winding current I2 flowing through the secondary winding N2 has a waveform resulting from the synthesis between the waveforms of the rectified currents ID1 and ID2.

FIG. 21 shows, as functions of the load, the switching frequency fs, the lengths of ON and OFF periods TON and TOFF of the switching element Q1, and the AC to DC power conversion efficiency (ηAC→DC) of the power supply circuit shown in FIG. 19.

Referring initially to the AC to DC power conversion efficiency (ηAC→DC), it is apparent that high efficiencies of 90% or more are achieved for a wide range of the load power Po from 50 W to 200 W. The inventor of the present application has previously confirmed, based on experiments, that such a characteristic is obtained when a single-ended voltage resonant converter is combined with a secondary-side series resonant circuit.

In addition, the switching frequency fs, the period TON, and the period TOFF in FIG. 21 indicate the switching operation of the power supply circuit in FIG. 19 as the characteristic of constant-voltage control against load variation. In the power supply circuit, the switching frequency fs is almost constant against the load variation. In contrast, the periods TON and TOFF show linear changes having opposite tendencies as shown in FIG. 21. These characteristics show that the switching operation is controlled against the variation of the secondary-side DC output voltage Eo such that the time ratio between the ON and OFF periods is changed with the switching frequency (switching cycle) being kept almost constant. This control can be regarded as pulse width modulation (PWM) control, in which the lengths of the ON and OFF periods within one switching cycle are changed. This PWM control allows the power supply circuit in FIG. 19 to stabilize the secondary-side DC output voltage Eo.

FIG. 22 schematically shows the constant-voltage control characteristic of the power supply circuit shown in FIG. 19, based on the relationship between the switching frequency fs (kHz) and the secondary-side DC output voltage Eo.

The power supply circuit shown in FIG. 19 includes a primary-side parallel resonant circuit and a secondary-side series resonant circuit, and therefore has two resonant impedance characteristics in a complex manner: the resonant impedance characteristic corresponding to the resonant frequency fo1 of the primary-side parallel resonant circuit, and that corresponding to the resonant frequency fo2 of the secondary-side series resonant circuit. Since the power supply circuit in FIG. 19 has the frequency relationship fo1≈2.8×fo2, the secondary-side series resonant frequency fo2 is lower than the primary-side parallel resonant frequency fo1 also as shown in FIG. 22.

The characteristic curves in FIG. 22 show constant-voltage control characteristics in association with control of the switching frequency fs, assumed based on these resonant frequencies and under the condition of a certain constant AC input voltage VAC. Specifically, Characteristic curves A and B indicate the constant-voltage control characteristics obtained when the load power is the maximum load power Pomax and when it is the minimum load power Pomin, respectively, based on the resonant impedance corresponding to the resonant frequency fo1 of the primary-side parallel resonant circuit. Characteristic curves C and D indicate the constant-voltage control characteristics obtained when the load power is the maximum load power Pomax and when it is the minimum load power Pomin, respectively, based on the resonant impedance corresponding to the resonant frequency fo2 of the secondary-side series resonant circuit. When, under the characteristics in FIG. 22, constant-voltage control is intended so that the output voltage is kept at the voltage tg that is the rated level of the secondary-side DC output voltage Eo, the variation range of the switching frequency fs required for the constant-voltage control (requisite control range) can be expressed by the area indicated by Δfs.

The requisite control range Δfs shown in FIG. 22 is from the frequency offering the voltage level tg on Characteristic curve C, corresponding to the resonant frequency fo2 of the secondary-side series resonant circuit and the maximum load power Pomax, to that on Characteristic curve B, corresponding to the resonant frequency fo1 of the primary-side parallel resonant circuit and the minimum load power Pomin. The range Δfs includes the frequency offering the voltage level tg on Characteristic curve D, corresponding to the resonant frequency fo2 of the secondary-side series resonant circuit and the minimum load power Pomin, and that on Characteristic curve A, corresponding to the resonant frequency fo1 of the primary-side parallel resonant circuit and the maximum load power Pomax.

Therefore, as constant-voltage control operation, the power supply circuit in FIG. 19 implements switching drive control based on PWM control in which the time ratio of the periods TON/TOFF in one switching cycle is changed with the switching frequency fs being kept almost constant. The implementation of the PWM control is indicated also by FIGS. 20A to 20C, in which the widths of the periods TOFF and TON change depending on the load power while the length of one switching cycle (TOFF+TON) is almost constant when the maximum load power Pomax of 200 w, load power Po of 120 w and the minimum load power Pomin of 0 w.

Such operation is due to the resonant impedance characteristic of the power supply circuit against load variation. Specifically, carried out under the narrow switching frequency range (Δfs) is transition between the state where the resonant impedance corresponding to the resonant frequency fo1 of the primary-side parallel resonant circuit (capacitive impedance) is dominant, and the state where the resonant impedance corresponding to the resonant frequency fo2 of the secondary-side series resonant circuit (inductive impedance) is dominant.

The power supply circuit in FIG. 19 involves the following problems.

Referring to the aforedescribed waveform diagrams of FIGS. 20A to 20C, the switching current IQ1 when the load power is the maximum load power Pomax, shown in FIG. 20A, operates as follows. Specifically, the switching current IQ1 is at 0 level until the end of the period TOFF, which is the turn-on timing of the switching element Q1. When the period TON starts, initially a current of the negative polarity flows through the body diode DD, and then the polarity is inverted and the switching current IQ1 flows between the drain and source of the switching element Q1. This operation indicates the state where zero voltage switching. (ZVS) is adequately carried out.

In contrast, the switching current IQ1 when the load power is the intermediate load power Po of 120 W, shown in FIG. 20B, shows a waveform in which a noise current flows at timing immediately before the end of the period TOFF, which is the turn-on timing of the switching element Q1. This waveform indicates abnormal operation in which ZVS is not implemented adequately.

That is, it is known that a voltage resonant converter including a secondary-side series resonant circuit as shown in FIG. 19 involves abnormal operation in which ZVS is not implemented adequately when the load is an intermediate load. It has been confirmed that, in an actual power supply circuit of FIG. 19, such abnormal operation arises in the load variation range indicated by the area A in FIG. 21 for example.

A voltage resonant converter including a secondary-side series resonant circuit originally has a tendency to have a characteristic of keeping high efficiencies favorably against load variation as described above. However, as shown with the switching current IQ1 of FIG. 20B, a corresponding peak current flows at the turn-on timing of the switching element Q1. This noise current causes an increase of switching loss, which is a factor in a decrease of the power conversion efficiency.

In addition, the occurrence of such abnormal operation anyway yields an offset of the phase-gain characteristic of the constant-voltage control circuitry for example, which leads to switching operation in an abnormal oscillation state. Therefore, currently there is strong recognition of actual difficulty in putting the voltage resonant converter into practical use.

SUMMARY OF THE INVENTION

In consideration of the above-described problem, one embodiment of the present invention provides a switching power supply circuit having the following configuration.

Specifically, the switching power supply circuit includes a rectifying and smoothing circuit that includes at least a rectifier element and a smoothing capacitor, and is supplied with an alternating-current (AC) voltage and implements rectifying and smoothing operation for the AC voltage, to thereby generate a rectified and smoothed voltage as a voltage across the smoothing capacitor, a main switching element that is supplied with the rectified and smoothed voltage as a direct-current (DC) voltage and implements switching, and a switching drive unit that switch-drives the main switching element.

In addition, the switching power supply circuit also includes a first inductor that is provided in series to a path through which the rectified and smoothed voltage is supplied to the main switching element, and a primary-side parallel resonant capacitor that is connected in parallel to the main switching element so that at least an inductance of the first inductor and a capacitance of the primary-side parallel resonant capacitor form a primary-side parallel resonant circuit having a certain first resonant frequency.

Moreover, the switching power supply circuit further includes a second inductor, and a primary-side series resonant capacitor that is connected in series to the second inductor so that at least an inductance of the second inductor and a capacitance of the primary-side series resonant capacitor form a primary-side series resonant circuit having a certain second resonant frequency regarded as equivalent to the first resonant frequency, and a series circuit of the second inductor and the primary-side series resonant capacitor is connected in parallel to the main switching element.

Furthermore, the switching power supply circuit also includes a converter transformer around which the second inductor as a primary winding and a secondary winding are wound. An output switching obtained in the primary winding induces an alternating voltage in the secondary winding. The coupling coefficient of the converter transformer is set so that such a requisite total coupling coefficient between a primary side and a secondary side as to offer loose coupling therebetween is obtained.

In addition, the switching power supply circuit further includes a secondary-side DC output voltage generating unit that is supplied with the alternating voltage induced in the secondary winding of the converter transformer, and implements rectifying operation to thereby generate a secondary-side DC output voltage, and a constant-voltage control unit that implements constant-voltage control of the secondary-side DC output voltage by controlling the switching drive unit according to a level of the secondary-side DC output voltage and thereby varying a switching frequency of the main switching element.

The term coupling coefficient in the present specification indicates the degree of electromagnetic coupling. The coefficient of 1 corresponds to the highest coupling degree, while the coefficient of 0 corresponds to the lowest coupling degree (non-coupled state). Whilst the term coupling coefficient is typically used as a generic term irrespective of the configuration form, the degree of electromagnetic coupling between the entire primary side and the entire secondary side is referred to as a total coupling coefficient for differentiation from the coupling coefficient of a converter transformer itself. For example, when another inductance component is not added to a converter transformer, the coupling coefficient of the converter transformer itself is equal to the total coupling coefficient.

The power supply circuit with the above-described configuration has a circuit form as a class-E switching converter on the primary side. The class-E switching converter is one class of a soft switching converter referred to as a complex resonant converter that has a parallel resonant circuit (primary-side parallel resonant circuit) and a series resonant circuit (primary-side series resonant circuit). In embodiments of the present invention, the resonant frequencies of the primary-side parallel resonant circuit and primary-side series resonant circuit are set to be almost equal to each other. On that basis, the power supply circuit employs an inductor (second inductor) that forms the series resonant circuit (primary-side series resonant circuit) in the class-E switching converter as the primary winding of the converter transformer. The adoption of the class-E switching converter as the primary-side switching converter eliminates factors in failing to achieve zero voltage switching (ZVS) under the condition of an intermediate load. The factors include e.g. the interaction between the primary-side parallel resonant circuit and secondary-side series resonant circuit.

In such a configuration, the total coupling coefficient between the primary and secondary sides of the converter transformer is determined by the coupling coefficient of the converter transformer itself and the leakage inductance of the primary side arising from an equivalent parallel circuit between the first inductor and the primary winding (second inductor) of the converter transformer. In embodiments of the present invention, in terms of the fact that the total coupling coefficient is thus determined, the coupling coefficient of the converter transformer itself is set so that a requisite total coupling coefficient corresponding to loose coupling is obtained. This feature is also one factor in avoiding the state where ZVS operation is not achieved when the load is an intermediate load.

In embodiments of the present invention, the class-E switching converter on the primary side is supplied with a rectified and smoothed voltage and implements switching. The rectified and smoothed voltage is the voltage across the smoothing capacitor included in the rectifying and smoothing circuit for rectification and smoothing of AC voltages. The current flowing from the smoothing capacitor to the class-E switching converter is a DC current since it flows toward the switching element side via the first inductor that forms the primary-side parallel resonant circuit.

The power supply circuit of the above-described embodiment may further include an active clamp circuit that includes an auxiliary switching element and defines an ON period within a period during which the main switching element is in an off-state. The auxiliary switching element is in an on-state in the ON period. The active clamp circuit causes charging and discharging currents to flow through the auxiliary switching element during the ON period. The charging and discharging currents originally flow to and from the primary-side parallel resonant capacitor in the absence of the active clamp circuit.

If an active clamp circuit is thus further added so that charging/discharging currents, which originally flow to/from the primary-side parallel resonant capacitor in the absence of the active clamp circuit, flow through the auxiliary switching element, the peak level of a resonant voltage pulse that is the voltage across the primary-side parallel resonant capacitor is suppressed. Therefore, low-breakdown-voltage products can be selected for component elements such as the main switching element. Thus, the performances of the component elements can be improved, which allows enhancement of reliability of the power supply circuit, a cost reduction, and reduction of size and weight of a circuit.

Furthermore, the above-described advantages of eliminating abnormal operation associated with an intermediate load and suppressing the peak level of a voltage resonant pulse by use of the active clamp circuit contribute to the achievement of a power supply circuit compatible with a wider range of input voltage levels for example. Thus, a switching power supply circuit based on embodiments of the present invention is easily allowed to have a so-called wide-range compatible configuration that allows operation in response both to commercial AC voltage inputs of the AC 100 V-system and AC 200 V-system for example.

BRIEF DESCRIPTION OF THE DRAWINGS

FIGS. 3A to 3C are waveform diagrams showing the operation of major parts in the power supply circuit of the first embodiment, with reflecting the corresponding switching cycle;

FIGS. 6A to 6C are waveform diagrams showing the operation of major parts in the power supply circuit of the second embodiment, with reflecting the corresponding switching cycle;

FIGS. 8A to 8C are waveform diagrams showing the operation of major parts in the power supply circuit of the third embodiment, with reflecting the corresponding switching cycle;

DETAILED DESCRIPTION

Prior to description of best modes (embodiments, hereinafter) for carrying out the present invention, the basic configuration of a switching converter that implements class-E resonant switching operation (referred to also as a class-E switching converter, hereinafter) as a background art of the embodiments will be described below with reference to FIGS. 15 and 16.

Figure 15:
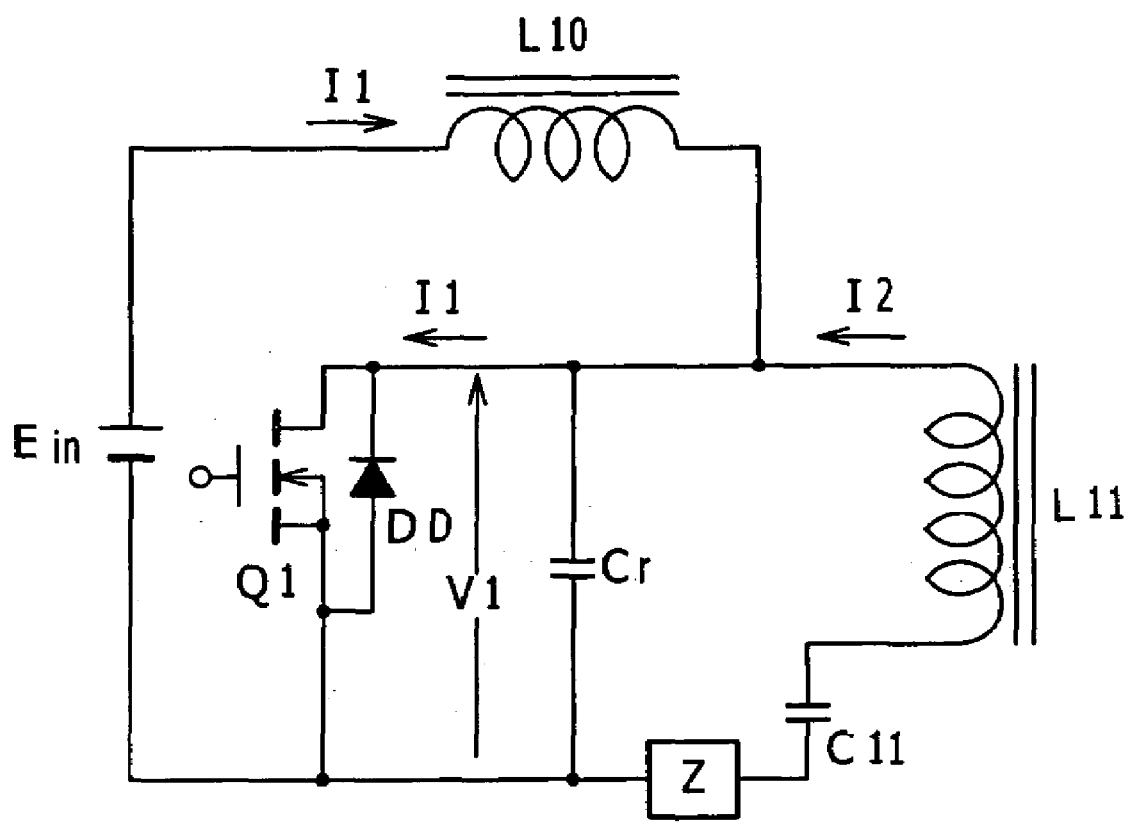
FIG. 15 is a circuit diagram showing a basic configuration example of a class-E switching converter.

FIG. 15 illustrates the basic configuration of a class-E switching converter. The class-E switching converter in this drawing has a configuration as a DC/AC inverter that operates in a class-E resonant mode.

This class-E switching converter includes a one-transistor switching element Q1. The switching element Q1 is a MOS-FET in this converter. A body diode DD is connected in parallel to the channel between the drain and source of the MOS-FET switching element Q1 so that the forward direction of the body diode DD is opposite to the direction from the drain to the source.

In addition, a parallel resonant capacitor Cr is connected in parallel to the channel between the drain and source of the switching element Q1.

The drain of the switching element Q1 is connected in series to a choke coil L10, and is coupled via the choke coil L10 to the positive electrode of a DC input power supply Ein. The source of the switching element Q1 is connected to the negative electrode of the DC input power supply Ein.

Connected to the drain of the switching element Q1 is one end of a choke coil L11. The other end of the choke coil L11 is connected in series to a series resonant capacitor C11. An impedance Z as a load is interposed between the series resonant capacitor C11 and the negative electrode of the DC input power supply Ein. Specific examples of the impedance Z include a piezoelectric transformer and a high-frequency-compatible fluorescent lamp.

The class-E switching converter with this configuration can be regarded as one form of a complex resonant converter that includes a parallel resonant circuit formed of the inductance of the choke coil L10 and the capacitance of the parallel resonant capacitor Cr, and a series resonant circuit formed of the inductance of the choke coil L11 and the capacitance of the series resonant capacitor C11.

Figure 16:
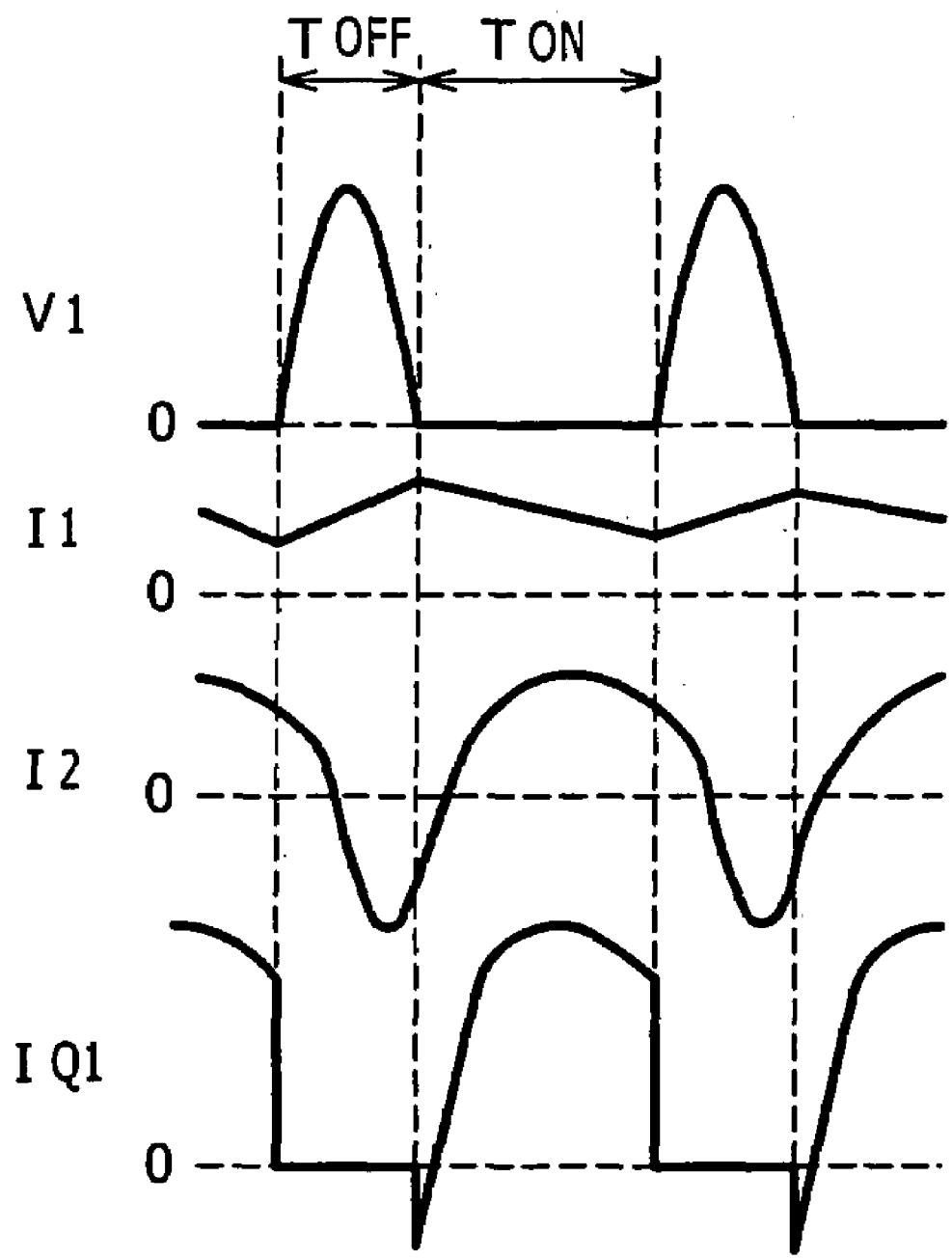
FIG. 16 is a waveform diagram showing the operation of the class-E switching converter in FIG. 15.

FIG. 16 shows the operation of major parts in the class-E switching converter shown in FIG. 15.

A switching voltage V1 is the voltage obtained across the switching element Q1, and has a waveform like that in FIG. 16. Specifically, the voltage level is at 0 level during the period TON when the switching element Q1 is in the on-state, while a sinusoidal pulse is obtained during the period TOFF when it is in the off-state. This switching pulse waveform is due to the resonant operation (voltage resonant operation) of the above-described parallel resonant circuit.

A switching current IQ1 is the current flowing through the switching element Q1 (and the body diode DD). During the period TOFF, the switching current IQ1 is at 0 level. During the period TON, the switching current IQ1 has a certain waveform like the illustrated one. Specifically, during a certain period from the start of the period TON, the switching current IQ1 initially flows through the body diode DD, and thus has the negative polarity. Subsequently, the switching current IQ1 is inverted to the positive polarity, and thus flows from the drain to the source of the switching element Q1.

A current I2 flowing through the series resonant circuit as an output of the class-E switching converter results from the synthesis between the switching current IQ1 flowing through the switching element Q1 (and the body diode DD) and the current flowing to the parallel resonant capacitor Cr, and has a waveform including sinusoidal wave components.

The waveforms of the switching current IQ1 and the switching voltage V1 indicate that ZVS operation is achieved at the turn-off timing of the switching element Q1, and ZVS and ZCS operations are achieved at the turn-on timing thereof.

A current I1 flowing from the positive electrode of the DC input power supply Ein through the choke coil L10 to the class-E switching converter has a ripple waveform with a certain average current level like the illustrated one, since the inductance of the choke coil L10 is set larger than that of the choke coil L11. This ripple current can be regarded as a DC current approximately.

First Embodiment

Figure 1:
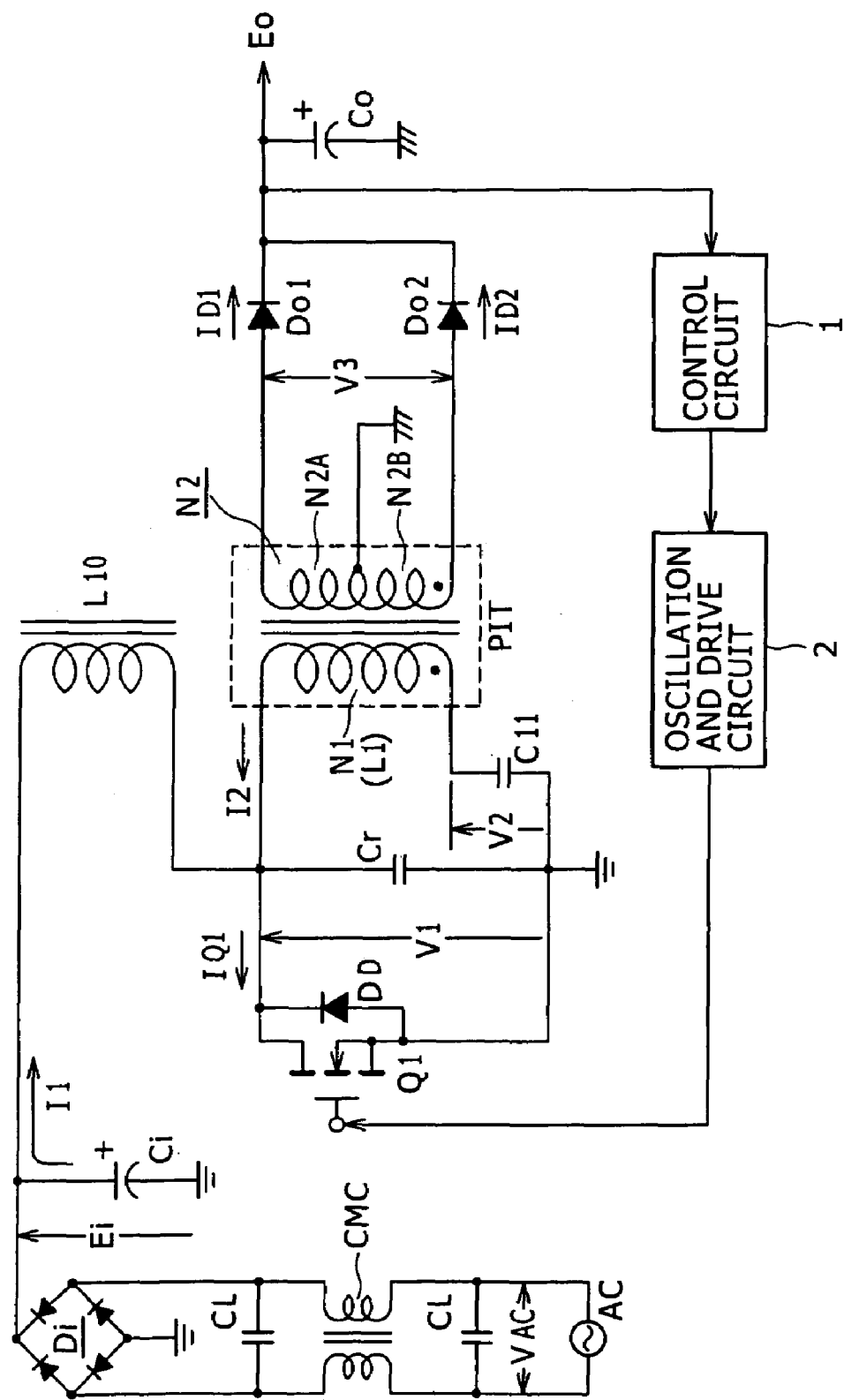
FIG. 1 is a circuit diagram illustrating a configuration example of a power supply circuit according to a first embodiment of the present invention.

In a first embodiment of the present invention, a class-E switching converter based on the above-described basic configuration is applied to a power supply circuit. FIG. 1 is a circuit diagram illustrating a configuration example of a power supply circuit of the first embodiment.

In the switching power supply circuit in FIG. 1, the lines from a commercial alternating-current power supply AC are provided with a pair of common mode choke coils CMC and two across-line capacitors CL. These common mode choke coils CMC and the across-line capacitors CL form a noise filter that removes common mode noises included in the lines from the commercial power supply AC.

A voltage from the commercial power supply AC (an AC input voltage VAC) is rectified by a bridge rectifier circuit Di, and the rectified output is charged in the smoothing capacitor Ci. That is, a voltage from the commercial power supply is rectified and smoothed by use of a rectifying and smoothing circuit formed of the bridge rectifier circuit Di and the smoothing capacitor Ci. Thus, a rectified and smoothed voltage Ei is obtained as the voltage across the smoothing capacitor Ci. The rectified and smoothed voltage Ei serves as a DC input voltage for the switching converter at the subsequent stage.

In the power supply circuit of FIG. 1, the switching converter that is fed with the rectified and smoothed voltage Ei as a DC input voltage and implements switching operation is formed as a class-E switching converter based on the above-described basic configuration of FIG. 15.

In the circuit, a high-breakdown-voltage MOS-FET is selected as a switching element Q1. In addition, the class-E switching converter in this circuit is separately excited. Specifically, an oscillation and drive circuit 2 switch-drives the switching element.

The drain of the switching element Q1 is connected in series to a choke coil L10, and is coupled via the choke coil L10 to the positive electrode of the smoothing capacitor Ci. Therefore, in this circuit, the DC input voltage (Ei) is supplied via the choke coil L10 to the switching element Q1. The source of the switching element Q1 is coupled to the primary-side ground.

Applied to the gate of the switching element Q1 is a switching drive signal (voltage) output from the oscillation and drive circuit 2.

Since a MOS-FET is used as the switching element Q1, the switching element Q1 incorporates a body diode DD so that the body diode DD is connected in parallel to the channel between the source and drain of the switching element Q1. The anode of the body diode DD is connected to the source of the switching element Q1, and the cathode thereof is connected to the drain of the switching element Q1. The body diode DD forms the path of a switching current in the reverse direction, arising due to the ON/OFF operation (switching operation) of the switching element Q1.

In addition, a primary-side parallel resonant capacitor Cr is connected in parallel to the channel between the drain and source of the switching element Q1.

The capacitance of the primary-side parallel resonant capacitor Cr and the leakage inductance L1 of a primary winding N1 in an isolation converter transformer PIT form a primary-side parallel resonant circuit (voltage resonant circuit) for a switching current flowing through the switching element Q1. The resonant operation of this primary-side parallel resonant circuit offers voltage resonant operation as one switching operation of the switching element Q1. In response to this operation, during the OFF period of the switching element Q1, a sinusoidal resonant pulse is obtained as a voltage V1 across the switching element Q1 (voltage between the drain and source).

In addition, connected in parallel to the channel between the drain and source of the switching element Q1 is a series circuit formed of the primary winding N1 in the isolation converter transformer PIT to be described later and a primary-side series resonant capacitor C11. The winding-finish end of the primary winding N1 is connected to the drain of the switching element Q1, while the winding-start end thereof is connected to the primary-side series resonant capacitor C11. The other electrode of the primary-side series resonant capacitor C11, not coupled to the primary winding N1, is connected to the source of the switching element Q1 at the primary-side ground potential.

In order to drive the switching element Q1 by separate excitation for example, the oscillation and drive circuit 2 includes an oscillation circuit that generates an oscillation signal. Based on the oscillation signal, the oscillation and drive circuit 2 generates a drive signal that is a gate voltage for switch-driving the MOS-FET, and applies it to the gate of the switching element Q1. Thus, the switching element Q1 continuously implements ON/OFF operation according to the waveform of the drive signal. That is, the switching element Q1 implements switching operation.

The isolation converter transformer PIT transmits switching outputs from the primary-side switching converter to the secondary side, with isolating the primary side from the secondary side in terms of DC transmission therebetween.

Figure 2:
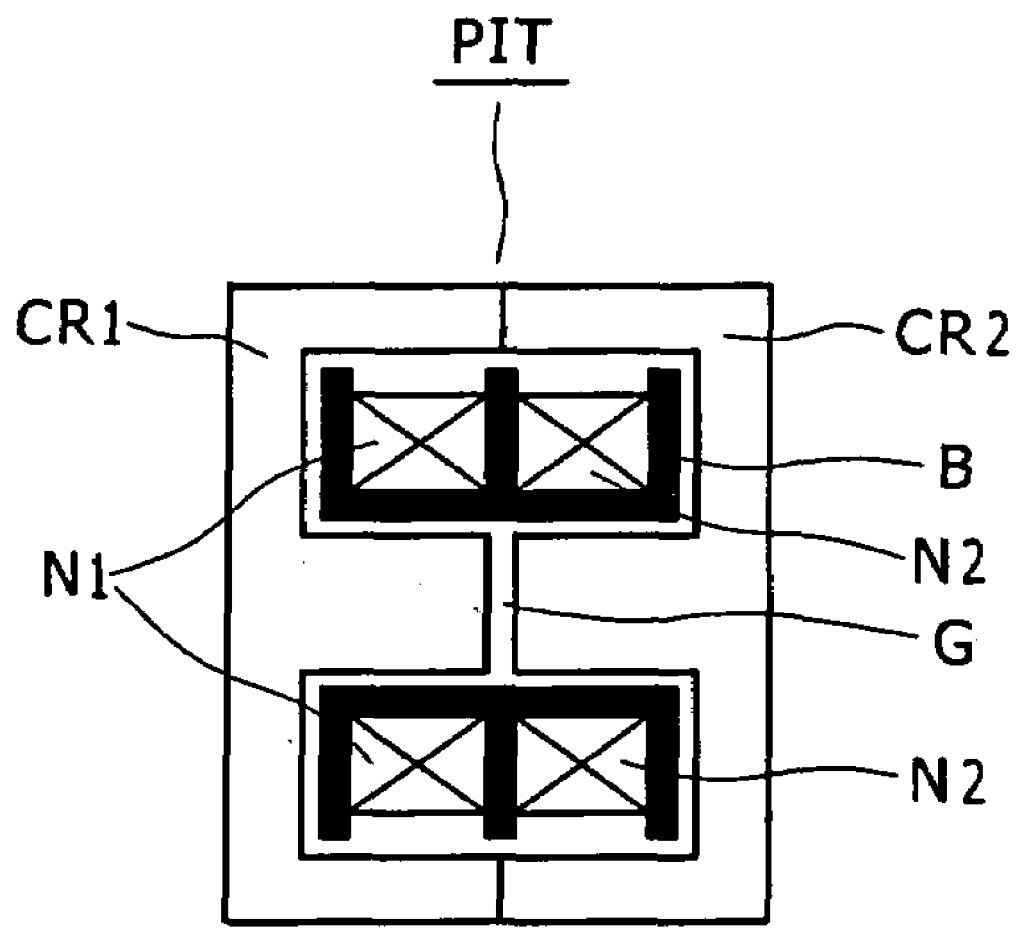
FIG. 2 is a diagram illustrating a configuration example of an isolation converter transformer included in a power supply circuit of one embodiment of the invention.

FIG. 2 is a sectional view illustrating a configuration example of the isolation converter transformer PIT included in the power supply circuit of FIG. 1.

As shown in FIG. 2, the isolation converter transformer PIT includes an EE-shaped core formed by combining E-shaped cores CR1 and CR2 made of a ferrite material in such a manner that their magnetic legs face each other.

Furthermore, a bobbin B is provided that is formed of resin or the like and has such a divided shape that winding parts on the primary side and secondary side are independent of each other. The primary winding N1 is wound around one winding part of the bobbin B. The secondary winding N2 is wound around the other winding part. In the present embodiment, two secondary windings N2A and N2B are wound as the winding on the secondary side as described later. When there is no specific differentiation between these secondary windings N2A and N2B, and thus they are treated as one winding collectively, these windings are referred to simply as the secondary winding N2 in some cases.

The bobbin B around which the primary-side and secondary-side windings have been thus wound is fitted to the EE-shaped core (CR1, CR2), which results in the state in which the primary-side and secondary-side windings in the different winding regions are wound around the center leg of the EE-shaped core. In this manner, the entire structure of the isolation converter transformer PIT is completed.

In the center leg of the EE-shaped core, a gap G having a gap length of about 2 mm or more is formed as shown in the drawing. Thus, a loose coupling state is obtained in which the coupling coefficient k is about 0.8 or less for example. That is, the degree of loose coupling is further increased in the isolation converter transformer PIT in FIG. 1, compared with that in the power supply circuit shown in FIG. 19 as a conventional technique. The gap G can be formed by setting the center legs of the E-shaped cores CR1 and CR2 to be shorter than two outer legs thereof.

The primary winding N1 in the isolation converter transformer PIT is an element for forming the primary-side series resonant circuit in the class-E switching converter formed on the primary side, as described later. An alternating output dependent upon the switching output of the switching element Q1 is generated in the primary winding N1.

On the secondary side of the isolation converter transformer PIT, an alternating voltage induced by the primary winding N1 is generated in the secondary winding N2. The secondary winding N2 is provided with a center tap, and thus the secondary winding N2 is divided into secondary winding portions N2A and N2B on either side of the center tap. The center tap is coupled to the secondary-side ground.

In addition, the secondary side includes two rectifier diodes Do1 and Do2 and one smoothing capacitor Co as components forming a secondary-side rectifier circuit. The anode of the rectifier diode Do1 is connected to the end of the secondary winding portion N2A, and the anode of the rectifier diode Do2 is connected to the end of the secondary winding portion N2B. Both the cathodes of the rectifier diodes Do1 and Do2 are connected to the positive electrode of the smoothing capacitor Co. The negative electrode of the smoothing capacitor Co is coupled via the secondary-side ground to the center tap of the secondary winding N2. This connecting structure leads to the formation of a full-wave center-tap rectifier circuit as the secondary-side rectifier circuit.

In the thus formed secondary-side full-wave rectifier circuit, in the periods of half cycles of one polarity of a secondary winding voltage V3 induced in the secondary winding N2, a rectified current ID1 flows through the secondary winding portion N2A, the rectifier diode Do1, and the smoothing capacitor Co in that order, to thereby charge the smoothing capacitor Co. In the periods of half cycles of the other polarity of the secondary winding voltage V3, a rectified current ID2 flows through the secondary winding portion N2B, the rectifier diode Do2, and the smoothing capacitor Co in that order, to thereby charge the smoothing capacitor Co. In this manner, full-wave rectifying operation is carried out in which a rectified current is charged in the smoothing capacitor Co in the periods of half cycles of both the positive and negative polarities of the secondary winding voltage V3. Thus, as the voltage across the smoothing capacitor Co, a secondary-side DC output voltage Eo having the level equal to that of the voltage induced in the secondary winding N2 is obtained. The secondary-side DC output voltage Eo is supplied to a load as power. In addition, the voltage Eo is branched and output to a control circuit 1 as a detected voltage.

The control circuit 1 supplies to the oscillation and drive circuit 2 a detection output dependent upon a level change of the input secondary-side DC output voltage Eo. The oscillation and drive circuit 2 drives the switching element Q1 with mainly varying the switching frequency according to the detection output input from the control circuit 1.

This variation control of switching frequency of the switching element Q1 leads to changes of resonant impedances of the primary and secondary sides of the power supply circuit. These impedance changes result in a change of the amount of power transmitted from the primary winding N1 to the secondary winding N2 in the isolation converter transformer PIT, and in a change of the amount of power to be supplied from the secondary-side rectifier circuit to a load. Thus, the level of the secondary-side DC output voltage Eo is controlled so that the level variation thereof is cancelled. That is, stabilization of the secondary-side DC output voltage Eo is allowed.

When the switching converter (Q1, Cr, L10, N1 and C11) formed on the primary side of the thus formed power supply circuit of the first embodiment is compared with the aforedescribed class-E converter shown in FIG. 15, the switching converter of the first embodiment can be regarded as circuitry obtained by removing the impedance Z as a load from the circuit of FIG. 15, and replacing the choke coil L11 of the circuit of FIG. 15 by the primary winding N1 (leakage inductance L1) of the isolation converter transformer PIT. Furthermore, also as described above, in the primary-side switching converter of the first embodiment, a primary-side parallel resonant circuit is formed of the inductance of the choke coil L10 and the capacitance of the primary-side parallel resonant capacitor Cr, and a primary-side series resonant circuit is formed of the leakage inductance of the primary winding N1 in the isolation converter transformer PIT and the primary-side series resonant capacitor C11.

Thus, the primary-side switching converter of the first embodiment is formed as a class-E switching converter that implements class-E resonant switching operation. Switching outputs (alternating outputs) arising from the switching operation of the primary-side switching converter are transmitted from the primary winding N1 equivalent to the choke coil L11 to the secondary winding N2 via magnetic coupling in the isolation converter transformer PIT. The transmitted outputs are then rectified on the secondary side, so that the DC output voltage Eo is obtained.

In addition, the class-E switching converter of the first embodiment can be regarded also as a complex resonant converter, i.e., a soft switching power supply in which a series circuit of the primary winding N1 and the primary-side series resonant capacitor C11, which form the primary-side series resonant circuit, is connected in parallel to the switching element Q1 (and the body diode DD), which forms a voltage resonant converter in combination with the choke coil L10 and the primary-side parallel resonant capacitor Cr.

Furthermore, in the first embodiment, the primary-side series resonant capacitor C11 is connected in series to the primary winding N1 of the isolation converter transformer PIT. Since the primary-side series resonant capacitor C11 inhibits the flow of a DC current, the secondary-side full-wave rectifier circuit can adequately implement the rectifying operation of applying the secondary-side rectified currents ID1 and ID2 to the smoothing capacitor Co in a state where the occurrence of bias magnetization is prevented.

The characteristics of major parts in the power supply circuit of the first embodiment shown in FIG. 1 are as follows for example.

The core of the isolation converter transformer PIT employs an EER-35 core, and a gap G is designed to have a gap length of 1.6 mm. The numbers of turns of the primary winding N1, the secondary winding portion N2A and the secondary winding portion N2B are set to 59 T, 30 T and 20 T, respectively. Thus, the coupling coefficient k of the isolation converter transformer PIT is set to 0.75.

As is well known, the above-described EER core is one of types and standards of product cores. It is known that the types also include an EE type. The sectional shapes of cores of the EER and EE types are both an EE-character shape. Therefore, the term EE-shaped core in the present specification encompasses both cores of the EER and EE types.

For the choke coil L10, an EER-28 core is selected, and the gap between the center magnetic legs is designed to have a length of 1.2 mm. The inductance (leakage inductance) thereof is set to 1.05 mH.

The capacitance of the primary-side parallel resonant capacitor Cr is set to 6800 pF. According to the capacitance of the primary-side parallel resonant capacitor Cr and the inductance of the choke coil L10, the resonant frequency fo1 of the primary-side parallel resonant circuit is 59.6 kHz.

The capacitance of the primary-side series resonant capacitor C11 is set to 0.015 μF. According to this capacitance and the leakage inductance of the primary side according to the total coupling coefficient kt of the isolation converter transformer PIT, to be described below, the resonant frequency fo2 of the primary-side series resonant circuit is 60.3 kHz. The resonant frequencies fo1 and fo2 can be regarded as almost equal.

The allowable load power range of the power supply circuit is from the maximum load power Pomax of 300 W to the minimum load power Pomin of 0 W (no load). The rated level of the secondary-side DC output voltage Eo is 175 V.

In terms of the switching cycle, the primary winding N1 of the isolation converter transformer PIT and the choke coil L10 in the power supply circuit in FIG. 1 can be equivalently regarded as being connected in parallel to each other. In this case, magnetic flux generated from the choke coil L10 is not coupled to the secondary winding N2 of the isolation converter transformer PIT. Accordingly, it could be deemed that the leakage inductance component on the primary side of the isolation converter transformer PIT is increased.

As described above, the coupling coefficient k of the isolation converter transformer PIT itself is set to about 0.75. However, since the leakage inductance on the primary side of the isolation converter transformer PIT is increased, the comprehensive coupling coefficient of the isolation converter transformer PIT in the power supply circuit is lower than 0.75. That is, the comprehensive coupling coefficient between the primary and secondary sides of the isolation converter transformer PIT, in terms of the whole power supply circuit, is set lower than the coupling coefficient k determined by the structure of the isolation converter transformer PIT itself. This comprehensive coupling coefficient is treated as the total coupling coefficient kt here.

In the first embodiment, by setting the inductance of the choke coil L10 to the above-described predetermined value for example, the total coupling coefficient kt is set to about 0.7 or less value offering a higher degree of loose coupling, specifically set to 0.65. The determinants of the total coupling coefficient kt are the coupling coefficient k dependent upon the structure of the isolation converter transformer PIT itself and the inductance of the choke coil L10. Also as described above, the resonant frequency of the primary-side series resonant circuit, formed by the series connection of the primary winding N1 to the primary-side series resonant capacitor C11, is determined by the leakage inductance of the primary side according to the total coupling coefficient kt and the capacitance of the primary-side series resonant capacitor C11.

FIGS. 3A to 3C are waveform diagrams showing the operation of the major parts in the power supply circuit in FIG. 1, with reflecting the corresponding switching cycle of the switching element Q1. FIG. 3A shows an input current I1, a switching voltage V1, a primary winding current I2, a switching current IQ1, a series resonant voltage V2, a secondary winding voltage V3, and secondary-side rectified currents ID1 and ID2, when the load power is the maximum load power Pomax of 300 W. FIG. 3B shows the input current I1, the switching voltage V1, the primary winding current I2, and the switching current IQ1, when the load power is intermediate load power Po of 225 W. FIG. 3C shows the input current I1, the switching voltage V1, the primary winding current I2, and the switching current IQ1, when the load power is the minimum load power Pomin of 0 W. An AC input voltage VAC is 100 V.

The basic operation of the power supply circuit in FIG. 1 will be described below with reference to the waveform diagrams of FIG. 3A, corresponding to the maximum load power Pomax of 300 W.

The input current I1 is the current that flows from the smoothing capacitor Ci to the primary-side switching converter. In the line between the positive electrode of the smoothing capacitor Ci and the drain of the switching element Q1, i.e., in the flow path of the input current I1 to the switching element Q1, the choke coil L10 having an inductance larger than the leakage inductance L1 of the primary winding N1 is provided. Therefore, the input current I1 flows via the choke coil L10. Thus, the input current I1 becomes a ripple current with an average current value of Io. This input current I1 having such a waveform can be regarded as a DC current. That is, in the first embodiment, the current flowing from the smoothing capacitor Ci to the switching converter is a DC current. The input current I1 through the choke coil L10 flows in a manner of being divided into three components: the series circuit of the primary winding N1 and the primary-side series resonant capacitor C11, the switching element Q1 (and the body diode DD), and the primary-side parallel resonant capacitor Cr.

The switching element Q1 is provided with the voltage across the smoothing capacitor Ci (Ei) as a DC input voltage, and implements switching operation. The switching voltage V1 is the voltage between the drain and source of the switching element Q1. The switching current IQ1 is the current flowing through the switching element Q1 (and the body diode DD) from the drain side thereof. The switching voltage V1 and the switching current IQ1 indicate the ON/OFF timings of the switching element Q1. One switching cycle is divided into the period TON during which the switching element Q1 should be in the on-state, and the period TOFF during which it should be in the off-state. The switching voltage V1 has a waveform in which the voltage is at 0 level during the period TON and is a resonant pulse during the period TOFF. This resonant pulse of the switching voltage V1 is obtained as a pulse having a sinusoidal resonant waveform due to the resonant operation of the primary-side parallel resonant circuit.

The switching current IQ1 is at 0 level during the period TOFF. When the period TOFF ends and the period TON starts, i.e., at the turn-on timing of the switching element Q1, initially the switching current IQ1 flows through the body diode DD and therefore has the negative polarity waveform. Subsequently, the flow direction is inverted so that the switching current IQ1 flows from the drain to the source, and therefore the switching current IQ1 has the positive polarity waveform.

The primary winding current I2 is the current that flows through the primary winding N1 in response to the switching operation of the switching element Q1. According to the polarities thereof shown in FIGS. 3A to 3C, the primary winding current I2 can be regarded as the current resulting from the synthesis between the switching current IQ1 and the current flowing to the primary-side parallel resonant capacitor Cr. The primary winding current I2 can be regarded as the output current from the primary-side series resonant circuit. Specifically, due to the ON/OFF operations of the switching element Q1, a voltage resonant pulse, which is the switching voltage V1 in the period TOFF, is applied to the series circuit of the primary winding N1 and the primary-side series resonant capacitor C11, which form the primary-side series resonant circuit. Thus, the primary-side series resonant circuit implements resonant operation, which causes the primary winding current I2 to have a sinusoidal alternating waveform dependent upon the switching cycle. The series resonant voltage V2 is the voltage across the primary-side series resonant capacitor C11. This series resonant voltage V2 also has a sinusoidal alternating waveform dependent upon the switching cycle as shown in FIG. 3A.

When the period TON ends and the period TOFF starts, i.e., at the turn-off timing of the switching element Q1, the operation in which the positive primary winding current I2 flows to charge the primary-side parallel resonant capacitor Cr is initialized. In response to this operation, the switching voltage V1 starts to rise from 0 level in a manner of tracing a sinusoidal waveform, i.e., a voltage resonant pulse rises up. When the primary winding current I2 turns to the negative polarity, the state of the primary-side parallel resonant capacitor Cr changes from the charging state to the discharging state, which causes the voltage resonant pulse to fall down from its peak level in a manner of tracing the sinusoidal waveform.

Subsequently, when the voltage resonant pulse as the switching voltage V1 falls down to 0 level, initially the body diode DD conducts and thus the negative primary winding current I2 flows therethrough. At this time, the switching voltage V1 is at 0 level. After the primary winding current I2 flows through the body diode DD during a certain period, the switching element Q1 is turned on and thus the positive primary winding current I2 flows therethrough. Since the primary winding current I2 flows through the switching element Q1 (and the body diode DD) during the period TON in this manner, the switching current IQ1 has a waveform like the illustrated one. The above-described operation indicates that, at the turn-on and turn-off timings of the switching element Q1, ZVS operation due to the primary-side parallel resonant circuit and ZCS operation due to the primary-side series resonant circuit are achieved.

The secondary winding voltage V3 and the secondary-side rectified currents ID1 and ID2 indicate the operation of the secondary-side rectifier circuit.

Due to the secondary winding voltage V3, which is the alternating voltage induced in the secondary winding N2, the rectifier diodes Do1 and Do2 in turn conduct in the periods of the corresponding half cycles of the secondary winding voltage V3 like the above description. Thus, the secondary winding voltage V3 has an alternating waveform in which the voltage is clamped at the level having an absolute value equal to the secondary-side DC output voltage Eo, in the respective conducting periods of the rectifier diodes Do1 and Do2.

As shown in FIG. 3A, the secondary-side rectified currents ID1 and ID2 in turn flow to the smoothing capacitor Co with sinusoidal half waveforms. The secondary winding current flowing through the secondary winding N2 has a waveform resulting from the synthesis between the waveforms of the secondary-side rectified currents ID1 and ID2. The secondary-side rectified currents ID1 and ID2 have almost the same conduction angle, and therefore have the same peak level.

Referring to, based on the operations of the respective parts shown in FIG. 3A, the waveforms when the load power is the intermediate load power Po of 225 W shown in FIG. 3B, and those when it is the minimum load power Pomin of 0 W shown in FIG. 3C, it is apparent that, in the operation of the primary-side switching converter, the period length of one switching cycle (TOFF+TON) becomes shorter as the load becomes lighter toward no load. This period length change indicates that the switching frequency is adequately changed as constant-voltage control operation in response to load variation in the range from the maximum load power Pomax to the minimum load power Pomin, as described later. When attention is paid to the time ratios between the periods TON and TOFF, it is apparent that the period TOFF is extended while the period TON is shortened as the load becomes lighter toward no load. This ratio change indicates that the time ratio between the periods TOFF and TON is also changed based on PWM control as the constant-voltage control operation in response to load variation in the range from the maximum load power Pomax to the minimum load power Pomin.

The waveform of the switching current IQ1 when the load power is the intermediate load power Po of 225 W, shown in FIG. 3B, makes it apparent that the negative switching current IQ1 flows through the body diode DD at the start of the period TON, similarly to that shown in FIG. 3A. That is, ZVS operation is adequately achieved. This respect also applies to the switching current IQ1 when the load power is the minimum load power Pomin of 0 W, shown in FIG. 3C. This indicates that ZVS operation is ensured over the entire allowable load power range in the power supply circuit in FIG. 1.

Figure 4:
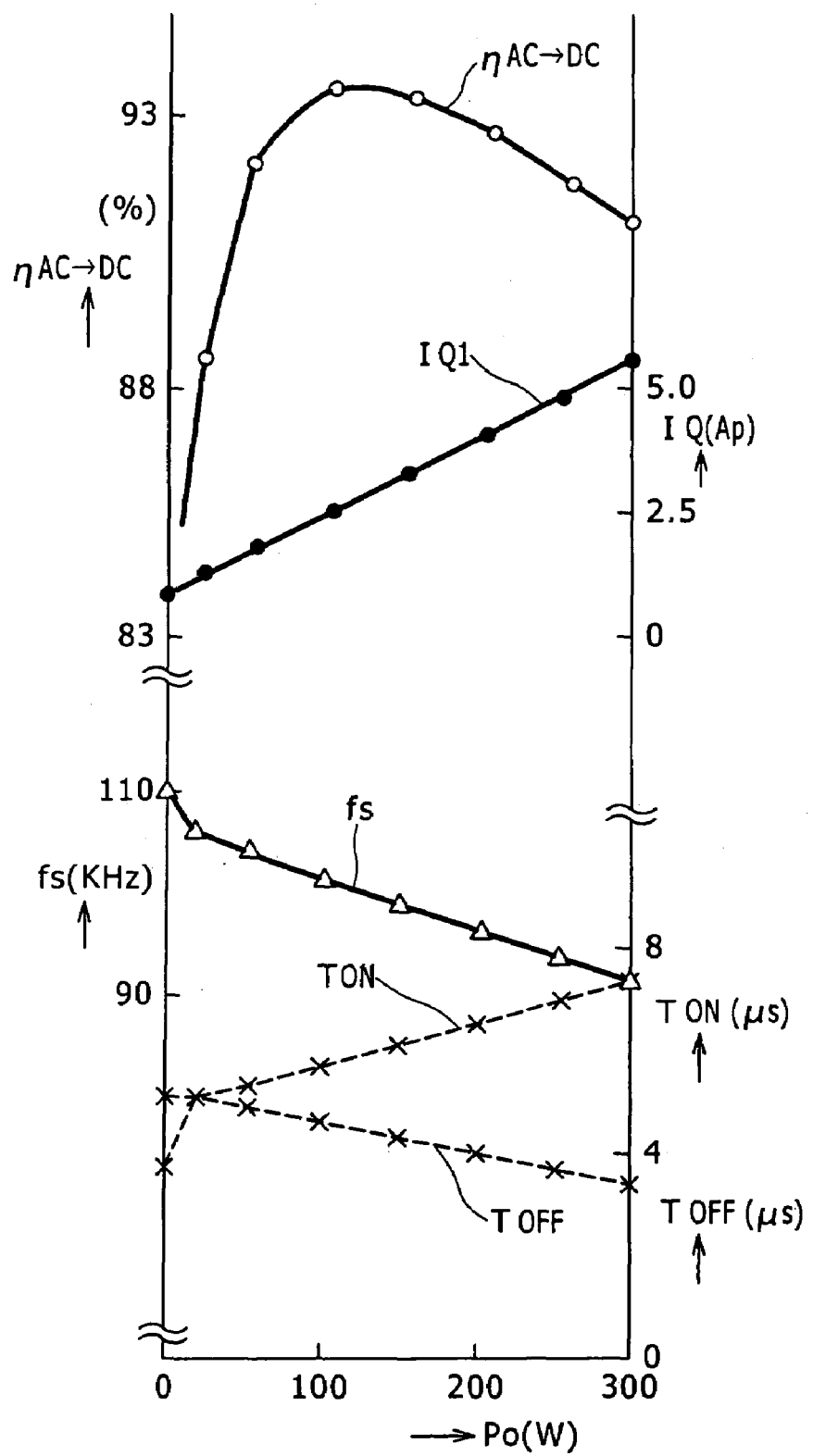
FIG. 4 is a diagram showing, as functions of the load, the variation characteristics of the AC to DC power conversion efficiency, the switching frequency, the lengths of ON and OFF periods of a switching element, and the switching current, regarding the power supply circuit of the first embodiment.

FIG. 4 shows, as functions of the load, the variation characteristics of the AC to DC power conversion efficiency ($\eta AC \rightarrow DC$), the switching frequency fs, the lengths of the periods TON and TOFF, and the switching current IQ1, obtained as a result of experiments on the power supply circuit in FIG. 1.

Referring to FIG. 4, the switching frequency fs increases with an almost constant slope as the load becomes lighter in the range from the maximum load power Pomax of 300 W to the minimum load power Pomin of 0 W (no load).

The length of the period TON, during which the switching element Q1 is in the on-state, increases with an almost constant slope as the load becomes heavier in the range from the maximum load power Pomax of 300 W to the minimum load power Pomin of 0 W (no load). In contrast, the length of the period TOFF, during which the switching element Q1 is in the off-state, decreases with an almost constant slope as the load becomes heavier in the range from the maximum load power Pomax of 300 W to the minimum load power Pomin of 0 W (no load). The absolute value of the slope of the period TON is greater than that of the period TOFF.

These characteristics of the switching frequency fs, and the periods TON and TOFF indicate the following features. First, the switching frequency control of varying the switching frequency fs is carried out as constant-voltage control. A change of the switching frequency fs is equivalent to a change of the time length of one switching cycle indicated as TON+TOFF. In the first embodiment, in shortening of the length of one switching cycle (TON+TOFF) associated with an increase of the switching frequency fs, the period TON is shortened at a certain rate while the period TOFF is extended at a certain rate. It could be deemed that these length changes of the periods TON and TOFF within one switching cycle are due to PWM control in which the conducting periods of the switching element Q1 are controlled.

It therefore can be said that the first embodiment implements complex constant-voltage control operation in which switching frequency control and PWM control are simultaneously carried out. This complex control offers a high control sensitivity.

Actual measurement results on the power supply circuit of FIG. 1 regarding its constant-voltage control are as follows.

When stabilization of the secondary-side DC output voltage Eo at 175 V was intended against load variation from the maximum load power Pomax of 300 W to the minimum load power Pomin of 0 W, the variation range of the switching frequency fs (Δfs) required for the stabilization was 14.9 kHz. Furthermore, the variation ranges of the lengths of the periods TON and TOFF (ΔTON and ΔTOFF) were 3.5 μs and 1.5 μs, respectively.

The AC to DC power conversion efficiency (ηAC→DC) increased as the load became lighter in the range from the maximum load power Pomax of 300 W to load power Po of about 100 W. When the load power was about 100 W, the efficiency showed the maximum value of 93% or more. In addition, a favorable characteristic was shown in which the efficiency was invariably 90% or more in the range from the maximum load power Pomax of 300 W to load power Po of about 25 W.

The switching current IQ1 showed a characteristic of increasing with an almost constant slope as the load became heavier in the range from the minimum load power Pomin of 0 W (no load) to the maximum load power Pomax of 300 W.

Figure 19:
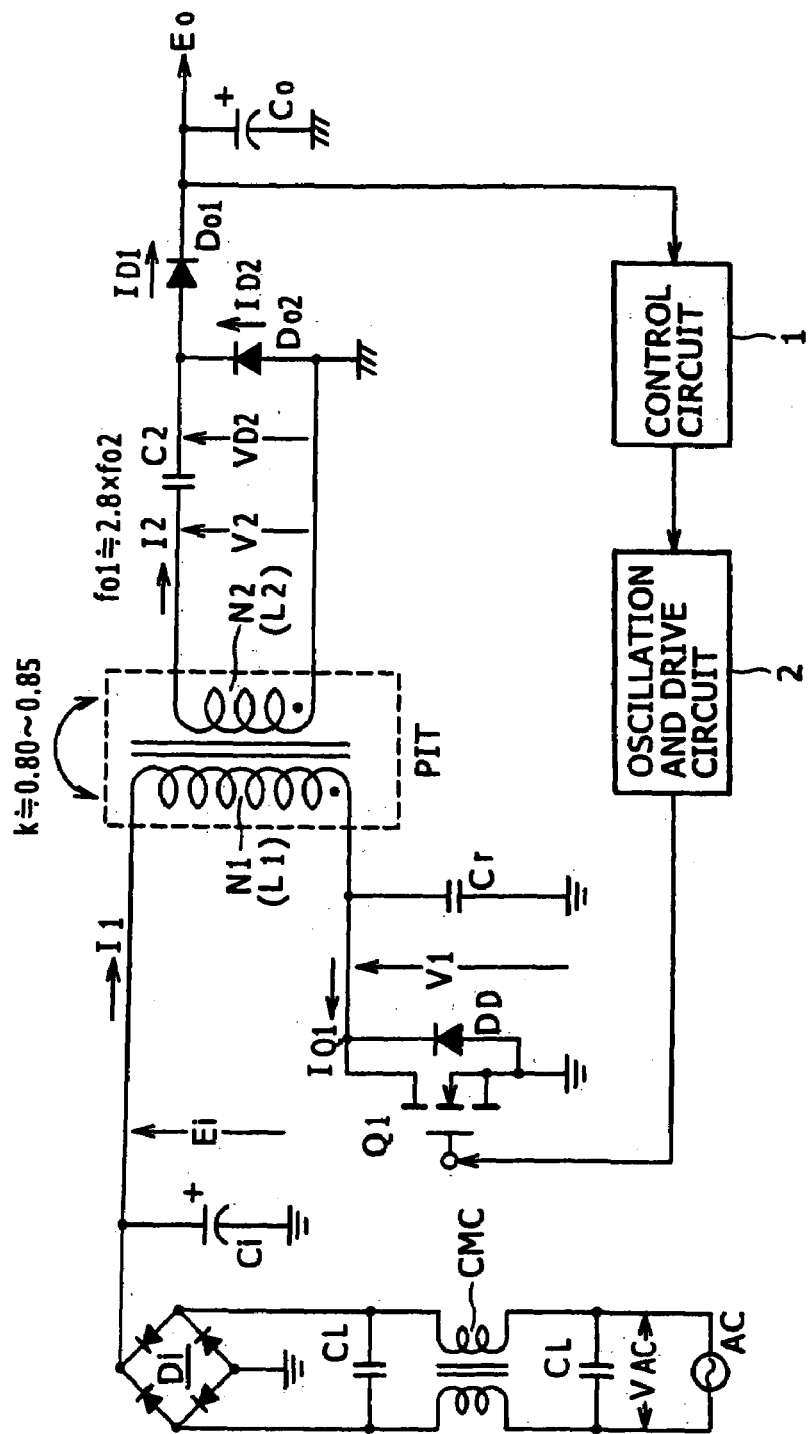
FIG. 19 is a circuit diagram illustrating a configuration example of a power supply circuit as a conventional circuit.

The following description is based on a comparison between the power supply circuit of the first embodiment in FIG. 1 and the power supply circuit as a conventional example in FIG. 19.

It is typically considered that a power supply circuit including a voltage resonant converter on its primary side cannot be put into practical use as it stands, since it has a narrow allowable range of load power and cannot maintain ZVS operation when the load is light. Therefore, the inventor of the present application has performed experiments on a power supply circuit, like one shown in FIG. 19, including a secondary-side series resonant circuit combined with a primary-side voltage resonant converter, and a voltage-doubler half-wave rectifier circuit as a secondary-side rectifier circuit. The experiments revealed that this power supply circuit showed characteristics bringing the circuit closer to the realization than a power supply circuit having a conventional voltage resonant converter.

However, the power supply circuit of FIG. 19 involves abnormal operation when the load is an intermediate load. Specifically, as described with FIG. 20B, a current flows through the switching element Q1 in the positive direction (from the drain to the source) before the end of the OFF period (TOFF) of the switching element Q1, and thus ZVS operation fails to be achieved. Accordingly, it is still difficult to put the circuit into practical use, even with the configuration in FIG. 19.

On the contrary, the power supply circuit of the first embodiment in FIG. 1 allows ZVS operation over the entire allowable load power range, also as described with the waveform diagrams of FIGS. 3A to 3C. That is, the abnormal operation associated with an intermediate load is eliminated. This improvement allows the facilitation of practical use of a single-ended voltage resonant converter including a secondary-side series resonant circuit.

It has been confirmed that the abnormal operation associated with an intermediate load in the power supply circuit of FIG. 19 is readily caused when the circuit has a complex resonant converter in which a voltage resonant converter is combined with a secondary-side series resonant circuit. Such abnormal operation is mainly attributed to the interaction between the primary-side parallel resonant circuit that forms the voltage resonant converter and the secondary-side series resonant circuit (rectifier circuit), due to the simultaneous operation thereof.

Therefore, in the first embodiment, based on an expectation that the above-described abnormal operation in response to an intermediate load is attributed to the circuit configuration itself having the combination between the primary-side voltage resonant converter and the secondary-side series resonant circuit, a class-E switching converter is employed in place of a voltage resonant converter as a primary-side switching converter.

In addition, by setting the total coupling coefficient kt to about 0.65, the coupling degree between the primary and secondary sides of the isolation converter transformer PIT is lowered than conventional values. This low coupling degree attenuates the interaction between the operation of the primary-side switching converter and the rectifying operation of the secondary-side rectifier circuit (switching operation), and therefore offers an effect of suppressing the abnormal operation when the load is an intermediate load.

Moreover, use of a class-E switching converter as a primary-side switching converter eliminates the need to provide a series resonant circuit on the secondary side. Therefore, a secondary-side resonant circuit is absent in the first embodiment. The absence of a secondary-side resonant circuit allows use of, as a secondary-side rectifier circuit, a full-wave center-tap rectifier circuit and a half-wave rectifier circuit, in which rectifying operation is not carried out in one half cycles of an alternating voltage of the secondary winding. The power supply circuit of FIG. 1 has a full-wave center-tap rectifier circuit as a secondary-side rectifier circuit.

In the power supply circuit in FIG. 19, the current that flows from the smoothing capacitor Ci into the switching converter passes through the primary winding N1 in the isolation converter transformer PIT, and then reaches the switching element Q1 and the primary-side parallel resonant capacitor Cr. This current flowing from the smoothing capacitor Ci to the switching converter is the primary winding current I1, and has a comparatively high frequency corresponding to the switching frequency. That is, charging and discharging currents flow to and from the smoothing capacitor Ci with a frequency higher than the frequency of the commercial AC voltage.

An aluminum electrolytic capacitor is often employed as the smoothing capacitor Ci because of the need for the capacitor Ci to have a high breakdown voltage, and so on. The aluminum electrolytic capacitor has an increased tendency to suffer from lowering of the electrostatic capacitance and an increase of the tangent of the loss angle when being operated at a high frequency, compared with other kinds of capacitors. Therefore, there is a need to select, as the aluminum electrolytic capacitor for the smoothing capacitor Ci, a special product of which equivalent series resistance (ESR) is low, and of which allowable ripple current is large. In addition, there is also a need to increase the capacitance of the component as the smoothing capacitor Ci correspondingly. For example, in the configuration of FIG. 19, the capacitance needs to be about 1000 μF in order to address the maximum load power Pomax of 300 W, which is the same as that of the first embodiment. An aluminum electrolytic capacitor compatible with these requirements is more expensive than general-purpose aluminum electrolytic capacitors, and the increase of the capacitance leads to a rise of the component price. Therefore, use of such a special capacitor is disadvantageous in terms of costs.

In contrast, in the power supply circuit of the first embodiment in FIG. 1, the current that flows from the smoothing capacitor Ci into the switching converter passes through the choke coil L10, and then reaches the switching element Q1, the primary-side parallel resonant capacitor Cr, and the primary-side series resonant circuit (N1-C11). Therefore, the current flowing from the smoothing capacitor Ci to the switching converter becomes a DC current as indicated by the input current I1 of FIGS. 3A to 3C. Since the current flowing from the smoothing capacitor Ci to the switching converter is a DC current, the first embodiment does not involve the above-described problems of lowering of the electrostatic capacitance and an increase of the tangent of the loss angle, and therefore allows use of a general-purpose aluminum electrolytic capacitor as the smoothing capacitor Ci. In addition, the capacitance of the component as the smoothing capacitor Ci can be lowered compared with the circuit of FIG. 19. A capacitance of 680 µF is allowed in an actual power supply circuit of FIG. 1. Thus, the first embodiment can achieve cost reduction of the smoothing capacitor Ci.

In addition, in the power supply circuit of the first embodiment, the total coupling coefficient kt between the primary and secondary sides of the isolation converter transformer PIT is set to about 0.65. The total coupling coefficient kt arises from the synthesis between the coupling coefficient k of the isolation converter transformer PIT itself and a pseudo increase of the leakage inductance of the primary winding N1 due to the equivalent parallel connection between the primary winding N1 and the choke coil L10.

For example, when achievement of a total coupling coefficient kt of about 0.65 is intended in the configuration shown in FIG. 19, the coupling coefficient k of the isolation converter transformer PIT itself needs to be about 0.65. When the isolation converter transformer PIT has the configuration shown in FIG. 2, the gap G in the core needs to be enlarged to a length of at least 2 mm in order to obtain this coupling coefficient. However, since the increase of the gap length is a factor in increasing loss due to eddy currents (eddy-current loss), the excess enlargement of the gap is unfavorable and possibly causes considerable power loss due to the eddy-current loss depending on conditions.

In the present embodiment, a total coupling coefficient kt of about 0.65 is obtained by the pseudo increase of the leakage inductance of the primary winding N1 as described above. Therefore, the coupling coefficient k of the isolation converter transformer PIT itself can be set to about 0.75. Accordingly, the gap G in the core of the isolation converter transformer PIT is allowed to have a gap length of about 1.6 mm. Such a gap length eliminates the need to make a special consideration on the eddy current loss.

Second Embodiment

Figure 5:
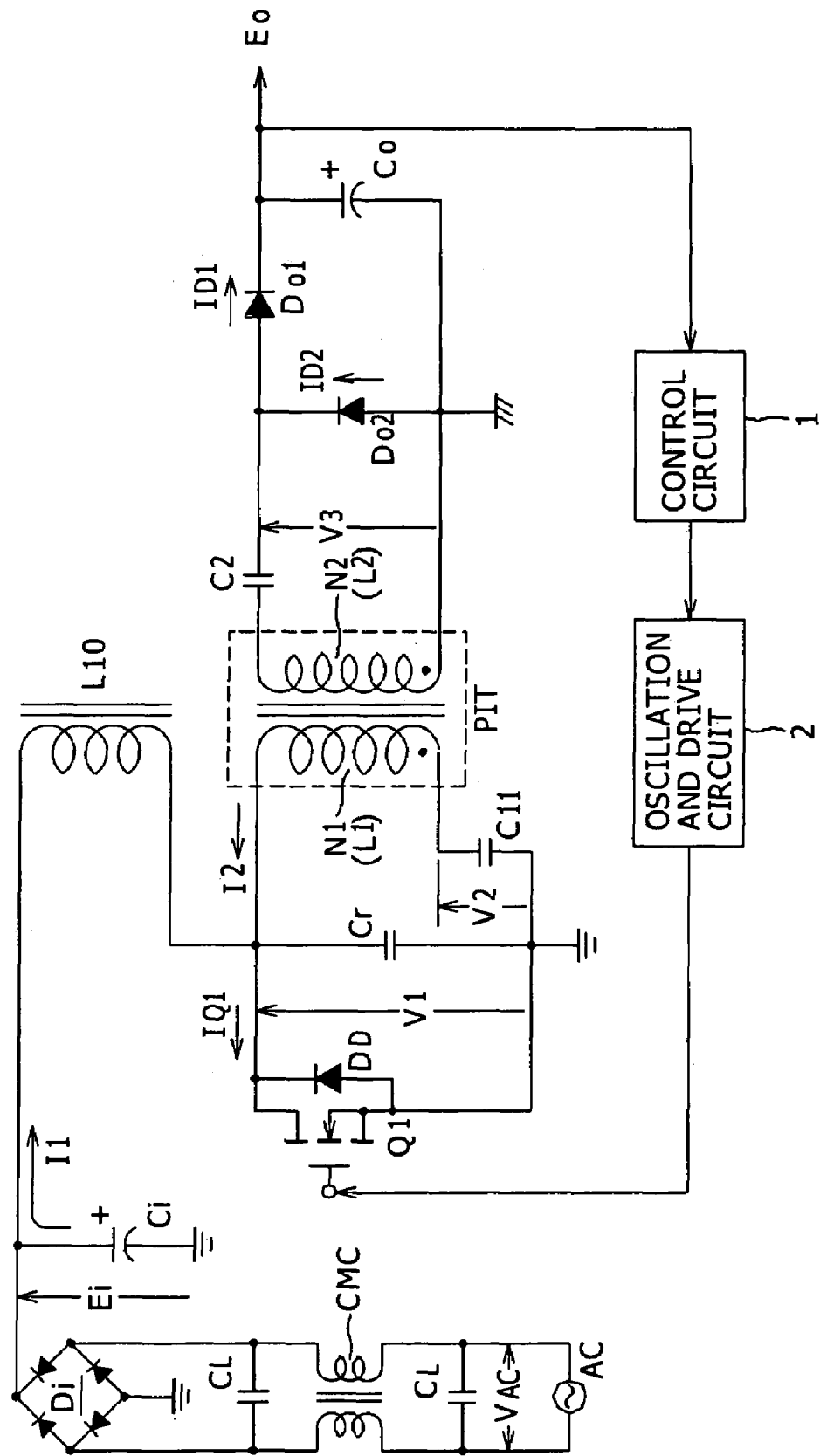
FIG. 5 is a circuit diagram illustrating a configuration example of a power supply circuit according to a second embodiment of the present invention.

FIG. 5 illustrates a configuration example of a power supply circuit according to a second embodiment of the present invention. The same parts in FIG. 5 as those in FIG. 1 are given the same numerals and will not be described below. Also in the power supply circuit of FIG. 5, an isolation converter transformer PIT has a structure similar to that in FIG. 2, and the coupling coefficient k of the isolation converter transformer PIT itself is set to about 0.75. Due to the equivalent parallel connection between a primary winding N1 and a choke coil L10, the total coupling coefficient kt between the primary and secondary sides of the isolation converter transformer PIT is about 0.65.

On the secondary side of the isolation converter transformer PIT, an alternating voltage induced by the primary winding N1 is generated in the secondary winding N2.

Connected in series to the secondary winding N2 is a secondary-side series resonant capacitor C2. Thus, the leakage inductance L2 of the secondary winding N2 and the capacitance of the secondary-side series resonant capacitor C2 form a secondary-side series resonant circuit. This secondary-side series resonant circuit implements resonant operation in association with the rectifying operation of a secondary-side rectifier circuit to be described later. Thus, a secondary winding current flowing through the secondary winding N2 has a sinusoidal waveform. That is, current resonant operation is achieved on the secondary side.

This secondary-side rectifier circuit is formed, as a voltage-doubler half-wave rectifier circuit, by coupling two rectifier diodes Do1 and Do2 and one smoothing capacitor Co to the secondary winding N2, to which the secondary-side series resonant capacitor C2 is connected in series as described above. The connecting structure of the voltage-doubler half-wave rectifier circuit is as follows. The winding-finish end of the secondary winding N2 is coupled via the secondary-side series resonant capacitor C2 to the anode of the rectifier diode Do1 and the cathode of the rectifier diode Do2. The cathode of the rectifier diode Do1 is connected to the positive electrode of the smoothing capacitor Co. The winding-start end of the secondary winding N2 and the anode of the rectifier diode Do2 are connected to the negative electrode of the smoothing capacitor Co at the secondary-side ground potential.

Rectifying operation of the thus formed voltage-doubler half-wave rectifier circuit is as follows.

In the periods of half cycles corresponding to one polarity of the voltage across the secondary winding N2 (secondary winding voltage), which is an alternating voltage induced in the secondary winding N2, a forward voltage is applied to the rectifier diode Do2, and thus the rectifier diode Do2 conducts. Therefore, the rectified current is charged in the secondary-side series resonant capacitor C2. Thus, generated across the secondary-side series resonant capacitor C2 is a voltage with the same level as that of the alternating voltage induced in the secondary winding N2. In the periods of half cycles of the other polarity of a secondary winding voltage V3, the rectifier diode Do1 is provided with a forward voltage and thus conducts. At this time, the smoothing capacitor Co is charged by the potential resulting from superposition of the secondary winding voltage V3 and the voltage across the secondary-side series resonant capacitor C2.

Thus, generated across the smoothing capacitor Co is the secondary-side DC output voltage Eo having the level equal to twice the level of the alternating voltage excited in the secondary winding N2. In this rectifying operation, the charging of the smoothing capacitor Co is implemented only in the periods of half cycles of one polarity of the alternating voltage excited in the secondary winding N2. That is, rectifying operation as voltage-doubling half-wave rectifying is achieved. This rectifying operation can be regarded as operation for resonance outputs of the secondary-side series resonant circuit formed by the series connection of the secondary winding N2 to the secondary-side series resonant capacitor C2.

The thus generated secondary-side DC output voltage Eo is supplied to a load. In addition, the voltage Eo is branched and output to a control circuit 1 as a detected voltage.

The control circuit 1 supplies to an oscillation and drive circuit 2 a detection output dependent upon a level change of the input secondary-side DC output voltage Eo. The oscillation and drive circuit 2 drives the switching element Q1 so that the switching frequency or the time ratio between the periods TON and TOFF (conduction angle) within one switching cycle is varied according to the detection output input from the control circuit 1. This operation serves as constant-voltage control operation for the secondary-side DC output voltage.

In the basic constant-voltage control operation of a voltage resonant converter, the period TON of the switching element Q1 is varied while the period TOFF thereof is kept constant, to thereby vary the switching frequency. However, if the voltage resonant converter includes a secondary-side series resonant circuit like the second embodiment, another constant-voltage control operation as PWM control operation in which the conduction angle in one switching cycle is controlled is also implemented as described above. That is, as a whole of the constant-voltage control operation, complex control including the switching frequency control and PWM control is conducted.

This variation control of switching frequency and conduction angle of the switching element Q1 leads to changes of resonant impedances of the primary and secondary sides and the power transmission effective period, in the power supply circuit. These changes result in a change of the amount of power transmitted from the primary winding N1 to the secondary winding N2 in the isolation converter transformer PIT, and in a change of the amount of power that should be supplied from the secondary-side rectifier circuit to a load. Thus, the level of the secondary-side DC output voltage Eo is controlled so that the level variation thereof is cancelled. That is, stabilization of the secondary-side DC output voltage Eo is allowed.

The characteristics of major parts in the power supply circuit of FIG. 5 are as follows for example. FIG. 6 shows the experimental results on this power supply circuit.

The core of the isolation converter transformer PIT employs an EER-35 core, and a gap G is designed to have a gap length of 1.6 mm. The numbers of turns of the primary winding N1 and the secondary winding N2 are set to 59 T and 30 T, respectively. Thus, the coupling coefficient k of the isolation converter transformer PIT is set to 0.75.

As is well known, the above-described EER core is one of types and standards of product cores. It is known that the types also include an EE type. The sectional shapes of cores of the EER and EE types are both an EE-character shape. Therefore, the term EE-shaped core in the present specification encompasses both cores of the EER and EE types.

For the choke coil L10, an EER-28 core is selected, and the gap between the center magnetic legs is designed to have a length of 1.2 mm. The inductance (leakage inductance) thereof is set to 1.05 mH.

The capacitance of the primary-side parallel resonant capacitor Cr is set to 5600 pF. According to the capacitance of the primary-side parallel resonant capacitor Cr and the inductance of the choke coil L10, the resonant frequency fo1(p) of the primary-side parallel resonant circuit is 65.8 kHz.

The capacitance of the primary-side series resonant capacitor C11 is set to 0.027 μF. According to this capacitance and the leakage inductance of the primary side according to the total coupling coefficient kt of the isolation converter transformer PIT, to be described below, the resonant frequency fo1(s) of the primary-side series resonant circuit is 45 kHz.

The capacitance of the secondary-side series resonant capacitor C2 is set to 0.082 μF. According to this capacitance and the leakage inductance L2 of the secondary winding N2, the resonant frequency fo2 of the secondary-side series resonant circuit is 48 kHz.

These resonant frequencies fo1(p), fo1(s) and fo2 therefore have the following relative relationship: fo1(s) is nearly equal to fo2, and fo1(p) is about 1.4 to 1.5 times fo1(s) and fo2. In addition, compared with the resonant frequencies fo1 and fo2 of the primary-side parallel resonant circuit and secondary-side series resonant circuit, respectively, in the conventional power supply circuit of FIG. 19, all the resonant frequencies fo1(p), fo1(s) and fo2 have a lower value, and the frequency difference among these frequencies fo1(p), fo1(s) and fo2 is small.

The allowable load power range of the power supply circuit is from the maximum load power Pomax of 300 W to the minimum load power Pomin of 0 W (no load). The rated level of the secondary-side DC output voltage Eo is 175 V.

As described above, the coupling coefficient k of the isolation converter transformer PIT itself is set to about 0.75. However, since the leakage inductance on the primary side of the isolation converter transformer PIT is increased as described above, the comprehensive coupling coefficient of the isolation converter transformer PIT in the power supply circuit is lower than 0.75. That is, the comprehensive coupling coefficient between the primary and secondary sides of the isolation converter transformer PIT, in terms of the whole power supply circuit, is set lower than the coupling coefficient k determined by the structure of the isolation converter transformer PIT itself. This comprehensive coupling coefficient is treated as the total coupling coefficient kt here.

In the second embodiment, by setting the inductance of the choke coil L10 to the above-described predetermined value for example, the total coupling coefficient kt is set to about 0.7 or less value offering a higher degree of loose coupling, specifically set to 0.65. The determinants of the total coupling coefficient kt are the coupling coefficient k dependent upon the structure of the isolation converter transformer PIT itself and the inductance of the choke coil L10. Also as described above, the resonant frequency of the primary-side series resonant circuit, formed by the series connection of the primary winding N1 to the primary-side series resonant capacitor C11, is determined by the leakage inductance of the primary side according to the total coupling coefficient kt and the capacitance of the primary-side series resonant capacitor C11.

FIGS. 6A to 6C are waveform diagrams showing the operation of the major parts in the power supply circuit of FIG. 5, with reflecting the corresponding switching cycle of the switching element Q1. FIG. 6A shows an input current I1, a switching voltage V1, a primary winding current I2, a switching current IQ1, a primary-side series resonant voltage V2, a secondary-side alternating voltage V3, and secondary-side rectified currents ID1 and ID2, when the load power is the maximum load power Pomax of 300 W. FIG. 6B shows the input current I1, the switching voltage V1, the primary winding current I2, and the switching current IQ1, when the load power is intermediate load power Po of 225 W. FIG. 6C shows the input current I1, the switching voltage V1, the primary winding current I2, and the switching current IQ1, when the load power is the minimum load power Pomin of 0 W. An AC input voltage VAC is 100 V.

The waveforms of FIG. 6A corresponding to the maximum load power Pomax of 300 W are the same as those of FIG. 3A, except for the secondary-side alternating voltage V3. Therefore, only the secondary-side alternating voltage V3 will be described below.

The secondary-side alternating voltage V3 is the voltage across the series circuit of the secondary winding N2 and the secondary-side series resonant capacitor C2, and is input to the secondary-side rectifier circuit. In the period of each half cycle of the voltage V3, a forward voltage is applied to either one of the rectifier diodes Do1 and Do2 in turn, which leads to the alternate conduction of the rectifier diodes Do1 and Do2. Thus, the secondary-side alternating voltage V3 has an alternating waveform in which the voltage is clamped at the level having an absolute value equal to the secondary-side DC output voltage Eo, in the respective conducting periods of the rectifier diodes Do1 and Do2.

As shown in FIG. 6A, the secondary-side rectified currents ID1 and ID2 in turn flow to the smoothing capacitor Co with sinusoidal half waveforms. The secondary winding current flowing through the secondary winding N2 has a waveform resulting from the synthesis between the waveforms of the secondary-side rectified currents ID1 and ID2.

The power supply circuit of FIG. 5 showed almost the same experimental results as those in FIG. 4 about the power supply circuit of FIG. 1.

Actual measurement results on the power supply circuit of FIG. 5 regarding its constant-voltage control are as follows.

When stabilization of the secondary-side DC output voltage Eo at 175 V was intended under the conditions of an AC input voltage VAC of 100 V and load variation from the maximum load power Pomax of 300 W to the minimum load power Pomin of 0 W, the variation range of the switching frequency fs (Δfs) required for the stabilization was 17.8 kHz. Furthermore, the variation ranges of the lengths of the periods TON and TOFF (ΔTON and ΔTOFF) were 3.4 μs and 1.6 μs, respectively.

The AC to DC power conversion efficiency (ηAC→DC) increased as the load became lighter in the range from the maximum load power Pomax of 300 W to load power Po of about 100 W. When the load power was about 100 W, the efficiency showed the maximum value of 93% or more. In addition, a favorable characteristic was shown in which the efficiency was invariably 90% or more in the range from the maximum load power Pomax of 300 W to load power Po of about 25 W.

The switching current IQ1 showed a characteristic of increasing with an almost constant slope as the load became heavier in the range from the minimum load power Pomin of 0 W (no load) to the maximum load power Pomax of 300 W.

Third Embodiment

Figure 7:
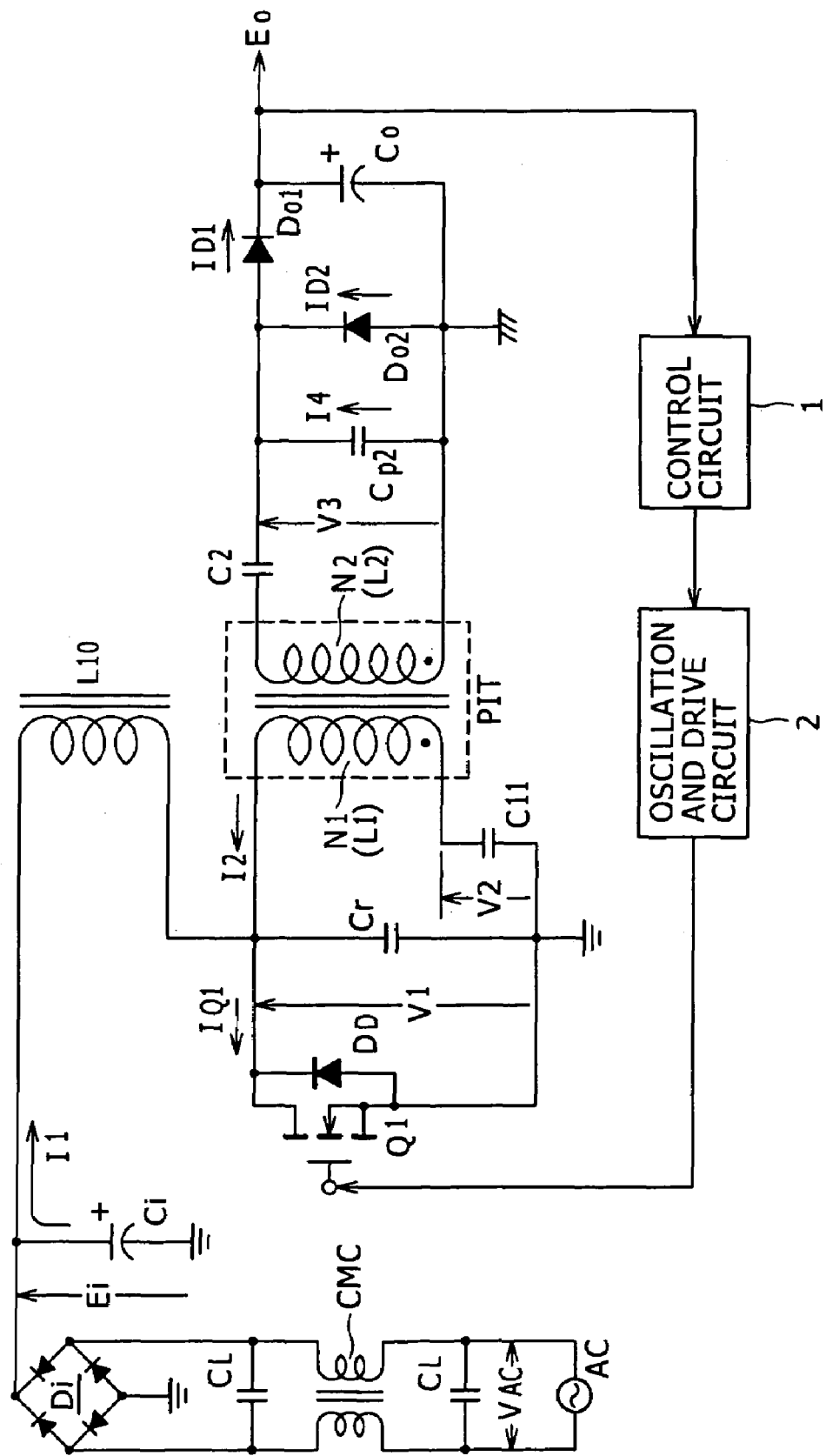
FIG. 7 is a circuit diagram illustrating a configuration example of a power supply circuit according to a third embodiment of the present invention.

FIG. 7 illustrates a configuration example of a power supply circuit according to a third embodiment of the present invention.

The same parts in FIG. 7 as those in FIG. 1 are given the same numerals and will not be described below.

Also in the power supply circuit of the third embodiment, an isolation converter transformer PIT has a structure similar to that in FIG. 2, and the coupling coefficient k of the isolation converter transformer PIT itself is set to about 0.75. Due to the equivalent parallel connection between a primary winding N1 and a choke coil L10, the total coupling coefficient kt between the primary and secondary sides of the isolation converter transformer PIT is about 0.65.

The power supply circuit of the third embodiment in FIG. 7 is different from the circuit of the second embodiment in FIG. 5 in terms of the circuit configuration, in that the third embodiment includes a secondary-side partial voltage resonant capacitor Cp2 that is connected in parallel to the series circuit of a secondary winding N2 and a secondary-side series resonant capacitor C2.

The connection of the secondary-side partial voltage resonant capacitor Cp2 forms a secondary-side partial voltage resonant circuit by the leakage inductance of the secondary side of the isolation converter transformer PIT and the capacitance of the secondary-side partial voltage resonant capacitor Cp2. The secondary-side partial voltage resonant circuit implements voltage resonant operation only at the turn-on/turn-off timings of the rectifier diodes Do1 and Do2. The capacitance of the secondary-side partial voltage resonant capacitor Cp2 is set significantly smaller than that of the secondary-side series resonant capacitor C2, and therefore has no effect on the resonant frequency fo1(s) of the secondary-side series resonant circuit including the secondary-side series resonant capacitor C2, and other characteristics.

The same major parts in the power supply circuit of FIG. 7 as those in the circuit of the second embodiment have the same characteristics for example. Therefore, the circuit of the third embodiment has the same values as those of the second embodiment in FIG. 5 about the following parameters for example: the coupling coefficient k of the isolation converter transformer PIT, the total coupling coefficient kt, the resonant frequency fo1(p) of the primary-side parallel resonant circuit, the resonant frequency fo1(s) of the primary-side series resonant circuit, and the resonant frequency fo2 of the secondary-side series resonant circuit. Furthermore, as an additional parameter, the capacitance of the secondary-side partial voltage resonant capacitor Cp2 is set to 470 pF.

FIGS. 8A to 8C are waveform diagrams showing the operation of the major parts in the power supply circuit of the third embodiment in FIG. 7, with reflecting the corresponding switching cycle of the switching element Q1. FIG. 8A shows an input current I1, a switching voltage V1, a primary winding current I2, a switching current IQ1, a primary-side series resonant voltage V2, a secondary-side alternating voltage V3, a secondary-side partial resonant current I4, and secondary-side rectified currents ID1 and ID2, when the load power is the maximum load power Pomax of 300 W. FIG. 8B shows the input current I1, the switching voltage V1, the primary winding current I2, and the switching current IQ1, when the load power is intermediate load power Po of 225 W. FIG. 8C shows the input current I1, the switching voltage V1, the primary winding current I2, and the switching current IQ1, when the load power is the minimum load power Pomin of 0 W. An AC input voltage VAC is 100 V.

The waveforms of the input current I1, the switching voltage V1, the primary winding current I2, the switching current IQ1, the primary-side series resonant voltage V2, and the secondary-side rectified currents ID1 and ID2 are the same as those in FIG. 6A about the power supply circuit in FIG. 5. Therefore, the description thereof will be omitted. These same waveforms as those of FIG. 6A indicate that, also in the third embodiment, the abnormal operation in which ZVS is not achieved when the load is an intermediate load is eliminated similarly to the power supply circuit of FIG. 5. Furthermore, the current (I1) that flows from the smoothing capacitor Ci to the switching converter is a DC current.

The secondary-side partial resonant current I4 of FIG. 8A flows with the positive polarity only at the timings when the rectifier diode Do1 is turned off and the rectifier diode Do2 is turned on. In addition, the current I4 flows with the negative polarity only at the timings when the rectifier diode Do2 is turned off and the rectifier diode Do1 is turned on. This waveform indicates the achievement of partial voltage resonant operation in which voltage resonant operation arises only at the turn-on/turn-off timings of the rectifier diodes Do1 and Do2.

Due to this partial voltage resonant operation, the rise-up/fall-down slopes in the waveform of the secondary-side alternating voltage V3 are gentler compared with those in FIG. 6A.

The experimental results on the power supply circuit of the third embodiment in FIG. 7 were almost the same as those in FIG. 4 on the circuit of the first embodiment, regarding the variation characteristics of the AC to DC power conversion efficiency (ηAC→DC), the switching frequency fs, the lengths of the periods TON and TOFF, and the switching current IQ1 under the conditions of an AC input voltage VAC of 100 V and load variation from 300 W to 0 W.

However, the third embodiment involves the operation of the secondary-side partial voltage resonant circuit. Therefore, as shown in FIG. 8A, at the turn-on/turn-off timings of the rectifier diodes Do1 and Do2, a current that is originally directed to the rectifier diodes Do1 and Do2 flows via the secondary-side partial voltage resonant capacitor Cp2 as the secondary-side partial resonant current I4. This operation reduces the switching loss of the rectifier diodes Do1 and Do2 at the turn-on/turn-off timings thereof. As a result, the third embodiment achieves a more favorable AC to DC power conversion efficiency than the second embodiment.

Fourth Embodiment

Prior to description of a fourth embodiment of the present invention, the basic configuration of a switching converter that implements switching operation based on a voltage-clamp class-E resonant mode (referred to also as a class-E switching converter, hereinafter) as a background art of the fourth embodiment will be described below with reference to FIGS. 17 and 18.

It is known that the class-E switching converter involves a very high peak switching voltage. For example, when the duty ratio of the ON period to the OFF period of the switching element Q1 is two to one, the peak level of the voltage resonant pulse, which is the switching voltage V1 during the OFF period, is about five times the level of a DC input voltage Ein.

As techniques for suppressing the peak switching voltage of such a class-E switching converter, one voltage-clamp method employing a diode and a transformer and another voltage-clamp method employing a transmission-line transformer are proposed and disclosed in a document (Tadashi Suetsugu, voltage-clamped class E amplifier with transmission-line transformer, Technical Report of the Institute of Electronics, Information and Communication Engineers (J)).

Figure 17:
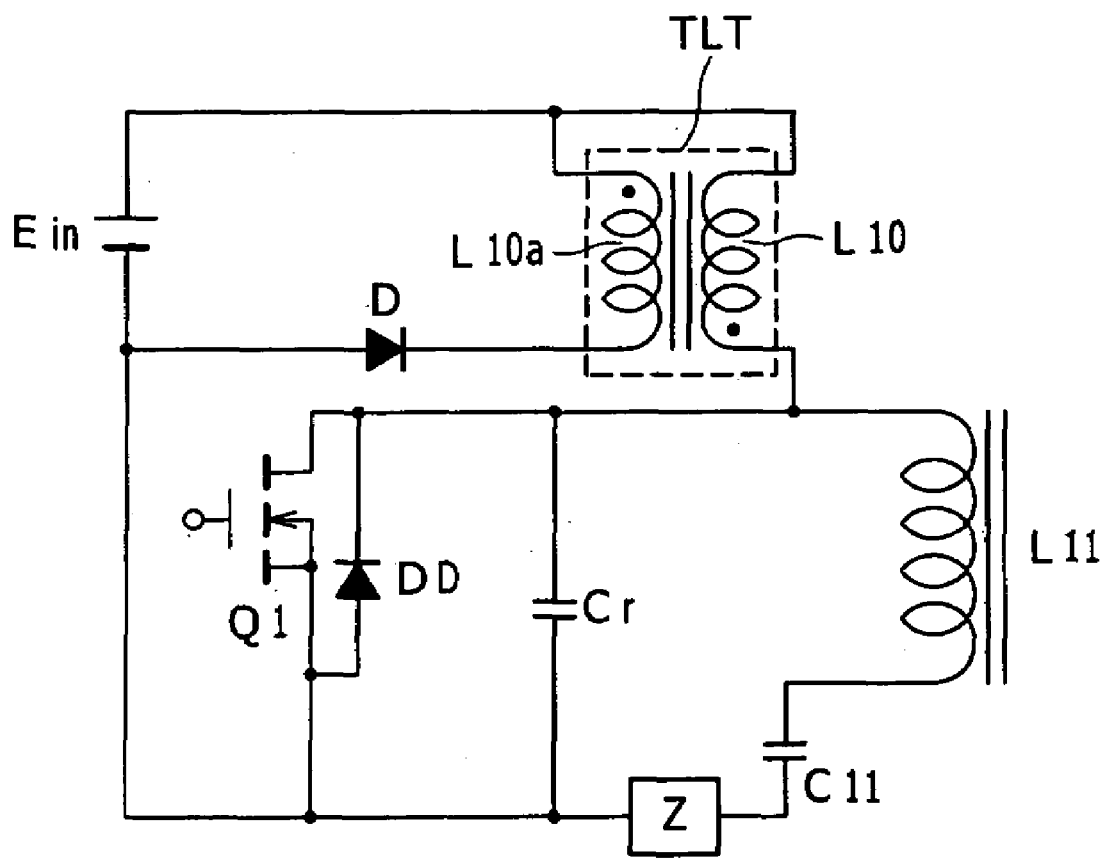
FIG. 17 is a circuit diagram showing a configuration example of a class-E switching converter to which a voltage-clamp configuration employing a diode and a transformer is added.

FIG. 17 is a circuit diagram of the configuration corresponding to the former voltage-clamp method employing a diode and a transformer. FIG. 18 is a circuit diagram of the configuration corresponding to the latter voltage-clamp method employing a transmission-line transformer. The same parts in FIGS. 17 and 18 as those in FIG. 15 are given the same numerals and will not be described below.

The circuit in FIG. 17 includes a transformer TLT formed of magnetically coupled inductors L10 and L10a, and a diode D. The series circuit of the diode D and the inductor L10a is connected in parallel to a DC input power supply Ein. One end of the inductor L10 is connected to the drain of a switching element Q1, while the other end thereof is connected to the positive electrode of the DC input power supply Ein.

This circuit configuration provides, in the OFF period of the switching element Q1, the period during which the diode D conducts and thus a current flows through the diode D and the inductor L10. Therefore, the current flowing to a parallel resonant capacitor Cr is reduced, which suppresses the peak level of the switching voltage.

However, also as described in the aforementioned document, the voltage-clamp method of FIG. 17 involves the occurrence of ringing due to the leakage inductance of the transformer TLT, and this ringing component overlaps with the switching voltage. As a result, the switching voltage cannot be suppressed effectively.

Figure 18:
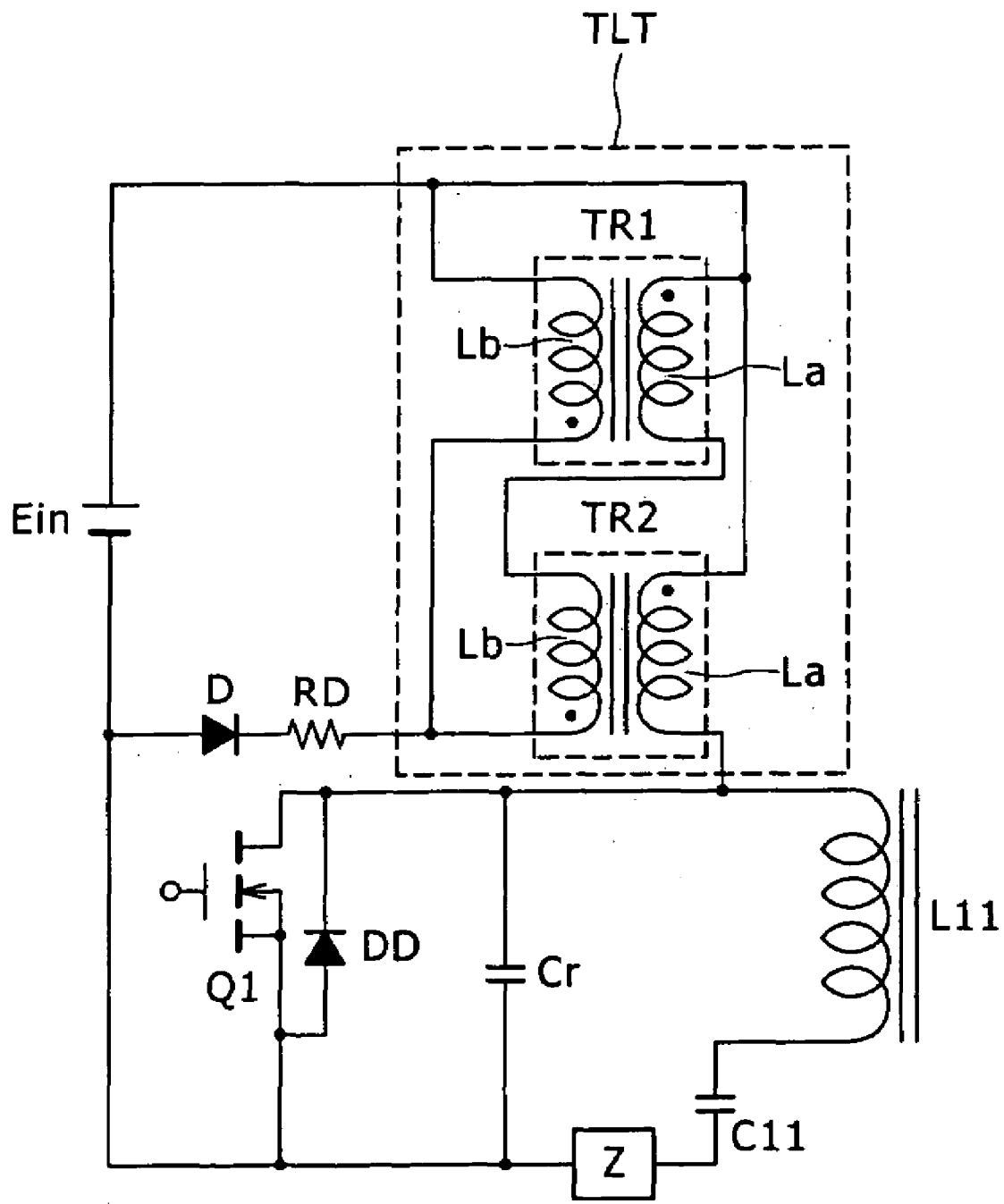
FIG. 18 is a circuit diagram showing a configuration example of a class-E switching converter to which a voltage-clamp configuration employing a transmission-line transformer is added.

In order to address this ringing problem, the document also proposes the configuration shown in FIG. 18.

The configuration of FIG. 18 includes a diode D, a resistor RD and a transmission-line transformer TLT for one-to-two impedance conversion. These components are coupled to the class-E switching converter as shown in the drawing. The transmission-line transformer. TLT includes a pair of transformers TR1 and TR2 in which coaxial cable windings La and Lb having the illustrated connecting structure are wound so as to be magnetically coupled to each other in each transformer. The resistor RD connected in series to the diode D serves to adjust the impedance.

In the configuration in FIG. 18, the use of the transmission-line transformer causes the need to strictly adjust the impedance. The provision of a resistor for the impedance adjustment however problematically leads to power loss due to the resistor.

The fourth embodiment applies a class-E switching converter with a basic configuration shown in FIG. 15 to a power supply circuit. On that basis, the fourth embodiment offers a further improvement for suppressing the peak level of the switching voltage effectively, in order to eliminate the problems in the voltage-clamp methods of FIGS. 17 and 18.

Figure 9:
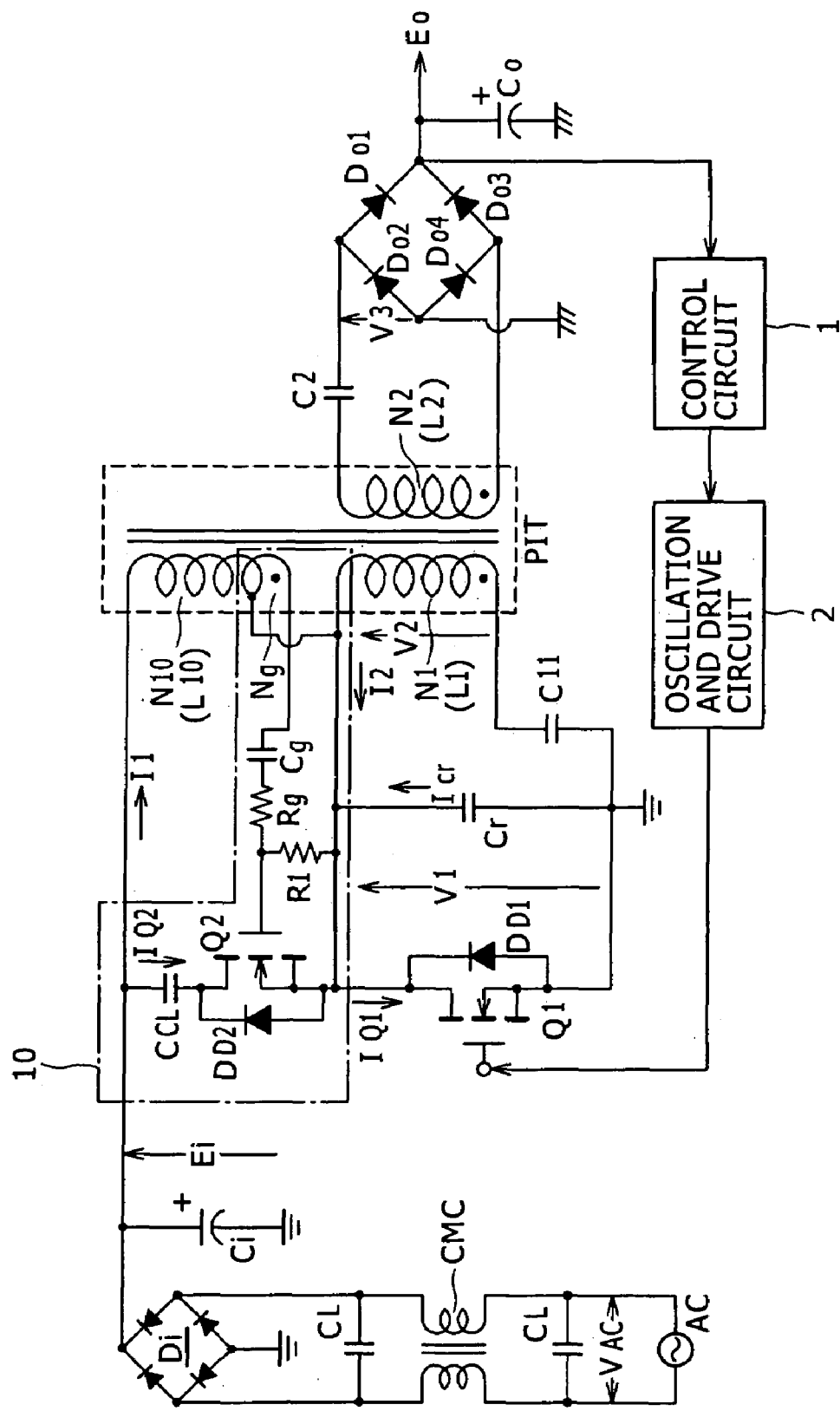
FIG. 9 is a circuit diagram illustrating a configuration example of a power supply circuit according to a fourth embodiment of the present invention.

FIG. 9 is a circuit diagram illustrating a configuration example of a power supply circuit of the fourth embodiment. The same parts in FIG. 9 as those in FIG. 1 are given the same numerals and will not be described below.

On the secondary side of the isolation converter transformer PIT, an alternating voltage induced by a primary winding N1 is generated in a secondary winding N2.

Connected in series to the secondary winding N2 is a secondary-side series resonant capacitor C2. Thus, the leakage inductance L2 of the secondary winding N2 and the capacitance of the secondary-side series resonant capacitor C2 form a secondary-side series resonant circuit. This secondary-side series resonant circuit implements resonant operation in association with the rectifying operation of a secondary-side rectifier circuit to be described later. Thus, a secondary winding current flowing through the secondary winding N2 has a sinusoidal waveform. That is, current resonant operation is achieved on the secondary side.

As the secondary-side rectifier circuit, a bridge full-wave rectifier circuit is connected to the secondary winding N2 to which the secondary-side series resonant capacitor C2 is connected in series as described above. The bridge full-wave rectifier circuit includes a bridge rectifier circuit formed of bridge-connected four rectifier diodes Do1, Do2, Do3 and Do4, and one smoothing capacitor Co.

The winding-finish end of the secondary winding N2 is coupled via the secondary-side series resonant capacitor C2 to the connecting node between the anode of the rectifier diode Do1 and the cathode of the rectifier diode Do2. The winding-start end of the secondary winding N2 is coupled to the connecting node between the anode of the rectifier diode Do3 and the cathode of the rectifier diode Do4. The cathodes of the rectifier diodes Do1 and Do3 are connected to the positive electrode of the smoothing capacitor Co. The negative electrode of the smoothing capacitor Co is coupled to the connecting node between the anode of the rectifier diode Do2 and the anode of the rectifier diode Do4, at the secondary-side ground potential.

On the primary side of the power supply circuit in FIG. 9, an active clamp circuit 10 is provided.

The active clamp circuit 10 includes an auxiliary switching element Q2, a clamp capacitor CCL, and a clamp diode DD2. As the auxiliary switching element Q2, a MOS-FET is selected. The clamp diode DD2 is a body diode included in the auxiliary switching element Q2. The anode thereof is connected to the source of the auxiliary switching element Q2, while the cathode is connected to the drain of the auxiliary switching element Q2.

Furthermore, the active clamp circuit 10 includes, as drive circuitry for driving the auxiliary switching element Q2, a drive winding Ng, a capacitor Cg, a gate resistor Rg, and a resistor R1 between the gate and source.

Note that hereinafter, the switching element Q1 of the single-ended voltage resonant converter is referred to also as a main switching element Q1, for differentiation from the auxiliary switching element Q2.

The drain of the auxiliary switching element Q2 is connected to one electrode of the clamp capacitor CCL. The other electrode of the clamp capacitor CCL is connected to the line of a rectified and smoothed voltage Ei (the positive electrode of a smoothing capacitor Ci). The source of the auxiliary switching element Q2 is coupled to the connecting node among the drain of the main switching element Q1, one electrode of a primary-side parallel resonant capacitor Cr, and the winding-finish end of the primary winding N1.

That is, in the active clamp circuit 10 of the present embodiment, the clamp capacitor CCL is coupled in series to the parallel circuit of the auxiliary switching element Q2 and the clamp diode DD2. In addition, the thus formed circuit is connected in parallel to the primary winding N1 of the isolation converter transformer PIT.

In the drive circuitry for the auxiliary switching element Q2, the resistor R1 is interposed between the gate and source of the auxiliary switching element Q2 as shown in the drawing. In addition, the gate of the auxiliary switching element Q2 is coupled to the series circuit of the resistor Rg, the capacitor Cg and the drive winding Ng. This series circuit and the resistor R1 form a self-excited oscillation and drive circuit for the auxiliary switching element Q2.

The drive winding Ng is formed by adding a further winding to the winding-start end of a choke coil winding N10 wound in the isolation converter transformer PIT. The number of turns of the drive winding Ng is e.g. 1 T (turn). Thus, generated in the drive winding Ng is a voltage dependent upon an alternating voltage arising in the choke coil winding N10. The windings N10 and Ng are designed so that the voltage arising in the drive winding Ng has the polarity opposite to that of the voltage arising in the choke coil winding N10. The actual operation of the drive winding Ng is ensured as long as the number of turns thereof is at least 1 T. However, the number of turns is not limited to 1 T.

As described later in detail, the active clamp circuit 10 operates so as to suppress the peak level of a voltage resonant pulse that is generated during the OFF period of the main switching element Q1, for the switching voltage (parallel resonant voltage) V1 arising across the parallel circuit of the main switching element Q1 and the primary-side parallel resonant capacitor Cr.

Figure 10:
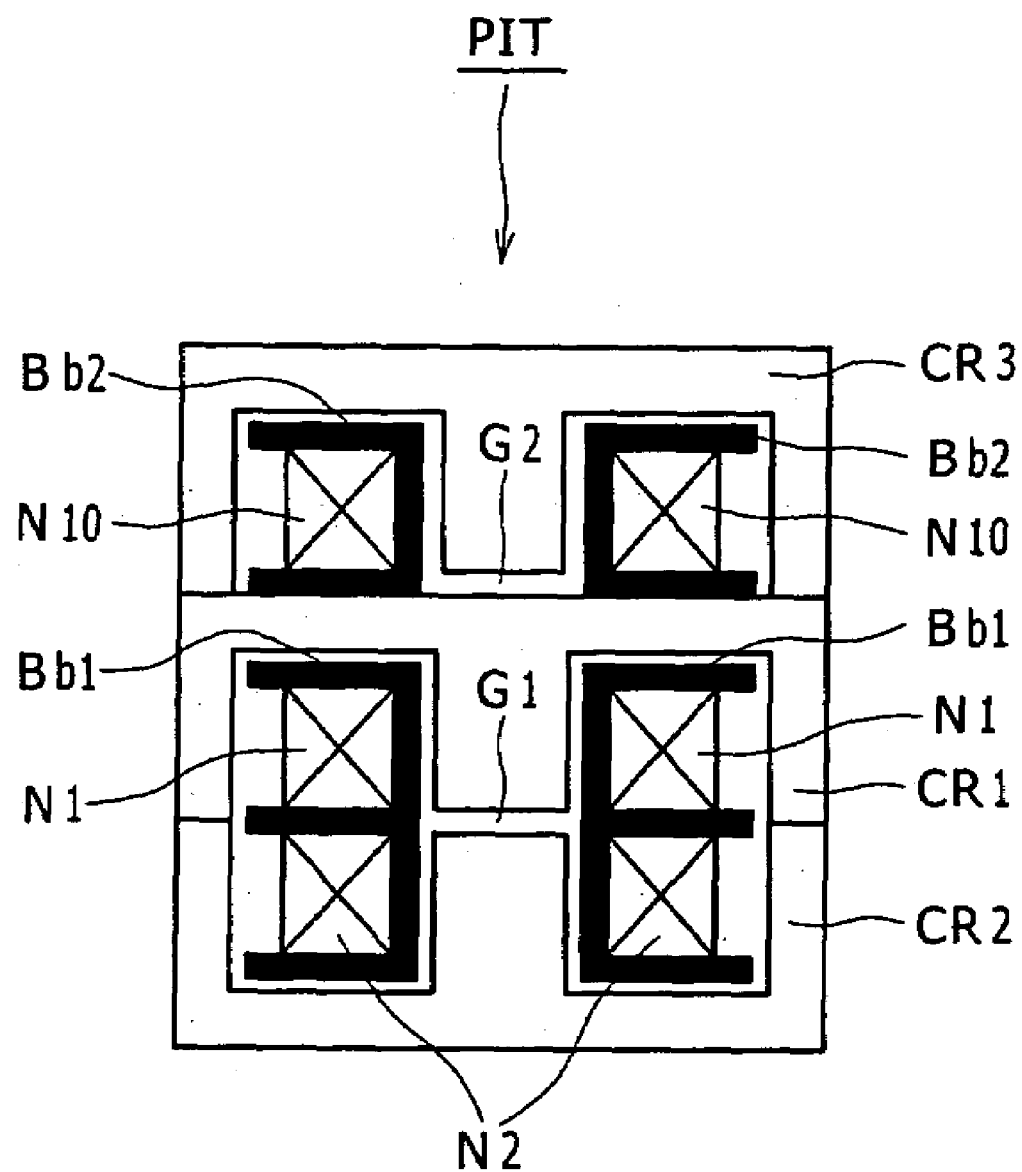
FIG. 10 is a diagram illustrating another configuration example of an isolation converter transformer included in the power supply circuit of the fourth embodiment.

The isolation converter transformer PIT included in the power supply circuit of FIG. 9 may have a complex transformer structure like the structure in FIG. 10, instead of the structure in FIG. 2. Specifically, the structure of FIG. 10 includes an EE-shaped core that is formed by combining E-shaped cores CR1 and CR2 composed of a ferrite material for example.

Furthermore, a bobbin Bb1 is provided that is formed of resin or the like and has such a divided shape that winding parts on the primary side and secondary side are independent of each other. The primary winding N1 is wound around one winding part of the bobbin Bb1. The secondary winding N2 is wound around the other winding part.

The bobbin Bb1 around which the primary-side and secondary-side windings have been thus wound is fitted to the EE-shaped core formed of the E-shaped cores CR1 and CR2 so that the center leg of the EE-shaped core penetrates the bobbin Bb1, which results in the state in which the primary-side and secondary-side windings in the different winding regions are wound around the center leg of the EE-shaped core.

In addition, combined with the EE-shaped core (CR1, CR2) is another E-shaped core CR3 as shown in FIG. 10. Specifically, the ends of the legs of the E-shaped core CR3 are opposed to the side face of the E-shaped core CR1 of the EE-shaped core (CR1, CR2).

Fitted to the E-shaped core CR3 is a bobbin Bb2 having one winding region. The choke coil winding N10 is wound around the winding region. Thus, the state is obtained in which the choke coil winding N10 is wound around the center leg of the E-shaped core CR3.

A gap G1 with a certain gap length is formed in the center magnetic leg of the EE-shaped core (CR1, CR2). Thus, the coupling coefficient k between the primary and secondary sides of the isolation converter transformer PIT itself is set to about 0.75, which offers a loose coupling state. That is, the degree of loose coupling is higher compared with that in the power supply circuit shown in FIG. 19 as a conventional technique. The gap G1 can be formed by setting the center legs of the E-shaped cores CR1 and CR2 to be shorter than two outer legs thereof.

In addition, the center leg of the E-shaped core CR3 is set shorter than the outer legs thereof, to thereby form a gap G2 between the end of the center leg of the E-shaped core CR3 and the side face of the E-shaped core CR1. The gap length of the gap G2 is set to half that of the gap G1.

In this manner, the isolation converter transformer PIT shown in FIG. 10 is provided with a complex transformer structure. Specifically, as the basic configuration, the primary and secondary windings N1 and N2 are wound with being isolated from each other in terms of DC transmission. In addition, the choke coil winding N10 provided on the primary side is also wound. In this structure of FIG. 10, The flow of currents through the primary and secondary windings N1 and N2 forms a main magnetic path (magnetic circuit) in the EE-shaped core formed of E-shaped cores CR1 and CR2, while the flow of a current through the choke coil winding N10 forms a main magnetic path only in the E-shaped core CR3. Such formation of magnetic paths yields a very small degree of flux linkage between the magnetic flux of the magnetic path formed by the primary and secondary windings N1 and N2 and the magnetic flux of the magnetic path formed by the choke coil winding N10. As a result, the choke coil winding N10 has a certain inductance dependent upon the number of turns, the gap length of the gap G2, and so on, and the degree of magnetic coupling (coupling coefficient) thereof to the primary and secondary windings N1 and N2 is a very small value that can be regarded as 0. That is, the state is obtained in which the transformer coupling can be regarded as absent between the choke coil winding N10 and the primary and secondary windings N1 and N2. Thus, the isolation converter transformer PIT operates such that the converter transformer function of coupling the primary and secondary windings N1 and N2 and the choke coil function by the choke coil winding N10 do not have an effect on each other but are independent of each other. Accordingly, despite the integration of the primary and secondary windings N1 and N2 and the choke coil winding N10 into one transformer structure, the adequate operation of the class-E switching converter is allowed on the primary side.

As described above, the employment of a complex transformer structure allows the integration of the choke coil L10 into the isolation converter transformer PIT. This integration allows more efficient arrangement of components on a circuit board, which can reduce the size of the circuit board for example.

The characteristics of major parts in the power supply circuit of FIG. 9 are as follows for example. FIG. 11 shows the experimental results on this power supply circuit.

The isolation converter transformer PIT is designed to have the structure in FIG. 10. The EE-shaped core (CR1, CR2) thereof employs an EER-35 core, and the gap length of the gap G1 is set to 2.2 mm. The numbers of turns of the primary winding N1 and the secondary winding N2 are both set to 58 T. Thus, the coupling coefficient k between the primary and secondary sides of the isolation converter transformer PIT itself is set to 0.75.

The E-shaped core CR3 employs an ER-35 core, and the gap G2 is designed to have a gap length of 1.1 mm. Furthermore, the choke coil winding N10 is wound so that the inductance L10 is 1 mH.

As is well known, the above-described EER core is one of types and standards of product cores. It is known that the types also include an EE type. The sectional shapes of cores of the EER and EE types are both an EE-character shape. Therefore, the term EE-shaped core in the present specification encompasses both cores of the EER and EE types.

The capacitance of the primary-side parallel resonant capacitor Cr is set to 1500 pF. The capacitance of the primary-side series resonant capacitor C11 is set to 0.027 µF. The capacitance of the clamp capacitor CCL is set to 0.068 µF.

The allowable load power range is from the maximum load power Pomax of 200 W to the minimum load power Pomin of 0 W (no load). The rated level of the secondary-side DC output voltage Eo is 175 V.

In terms of the switching cycle, the primary winding N1 of the isolation converter transformer PIT and the choke coil L10 in the power supply circuit in FIG. 9 can be equivalently regarded as being connected in parallel to each other. In this case, magnetic flux generated from the choke coil winding N10 is not coupled to the secondary winding N2 of the isolation converter transformer PIT. Accordingly, it could be deemed that the leakage inductance component on the primary side of the isolation converter transformer PIT is increased.

As described above, the coupling coefficient k of the isolation converter transformer PIT itself is set to about 0.75. However, since the leakage inductance on the primary side of the isolation converter transformer PIT is increased, the comprehensive coupling coefficient of the isolation converter transformer PIT in the power supply circuit is lower than 0.75. That is, the comprehensive coupling coefficient between the primary and secondary sides of the isolation converter transformer PIT, in terms of the whole power supply circuit, is set lower than the coupling coefficient k determined by the structure of the isolation converter transformer PIT itself. This comprehensive coupling coefficient is treated as the total coupling coefficient kt here.

In the fourth embodiment, by setting the inductance of the choke coil winding N10 to the above-described certain value for example, the total coupling coefficient kt is set to about 0.7 or less value offering a higher degree of loose coupling. The determinants of the total coupling coefficient kt are the coupling coefficient k dependent upon the structure of the isolation converter transformer PIT itself and the inductance of the choke coil winding N10.

In the present embodiment, the resonant frequency $fo1(p)$ of the primary-side parallel resonant circuit in the power supply circuit in FIG. 9 is treated as follows.

As shown in the waveform diagrams of FIGS. 11A and 11B to be described later, the operation of the primary-side switching converter in the power supply circuit in FIG. 9 can be regarded as a complex between the switching operation of the class-E switching converter (the main switching element Q1) and that of the active clamp circuit 10. In addition, this complex operation can be regarded as equivalent to the state in which one primary-side parallel resonant circuit (hereinafter, a primary-side parallel resonant circuit a) and another parallel resonant circuit (hereinafter, a primary-side parallel resonant circuit b) operate in a complex manner on the primary side. The circuit a is defined as being formed of the capacitance of the primary-side parallel resonant capacitor Cr and the inductance L10 of the primary-side choke coil winding N10. The circuit b is defined as being formed of the clamp capacitor CCL and the inductance L10 of the choke coil winding N10. Furthermore, in the circuit configuration of the present embodiment, the choke coil winding N10 and the primary winding N1 can equivalently be regarded as being connected in parallel to each other, under the condition of AC input with a high frequency nearly equivalent to the switching frequency. Therefore, in practice, the inductance that forms the primary-side parallel resonant circuits a and b should be regarded as a combined inductance arising from the parallel connection between the choke coil winding N10 and the primary winding N1. The inductance L10 of the choke coil winding N10 is about 1 mH as described above. The inductance (leakage inductance) of the primary winding N1 itself is set to about 350 pH. According to this, the resonant frequency $fo1b$ of the primary-side parallel resonant circuit b is about 38 kHz. The resonant frequency $fo1a$ of the primary-side parallel resonant circuit a is about 255 kHz.

The capacitances of the primary-side parallel resonant capacitor Cr and the clamp capacitor CCL are 1500 pF and 0.068 µF, respectively, as described above. Therefore, the capacitance of the clamp capacitor CCL is significantly larger than that of the primary-side parallel resonant capacitor Cr. This relatively large capacitance means that the operation of the primary-side parallel resonant circuit b, which includes the capacitance of the clamp capacitor CCL, is dominant over that of the primary-side parallel resonant circuit a, in the operation of the primary-side switching converter. Accordingly, the parallel resonant frequency $fo1(p)$ of the whole primary-side parallel resonant circuit should be regarded as about 38 kHz, or a slightly higher frequency of about 40 kHz.

The resonant frequency fo1(s) of the primary-side series resonant circuit, formed by the series connection of the primary winding N1 to the primary-side series resonant capacitor C11, is determined by the leakage inductance L1 of the primary winding N1 according to the total coupling coefficient kt and the capacitance of the primary-side series resonant capacitor C11 (0.027 μF), and is about 50.0 kHz.

In addition, the resonant frequency fo2 of the secondary-side series resonant circuit, formed by the series connection of the secondary winding N2 to the secondary-side series resonant capacitor C2, is determined by the leakage inductance L2 of the secondary winding N2 according to the total coupling coefficient kt and the capacitance of the secondary-side series resonant capacitor C2 (0.027 μF), and is about 50.0 kHz.

Thus, the relationship among the resonant frequency fo1(p) of the primary-side parallel resonant circuit, the resonant frequency fo1(s) of the primary-side series resonant circuit, and the resonant frequency fo2 of the secondary-side series resonant circuit can be expressed as fo1(p)<fo1(s)=fo2.

Figure 11A:
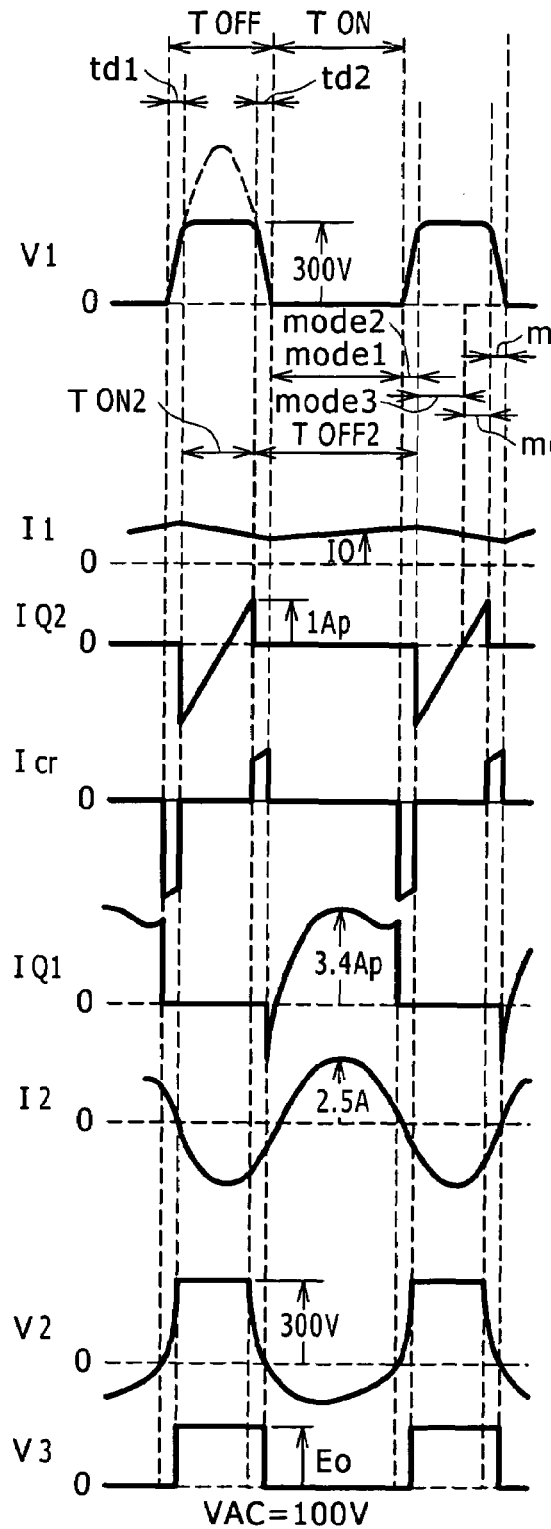
FIGS. 11A and 11B are waveform diagrams showing the operation of major parts in the power supply circuit of the fourth embodiment, with reflecting the corresponding switching cycle.
Figure 11B:
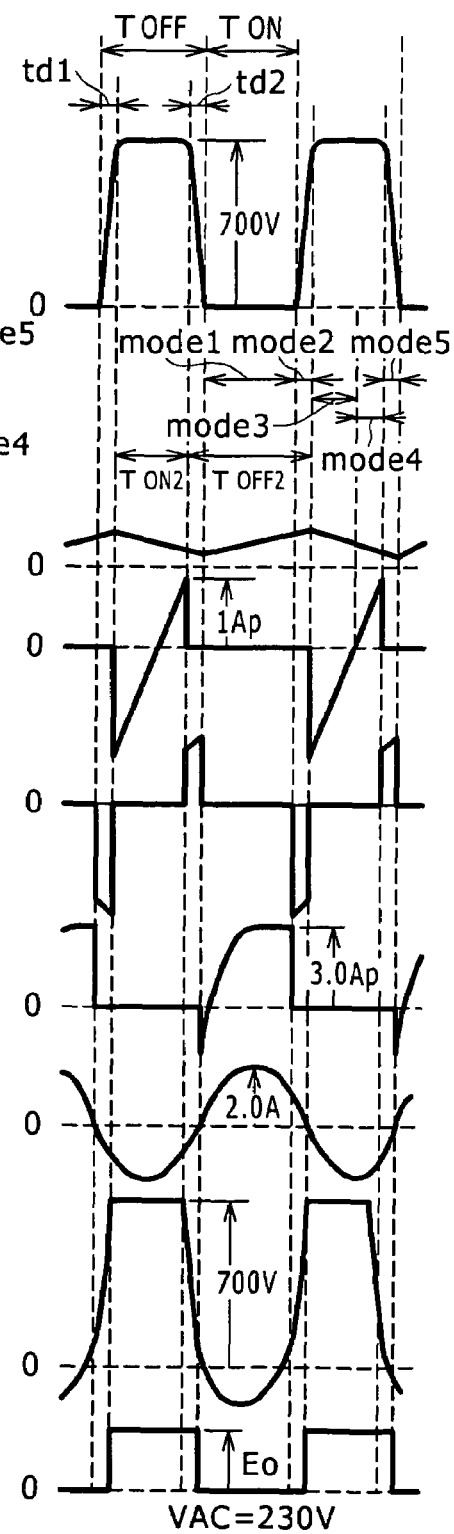

The waveform diagrams in FIGS. 11A and 11B show the operations of major parts in the power supply circuit of FIG. 9 having the above-described configuration, with reflecting the corresponding switching cycle of the switching element Q1. FIG. 11A shows a switching voltage V1, an input current I1, a clamp current IQ2, a current Icr, a switching current IQ1, a primary winding current I2, a primary-side series resonant voltage V2, and a secondary-side alternating voltage V3 when the load power is the maximum load power Pomax of 200 W and the AC input voltage VAC is 100 V. FIG. 11B shows the waveforms of these currents and voltages when the load power is the maximum load power Pomax of 200 W and the AC input voltage VAC is 230 V.

The input current I1 is the current that flows from the smoothing capacitor Ci to the primary-side switching converter. In the line between the positive electrode of the smoothing capacitor Ci and the drain of the switching element Q1, i.e., in the flow path of the input current I1 to the switching element Q1, the choke coil winding N10 having an inductance larger than the leakage inductance L1 of the primary winding N1 is provided. Therefore, the input current I1 flows via the choke coil winding N10. Thus, the input current I1 becomes a ripple current with an average current value of Io. This input current I1 having such a waveform can be regarded as a DC current. That is, in the fourth embodiment, the current flowing from the smoothing capacitor Ci to the switching converter is a DC current. The input current I1 through the choke coil winding N10 flows in a manner of being divided into three components: the series circuit of the primary winding N1 and the primary-side series resonant capacitor C11, the switching element Q1 (and the body diode DD1), and the primary-side parallel resonant capacitor Cr.

The switching voltage V1 is the voltage between the drain and source of the switching element Q1. The switching current IQ1 is the current flowing through the switching element Q1 (and the body diode DD1). The switching voltage V1 and the switching current IQ1 indicate the ON/OFF timings of the switching element Q1. One switching cycle is divided into the period TON during which the switching element Q1 should be in the on-state, and the period TOFF during which it should be in the off-state. The switching voltage V1 has a waveform in which the voltage is at 0 level during the period TON and is a resonant pulse during the period TOFF. The voltage resonant pulse as the switching voltage V1 originally has a sinusoidal resonant waveform since the operation of the primary-side switching converter is voltage resonant operation. However, in the present embodiment, the operation to be described later of the active clamp circuit 10 offers a modified waveform in which the peak of the voltage resonant pulse is suppressed.

The switching current IQ1 is at 0 level during the period TOFF. When the period TOFF ends and the period TON starts, i.e., at the turn-on timing of the switching element Q1, initially the switching current IQ1 flows through the body diode DD1 and therefore has the negative polarity. Subsequently, the switching current IQ1 flows from the drain to the source so that the polarity thereof is inverted to the positive polarity. This waveform of the switching current IQ1 indicates that zero voltage switching (ZVS) and zero current switching (ZCS) are adequately implemented. In addition, the switching current IQ1 can be regarded as a current that flows to the main switching element Q1 via the leakage inductance L1 arising in the primary winding N1 in the isolation converter transformer PIT.

The primary winding current I2 is the current flowing through the primary winding N1 in response to the switching operation of the switching element Q1, and can be regarded as the output current of the primary-side series resonant circuit in this power supply circuit. Specifically, due to the ON/OFF operations of the switching element Q1, a voltage resonant pulse, which is the switching voltage V1 in the period TOFF, is applied to the series circuit of the primary winding N1 and the primary-side series resonant capacitor C11, which form the primary-side series resonant circuit. Thus, the primary-side series resonant circuit implements resonant operation, which causes the primary winding current I2 to have a sinusoidal alternating waveform dependent upon the switching cycle. The primary-side series resonant voltage V2 is the voltage across the primary winding N1. The primary-side series resonant voltage V2 originally has a sinusoidal alternating waveform dependent upon the switching cycle. However, due to the operation of the active clamp circuit 10, the level of the voltage V2 is clamped at almost the same level as the switching voltage V1 in the periods TOFF.

The secondary-side alternating voltage V3 is the voltage across the rectifier diode Do2 on the secondary side, and the voltage between the winding-finish end of the secondary winding N2 and the secondary-side ground. The voltage V3 indicates the operation timings of the secondary-side rectifier circuit. In response to the positive/negative polarity inversion of the voltage induced in the secondary winding N2, a forward voltage is alternately applied to either one of a first diode pair of the rectifier diodes Do1 and Do4 and a second diode pair of the rectifier diodes Do2 and Do3. In response to this voltage application, the first and second diode pairs conduct in turn. Due to the rectifying operation based on such timings, the secondary-side alternating voltage V3 has an alternating waveform in which the voltage is clamped at the level equal to the secondary-side DC output voltage Eo in the conducting periods of the rectifier diodes Do1 and Do4.

In the waveform diagrams of FIGS. 11A and 11B, the operation of the active clamp circuit 10 is indicated with being classified into five-stage operation modes from mode1 to mode5 that sequentially proceed in one switching cycle.

During the period TON when the main switching element Q1 is in the on-state, the active clamp circuit 10 implements the operation mode1. During the period TON, the auxiliary switching element Q2 is in the off-state. That is, the operation mode1 is to keep the auxiliary switching element Q2 at the off-state.

In the operation mode1 (during the period TON), the switching current IQ1 has the above-described waveform. Specifically, immediately after the turn-on of the switching element Q1, the switching current IQ1 flows through the clamp diode DD1 with the negative polarity. Thereafter, the polarity is inverted so that the switching current IQ1 flows in the direction from the drain to the source of the main switching element Q1 with the positive polarity.

During the period when the switching current IQ1 flows with the negative polarity, the clamp diode DD1 conducts since discharging of the primary-side parallel resonant capacitor Cr has finished at the end of a period td2, which is just anterior to the period of the negative switching current IQ1. Thus, the switching output current IQ1 flows via the clamp diode DD1 and the choke coil winding N10 in that order, which regenerates power for the power supply. That is, the period of the negative switching current IQ1 corresponds to a mode of regenerating power for the power supply. After the completion of the power regeneration operation, the input current I1 is supplied from the smoothing capacitor Ci, so that the switching current IQ1 flows between the source and drain of the main switching element Q1.

When the period TON corresponding to the operation mode1 ends and the period TOFF starts, a period td1 corresponding to operation mode2 is initialized.

During the period td1, the main switching element Q1 is turned off, and therefore the current through the primary winding N1 flows as the current Icr shown in FIGS. 11A and 11B to charge the primary-side parallel resonant capacitor Cr. At this time, the charging current that flows to the primary-side parallel resonant capacitor Cr has a pulse-like waveform of the negative polarity in the diagrams. This pulse waveform is due to the operation of a partial resonant mode. In addition, at this time, the main switching element Q1 is turned off by ZVS since the primary-side parallel resonant capacitor Cr is connected in parallel to the main switching element Q1.

Subsequently to the period td1, a period starts in which the auxiliary switching element Q2 is turned on while the main switching element Q1 is kept at the off-state. This period corresponds to a period TON2 shown in FIGS. 11A and 11B.

This period TON2 is the period during which the active clamp circuit 10 operates. During the period TON2, initially operation mode3 is carried out, which is then followed by operation mode4.

Due to the foregoing operation mode2, the primary-side parallel resonant capacitor Cr is charged by the current Icr flowing from the connecting node between the primary winding N1 and the choke coil winding N10 to the primary-side parallel resonant capacitor Cr. Thus, in the operation mode3 subsequent to the operation mode2, the voltage level (V2) of the primary winding N1 is equal to or higher than the voltage level across the clamp capacitor CCL at the initial timing (at the start of the period TON2). This voltage level is high enough that the clamp diode DD2 connected in parallel to the auxiliary switching element Q2 conducts. Thus, a current flows through the clamp diode DD2 and the clamp capacitor CCL in that order. Accordingly, the clamp current IQ2 has a sawtooth waveform in which the voltage level rises with time from a negative level toward 0 after the start of the period TON2 shown in FIGS. 11A and 11B.

As described above, the capacitance of the clamp capacitor CCL is 0.068 μF, while the capacitance of the primary-side parallel resonant capacitor Cr is 1500 pF, for example. Therefore, the capacitance of the primary-side parallel resonant capacitor Cr is considerably smaller than that of the clamp capacitor CCL. Due to such selection of the capacitances of the clamp capacitor CCL and the primary-side parallel resonant capacitor Cr, most of the current flows to the clamp capacitor CCL as the clamp current IQ2 while almost no current flows to the primary-side parallel resonant capacitor Cr, in the operation mode3. As a result, the amount of charging current to the primary-side parallel resonant capacitor Cr during the period TON2 is reduced. Therefore, the slope of the voltage resonant pulse as the switching voltage V1 is made gentler, which suppresses the peak level of the switching voltage V1. That is, clamp operation for the voltage resonant pulse is achieved.

In contrast, if the configuration in FIG. 9 has no active clamp circuit 10, charging and discharging currents flow during the entire period TOFF. Therefore, the voltage resonant pulse has a steep sinusoidal waveform like the dashed line of the switching voltage V1 in FIG. 11A. The peak level of this voltage resonant pulse is higher than that in a configuration including the active clamp circuit 10.

After the end of the operation mode3 in the period TON2, the operation sequence moves to the operation mode4.

The start timing of the operation mode4 is equivalent to the timing at which the flow direction of the clamp current IQ2 shown in FIGS. 11A and 11B is inverted from the negative direction to the positive direction. At the timing of the polarity inversion of the clamp current IQ2 from the negative polarity to the positive polarity, the auxiliary switching element Q2 is turned on by ZVS and ZCS.

In the state in which the auxiliary switching element Q2 thus conducts, the resonant operation obtained at this time by the primary-side parallel resonant circuit allows the clamp current IQ2 to flow via the primary winding N1 and the clamp capacitor CCL in that order, and thus flow from the drain to the source of the auxiliary switching element Q2. Therefore, the clamp current IQ2 has a waveform in which the positive current level increases with time as shown in FIGS. 11A and 11B.

The voltage applied to the gate of the auxiliary switching element Q2 is the voltage induced in the drive winding Ng, although not shown in the drawings. This voltage is a rectangular waveform pulse voltage.

The periods td1 and td2 correspond to threshold periods during which both the main switching element Q1 and the auxiliary switching element Q2 are in the off-state. These threshold periods are kept by the flow of the gate-flowing current.

The operation mode4 is completed at the start timing of rise up of the voltage across the auxiliary switching element Q2. Before the rise up, this voltage is at 0 level in the period TOFF since the auxiliary switching element Q2 conducts. Subsequent to the operation mode4, the operation sequence moves to operation mode5 implemented during the period td2.

In the operation mode5, a discharging current flows from the primary-side parallel resonant capacitor Cr via the, choke coil winding N10 to the smoothing capacitor Ci. That is, partial resonant operation is achieved. In FIGS. 11A and 11B, this discharging as the partial resonant operation is indicated by the current Icr flowing from the primary-side parallel resonant capacitor Cr, as a pulse waveform current of the positive polarity flowing only during the period td2. During the period td2, the voltage resonant pulse of the switching voltage V1 applied to the main switching element Q1 has a steep slope since the capacitance of the primary-side parallel resonant capacitor Cr is smaller than that of the clamp capacitor CCL also as described above. Therefore, in the period td2, the voltage level rapidly falls down toward 0 as shown in the waveform diagrams.

At the start timing of the operation mode5 after the end of the operation mode4, the turn off of the auxiliary switching element Q2 is initialized. This turn off operation is carried out based on ZVS since the voltage resonant pulse (the switching voltage V1) falls down with a certain slope.

The active clamp circuit 10 sequentially implements the above-described operations mode1 to mode5 in each one switching cycle.

The constant-voltage control operation of the power supply circuit in FIG. 9 is based on switching frequency control in which the switching frequency fs is controlled by varying the length of the period TON during which the main switching element Q1 is in the on-state, with the length of the period TOFF during which it is in the off-state (the ON period of the auxiliary switching element Q2) being kept constant. For load variation, the switching frequency fs increases as the load becomes lighter. For AC input voltage variation, the switching frequency fs increases as the AC input voltage VAC becomes higher. This frequency change tendency indicates that, in the constant-voltage control operation, the switching frequency fs is made higher when the secondary-side DC output voltage Eo is increased in response to a load decrease and an AC input voltage increase.

For the load power variation range from the maximum load power Pomax of 200 W to the minimum load power Pomin of 0 W, the control range of the switching frequency fs required for the constant-voltage control (requisite control range Lfs) is 17.3 kHz when the AC input voltage VAC is 100 V. When the AC input voltage VAC is 230 V, the requisite control range Lfs is 11.8 kHz for the same load power range.

In the circuit of FIG. 9, there is a tendency that a heavier load and a higher AC input voltage VAC provide a higher AC to DC power conversion efficiency ($\eta AC \rightarrow DC$).

The measurement results on the AC to DC power conversion efficiencies ($\eta AC \rightarrow DC$) when the load power was the maximum load power Pomax of 200 W were as follows: the efficiency QAC,DC was 92.2% when the AC input voltage VAC was 100 V, and the efficiency RIAC-DC was 91.5% when the AC input voltage VAC was 230 V.

The peak level (V1$p$) of the voltage resonant pulse (V1) increases as the load becomes heavier. This peak level increase corresponds to the increase of amount of current charged in the primary-side parallel resonant capacitor Cr in reponse to the increase of amount of current flowing through the switching converter due to the load power increase. The measurement results were obtained about the peak levels (V1$p$) of the voltage resonant pulse (V1) when the load power was the maximum load power Pomax of 200 W, which offered the maximum peak levels. Specifically, as shown in FIGS. 11A and 11B, the peak level V1$p$ was about 300 V when the AC input voltage VAC was 100 V, and the peak level V1$p$ was about 700 V when the AC input voltage VAC was 230 V. These peak levels (V1$p$) are about half those in a configuration having no active clamp circuit 10.

Since the peak level V1$p$ of the voltage resonant pulse (V1) takes these values, a product of which breakdown voltage is 900 V can be used as the main switching element Q1. In addition, also as the auxiliary switching element Q2, a product of which breakdown voltage is 900 V can be used similarly. In contrast, if the active clamp circuit 10 is absent in the power supply circuit of FIG. 9, there is a need to use a product of which breakdown voltage is about 1800 V as the switching element Q1 for example. That is, in the present embodiment, lower-breakdown-voltage parts can be selected as the main switching element Q1 (and the auxiliary switching element Q2), the primary-side parallel resonant capacitor Cr connected in parallel to the main switching element Q1, and so on.

Since low-breakdown-voltage products can be thus selected as the respective parts, the characteristics of these parts can be enhanced. For example, the switching characteristic of the main switching element Q1 is further improved, which reduces power loss and improves the circuit reliability. In addition, low-breakdown-voltage parts have small sizes, which can promote size and weight reductions of circuit boards. Moreover, costs of parts can be reduced.

In addition, the voltage-clamp operation by the active clamp circuit 10 in the fourth embodiment involves no problems of the occurrence of ringing and the need for impedance adjustment unlike the voltage-clamp methods described above with FIGS. 17 and 18. Therefore, the fourth embodiment achieves an advantage of suppressing the switching voltage (voltage resonant pulse) practically and effectively.

It has been confirmed based on experiments that, if a power supply circuit with a conventional configuration like that in FIG. 19 is provided with an active clamp circuit 10 similar to that of the fourth embodiment for comparison with the fourth embodiment, the power supply circuit shows the following characteristic. Specifically, the switching frequency fs is made higher as the load becomes lighter. In addition, when the load becomes lighter, the duty ratio between the periods TON and TOFF within one switching cycle changes in such a manner that the period TOFF is extended in combination with the shortening of the period TON. This extension of the period TOFF is equivalent to the enlargement of conduction angle of the voltage resonant pulse (V1) due to the suppression of the peak level thereof by the active clamp circuit 10.

The capacitance of the clamp capacitor CCL is set considerably larger than that of the primary-side parallel resonant capacitor Cr as described above. A larger difference between the capacitances of these capacitors CCL and Cr offers a higher degree of suppression of the voltage resonant pulse. However, in the conventional configuration, this larger degree of peak suppression yields a larger increase of the conduction angle of the voltage resonant pulse (V1). When the conduction angle of the voltage resonant pulse (V1) in one switching cycle is increased, that is, when the period (TOFF) during which the main switching element Q1 is in the off-state is extended, the ON period (TON) of the main switching element Q1 is correspondingly further shortened. If the extent of shortening of the ON period (TON) exceeds a certain level, switching loss in the main switching element Q1 increases.

In contrast, in the fourth embodiment, the active clamp circuit 10 is combined with a switching converter that implements class-E switching operation. Therefore, also as described above, the switching frequency fs is changed in such a manner that the period TON of the switching element Q1 is varied while the period TOFF thereof is kept constant. That is, the shortening of the period TON associated with the extension of the period TOFF is not caused. Accordingly, the fourth embodiment allows reduction of switching loss. As a result, the above-described favorable AC to DC power conversion efficiency ($\eta AC \rightarrow DC$) is achieved.

Furthermore, since such switching frequency control operation that the period TOFF of the switching element Q1 is kept constant is achieved as described above, an inexpensive general-purpose IC can be selected as the switching drive IC in the oscillation and drive circuit 2, which allows cost reduction for example. Moreover, the flexibility in choice of the switching drive IC is enhanced. If the switching frequency control is PWM control of changing the time ratio between the periods TON and TOFF in one switching cycle like the conventional power supply circuit of FIG. 19, the use of a general-purpose IC cannot deal with this PWM control, which causes inadequate operation near abnormal oscillation. In an actual circuit of FIG. 19, therefore, a switching drive IC compatible with the PWM control is used.

It has been confirmed that the abnormal operation associated with an intermediate load in the power supply circuit of FIG. 19 is readily caused when the circuit has a complex resonant converter in which a voltage resonant converter is combined with a secondary-side series resonant circuit. Such abnormal operation is mainly attributed to the interaction between the primary-side parallel resonant circuit that forms the voltage resonant converter and the secondary-side series resonant circuit (rectifier circuit), due to the simultaneous operation thereof.

The fourth embodiment therefore is constructed based on an expectation that the above-described abnormal operation in response to an intermediate load is attributed to the circuit configuration itself having the combination between the primary-side voltage resonant converter and the secondary-side series resonant circuit.

Based on this expectation, the fourth embodiment has a configuration to which a class-E switching converter is applied as the primary-side switching converter instead of a voltage resonant converter.

In addition, by setting the total coupling coefficient kt to a value smaller than 0.7, the coupling degree between the primary and secondary sides of the isolation converter transformer PIT is lowered than conventional values. This low coupling degree attenuates the interaction between the operation of the primary-side switching converter and the rectifying operation (switching operation) of the secondary-side rectifier circuit.

The power supply circuit having such a configuration showed an experimental result that the abnormal operation in which ZVS is not achieved when the load is an intermediate load is eliminated irrespective of the presence or absence of a series resonant circuit on the secondary side. Specifically, the phenomenon shown in e.g. FIG. 20B in which the positive switching current IQ1 flows around the end timings of the period TOFF is eliminated, and a waveform of the switching current IQ1 corresponding to normal ZVS is achieved.

When a power supply circuit includes a bridge full-wave rectifier circuit as its secondary-side rectifier circuit like the circuit in FIG. 9, a current flows through the secondary winding N2 in each of the periods of positive/negative polarities of the voltage induced therein. When a rectifier circuit implements such rectifying operation, the formation of a secondary-side series resonant circuit by the connecting of a secondary-side series resonant capacitor C2 offers advantages of an increase of power due to the resonant operation of this secondary-side series resonant circuit, and so on. As a result, the power conversion efficiency is enhanced compared with a circuit that does not include a secondary-side series resonant circuit.

In addition, in the power supply circuit of the fourth embodiment shown in FIG. 9, the absence of abnormal operation associated with an intermediate load is ensured not only when the AC input voltage VAC is in the voltage range of AC 100 V-system commercial power supplies but also when it is in the range of AC 200 V-system commercial power supplies.

Furthermore, in the power supply circuit of the fourth embodiment in FIG. 9, the current that flows from the smoothing capacitor Ci into the switching converter passes through the choke coil winding N10, and then reaches the switching element Q1, the primary-side parallel resonant capacitor Cr, and the primary-side series resonant circuit (N1-C11). Therefore, the current flowing from the smoothing capacitor Ci to the switching converter becomes a DC current as indicated by the input current I1 of FIGS. 11A and 11B. Since the current flowing from the smoothing capacitor Ci to the switching converter is a DC current, the fourth embodiment does not involve the above-described problems of lowering of the electrostatic capacitance and an increase of the tangent of the loss angle, and therefore allows use of a general-purpose aluminum electrolytic capacitor as the smoothing capacitor Ci.

In addition, in the power supply circuit of the fourth embodiment, the total coupling coefficient kt between the primary and secondary sides of the isolation converter transformer PIT is set to about 0.65. The total coupling coefficient kt arises from the synthesis between the coupling coefficient k of the isolation converter transformer PIT itself and a pseudo increase of the leakage inductance of the primary winding N1 due to the equivalent parallel connection between the primary winding N1 and the choke coil L10.

For example, when achievement of a total coupling coefficient kt of about 0.65 is intended in the configuration shown in FIG. 19, the coupling coefficient k of the isolation converter transformer PIT itself needs to be about 0.65. When the isolation converter transformer PIT has the configuration shown in e.g. FIG. 2, the gap G in the core needs to be enlarged compared with the fourth embodiment in order to obtain this coupling coefficient. However, since the increase of the gap length is a factor in increasing loss due to eddy currents (eddy-current loss), the excess enlargement of the gap is unfavorable and possibly causes considerable power loss due to the eddy-current loss depending on conditions.

In the present embodiment, a total coupling coefficient kt of about 0.65 is obtained by the pseudo increase of the leakage inductance of the primary winding N1 as described above. Therefore, the coupling coefficient k of the isolation converter transformer PIT itself can be set to about 0.75. Accordingly, excess enlargement of the gap length of the gap G formed in the core of the isolation converter transformer PIT can be avoided, so that there is no need to take the eddy-current loss into consideration.

As described above, in the power supply circuit of the fourth embodiment, the coupling coefficient k of the isolation converter transformer PIT itself is set higher than the total coupling coefficient in terms of suppression of eddy-current loss in the isolation converter transformer PIT. Nevertheless, this coupling coefficient is considerably lower than that of a conventional power supply circuit like that in FIG. 19, which has a coupling coefficient k of about 0.80 to 0.85.

Avoided in conventional voltage resonant converters is the enhancement of degree of loose coupling to such an extent as to yield a coupling coefficient k near the coefficient of the isolation converter transformer PIT itself of the present embodiment. This is because such loose coupling causes lowering of the power conversion efficiency due to an increase of power transmission loss from the primary side to the secondary side.

Furthermore, if the choke coil L10 having a comparatively large inductance is provided in the line through which a DC input voltage is applied to the switching converter, corresponding power loss arises.

However, in the present embodiment, favorable power conversion efficiencies are achieved over almost the entire allowable load power range also as described above.

The reason for this high power conversion efficiency of the fourth embodiment is as follows.

It is known that a power supply circuit including a voltage resonant converter is originally advantageous for obtaining a high power conversion efficiency. In particular, when a single-ended system is employed for a voltage resonant converter and thus the number of switching elements is one, which is the required minimum number, switching loss of the converter is smaller compared with configurations including plural switching elements, such as a half-bridge connection system, a full-bridge connection system, and a push-pull system. This small switching loss leads to the enhancement of the power conversion efficiency.

The class-E switching converter of the present embodiment includes a primary-side parallel resonant circuit combined with a one-transistor switching element, and therefore also has a single-ended voltage resonant converter. Thus, the class-E switching converter also has a favorable power conversion efficiency characteristic due to the voltage resonant converter.

Figure 20C:
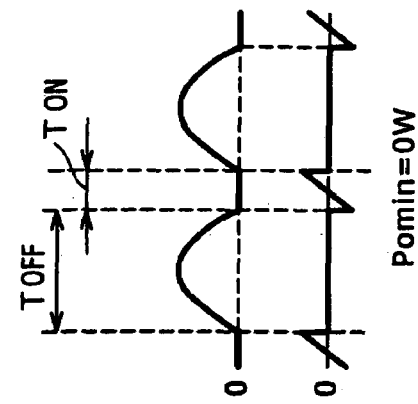
FIGS. 20A to 20C are waveform diagrams showing the operations of major parts in the power supply circuit shown in FIG. 19.
Figure 20B:
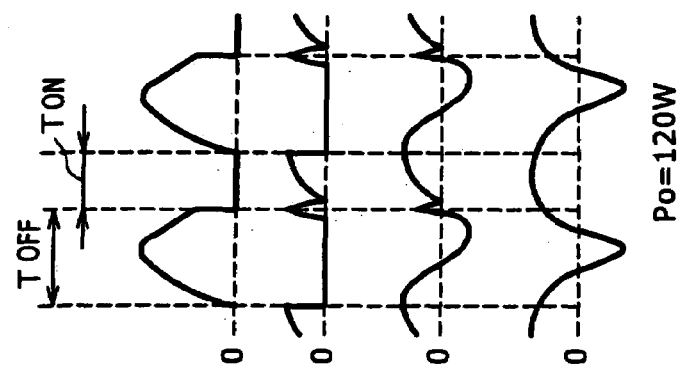
Figure 20A:
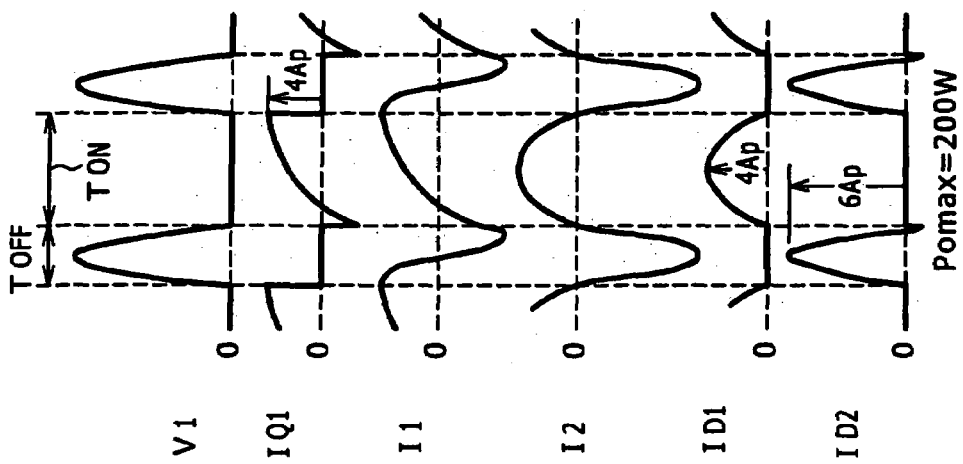
Figure 21:
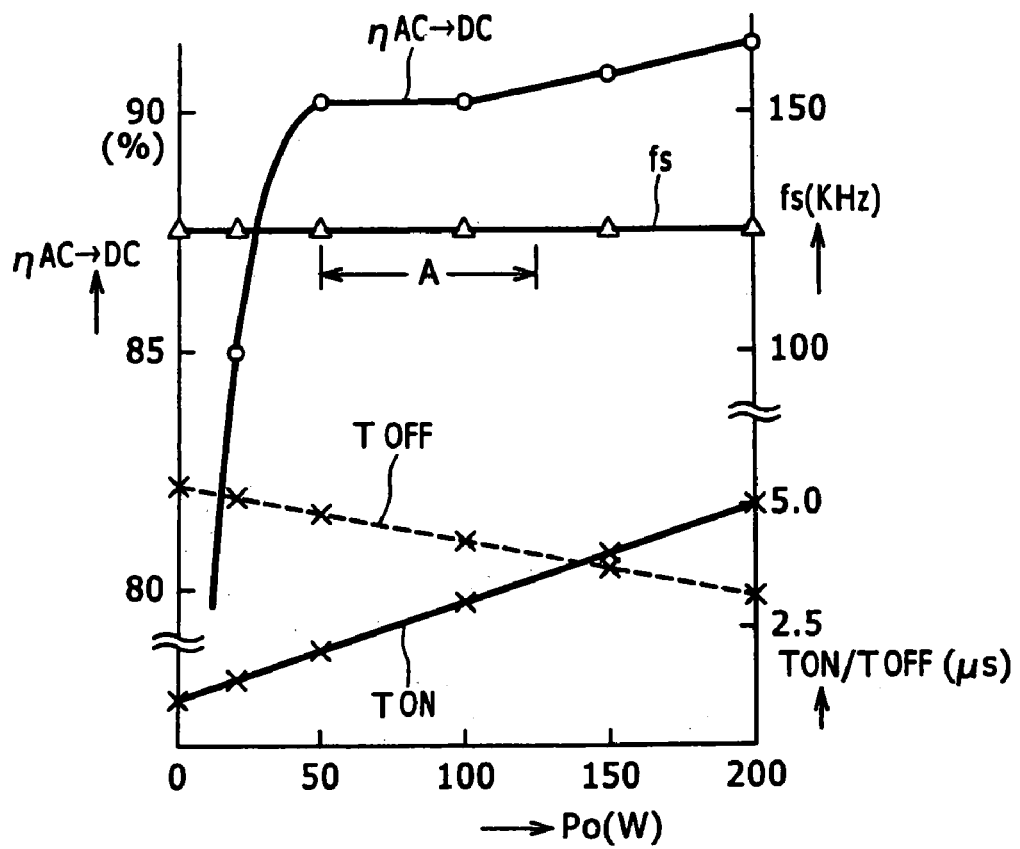
FIG. 21 is a diagram showing, as functions of the load, the variation characteristics of the AC to DC power conversion efficiency, the switching frequency, and the lengths of ON and OFF periods of a switching element, regarding the power supply circuit in FIG. 19.
Figure 22:
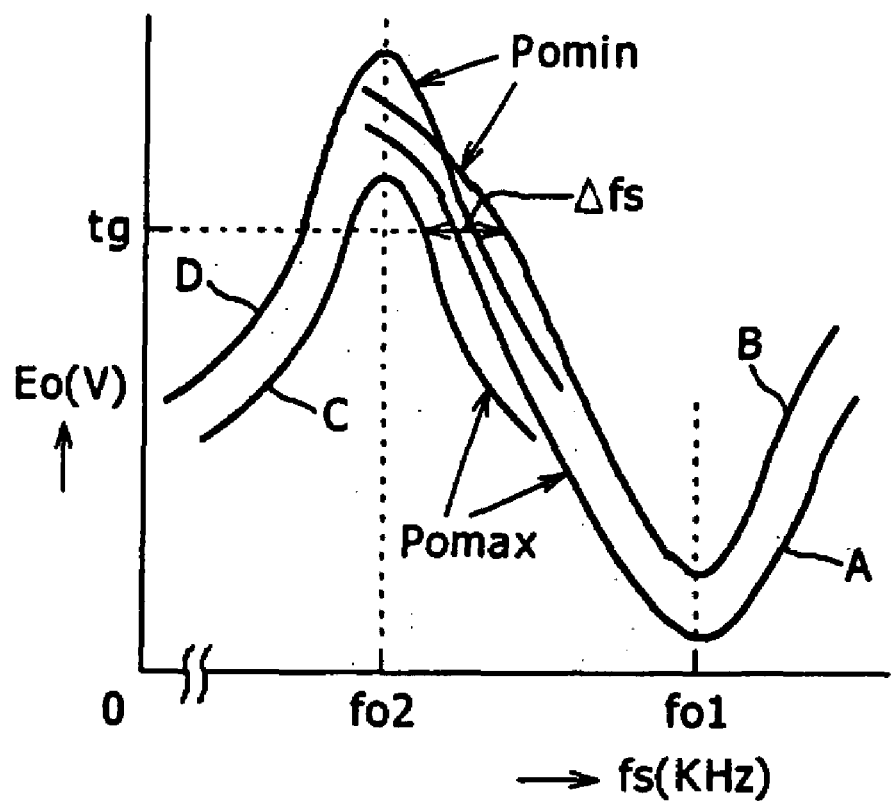
FIG. 22 is a diagram conceptually showing the constant-voltage control characteristic of a conventional power supply circuit.

In addition, the present embodiment eliminates the occurrence of abnormal operation associated with an intermediate load, to thereby allow adequate ZVS operation as described above. In this abnormal operation phenomenon, the switching element Q1 is turned on and the positive switching current IQ1 flows between the source and drain thereof before the original turn-on timing of the switching element Q1 (the start timing of the period TON), as shown in FIG. 20B. Such operation of the switching current IQ1 increases switching loss. The present embodiment prevents the occurrence of the abnormal operation of the switching current IQ1, and thus eliminates the increase of switching loss. This feature is also one factor in the enhancement of the power conversion efficiency.

The waveform of the switching current IQ1 shown in FIG. 11A indicates that the level of the switching current IQ1 at the turn-off timing of the switching element Q1 is suppressed. If the level of the switching current IQ1 at the turn-off timing is suppressed, the switching loss at the turn-off timing is correspondingly reduced, which enhances the power conversion efficiency.

Such a waveform of the switching current IQ1 is due to the class-E switching operation of the primary-side switching converter.

Furthermore, the constant-voltage control operation of the power supply circuit of the fourth embodiment is based on switching frequency control in which the length of the OFF periods (TOFF) of the switching element Q1 is fixed as described above. This switching frequency control also significantly contributes to the enhancement of the power conversion efficiency in the fourth embodiment.

Moreover, the above description shows that the power supply circuit of the fourth embodiment is allowed to have a so-called wide-range compatible configuration that can operate in response both to commercial AC voltage inputs of the AC 100-V system and AC 200-V system (e.g., VAC is from 85 V to 264 V).

Specifically, as described above, the control range ($\Delta fs$) of the switching frequency fs required for constant-voltage control in the power supply circuit of the present embodiment is very small: $\Delta fs$ is 17.3 kHz when the AC input voltage VAC is 100 V (AC 100 V-system input), and $\Delta fs$ is 11.8 kHz when it is 230 V (AC 200 V-system input). The actual frequency values corresponding to these control ranges ($\Delta fs$) sufficiently fall within the switching frequency variable range of present switching drive ICs (the oscillation and drive circuit 2). That is, the power supply circuit of the present embodiment can keep its output voltages constant by switching frequency control, in response both to commercial AC voltage inputs of the AC 100 V-system and AC 200 V-system.

Furthermore, in the power supply circuit of the present embodiment, high power conversion efficiencies of 91.5% or more are achieved when the load power is the maximum load power, both for commercial AC voltage inputs of the AC 100 V-system and for inputs of the AC 200 V-system.

Moreover, in the present embodiment, the abnormal operation associated with an intermediate load is eliminated both for commercial AC voltage inputs of the AC 100 V-system and AC 200 V-system.

In addition, since the present embodiment includes the active clamp circuit 10 to thereby suppress the peak level of the switching voltage V1, practical products of which breakdown voltage is about e.g. 900 V can be selected as major parts in the power supply circuit even under the condition of a commercial AC voltage input of the AC 200 V-system.

In this manner, the power supply circuit of the fourth embodiment can be put into practical use as a wide-range compatible circuit.

As a configuration for achieving a wide-range compatible circuit as a switching power supply circuit including a resonant converter, besides the configuration of the fourth embodiment, a configuration has been known in which the configuration of a primary-side switching converter is switched between a half-bride configuration and a full-bridge configuration depending on which of an AC 100 V-system input and an AC 200 V-system input a commercial AC voltage input is. In addition, another configuration is also known in which the operation of a rectifier circuit for rectifying a commercial AC voltage is switched between full-wave rectification and voltage-doubling rectification depending on which of an AC 100 V-system input and an AC 200 V-system input a commercial AC voltage input is.

However, the switch over of a circuit configuration in response to a change between the AC 100 V-system and AC 200 V-system involves the following problem.

In order to switch the circuit configuration according to a commercial AC voltage level, for example, the threshold value of an input voltage (e.g. 150 V) is set in advance, and the circuit configuration is switched to a configuration for the AC 200 V-system when an input voltage is higher than the threshold value, and to one for the AC 100 V-system when it is lower than the threshold value. However, such simple switching possibly causes a problem. For example, when an AC 200 V-system input is used, in response even to temporary lowering of an AC input voltage level due to an instantaneous power failure or the like, switching to the configuration for the AC 100 V-system is possibly carried out. Specifically, in a configuration for switching rectifying operation for example, there is a possibility that, even when an AC 200 V-system input is used, a determination is made that an AC 100 V-system input is used and thus switching to a voltage-doubler rectifier circuit is carried out, which breaks switching elements and so on due to overvoltage.

Therefore, in practice, in order to prevent the occurrence of the above-described malfunction, a configuration is employed that detects not only a DC input voltage to a main switching converter but also a DC input voltage to a converter circuit on the standby power supply side.

However, in order to detect a voltage to a converter circuit on the standby power supply side, e.g. a comparator IC for comparing a reference voltage with an input voltage needs to be provided. Accordingly, the number of parts increases, which facilitates an increase of circuit fabrication costs and the size of a circuit board.

In addition, since a DC input voltage of a converter on the standby power supply side needs to be detected for preventing malfunction, practical use of a power supply circuit is limited to use for an electronic apparatus that has a standby power supply in addition to a main power supply. That is, the kind of electronic apparatuses for which a power supply circuit can be used is limited to one including a standby power supply, which problematically narrows the application range of a power supply circuit correspondingly.

Furthermore, in a configuration that implements switch over between half-bridge and full-bridge configurations, at least four switching elements need to be provided in order to allow the full-bridge configuration. If this switch over is unnecessary, it is enough for the circuit to include only a half-bridge configuration, which needs only two switching elements. In contrast, if the circuit employs this switch over, additional two switching elements are required.

In addition, a configuration that implements switch over of rectifying operation needs to include two smoothing capacitors Ci in order to ensure voltage-doubling rectifying operation. That is, compared with a configuration that implements only full-wave rectification, additional one smoothing capacitor Ci is required.

Also from a viewpoint of these additional parts necessities, a wide-range compatible configuration achieved by the above-described circuit switch over causes an increase of circuit fabrication costs and the size of a power supply circuit board. In particular, since the smoothing capacitor Ci falls in the category of large-size parts among parts of a power supply circuit, the configuration implementing switch over of rectifying operation further facilitates an increase of the board size.

In contrast, if a wide-range compatible circuit is allowed by the circuit configuration of the present embodiment, there is no need to employ a configuration like the above-described ones that switch, regarding rectifier circuitry for generating a DC input voltage (Ei), rectifying operation or the type of the switching converter between half-bridge connection and full-bridge connection, according to the rated level of a commercial AC voltage.

If the configuration for switch over of circuitry is unnecessary, the number of e.g. the smoothing capacitors Ci can be only one, and the number of switching elements can be at least only two, requisite for ensuring half-bridge connection. Accordingly, reduction of circuit component parts and circuit scale, lowering of switching noises, and so on can be achieved.

Moreover, if the configuration for switch over of circuitry is unnecessary, the need to provide a special configuration for preventing malfunction associated with the switch over is also eliminated. This respect also suppresses an increase of component parts and costs. Furthermore, since an electronic apparatus does not need to have a standby power supply to prevent malfunction, the range of apparatuses allowing use of a power supply circuit therefor can be widened.

The number of minimum necessary parts that should be added to a conventional voltage resonant converter, which includes a parallel resonant circuit only on its primary side, in order to achieve the advantages of the present embodiment, is only one: a secondary-side parallel resonant capacitor. Therefore, a wide-range compatible configuration can be achieved with a much lower number of additional parts than a power supply circuit employing a conventional configuration based on switch over of circuitry.

Figure 12A:
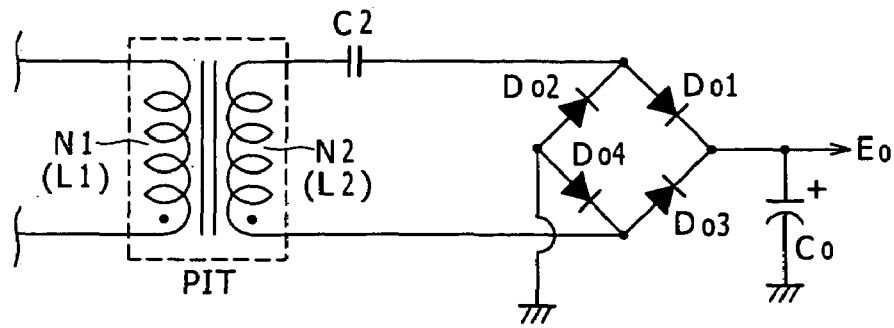
FIGS. 12A and 12B are circuit diagrams showing configuration examples as modifications of the secondary side corresponding to the second to fourth embodiments.
Figure 12B:
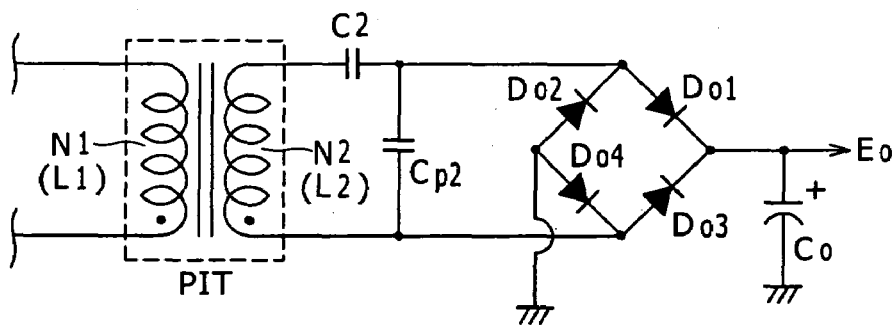
Figure 13A:
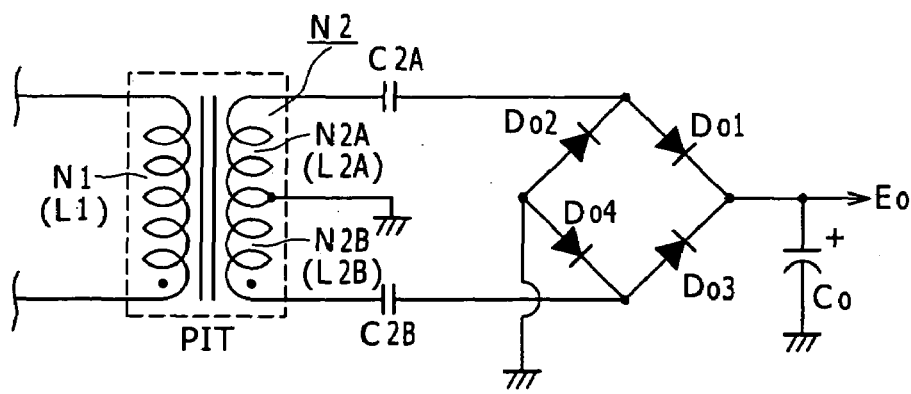
FIGS. 13A and 13B are circuit diagrams showing configuration examples as modifications of the secondary side corresponding to the second to fourth embodiments.
Figure 13B:
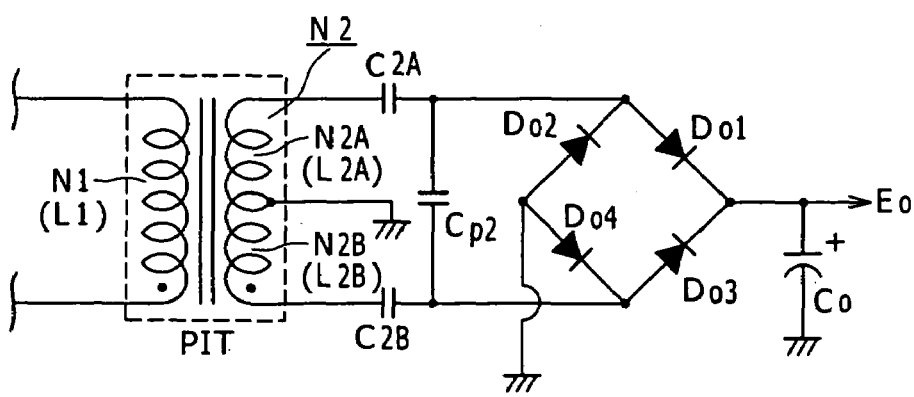
Figure 14A:
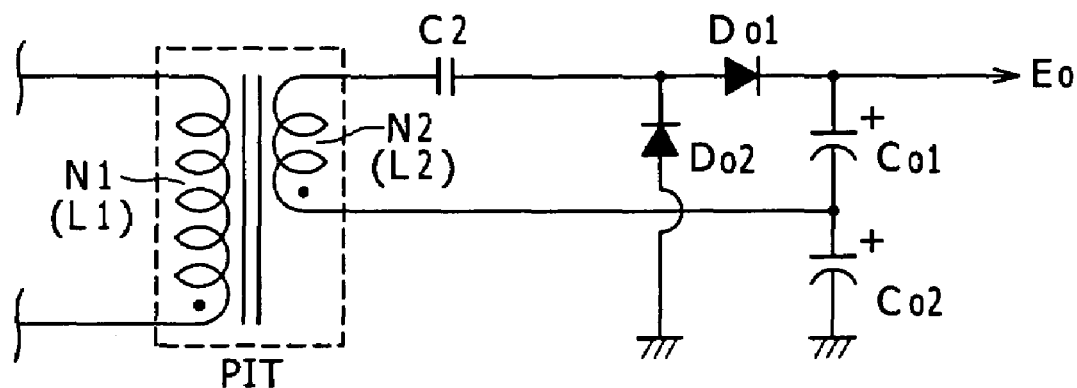
FIGS. 14A and 14B are circuit diagrams showing configuration examples as modifications of the secondary side corresponding to the second to fourth embodiments.
Figure 14B:
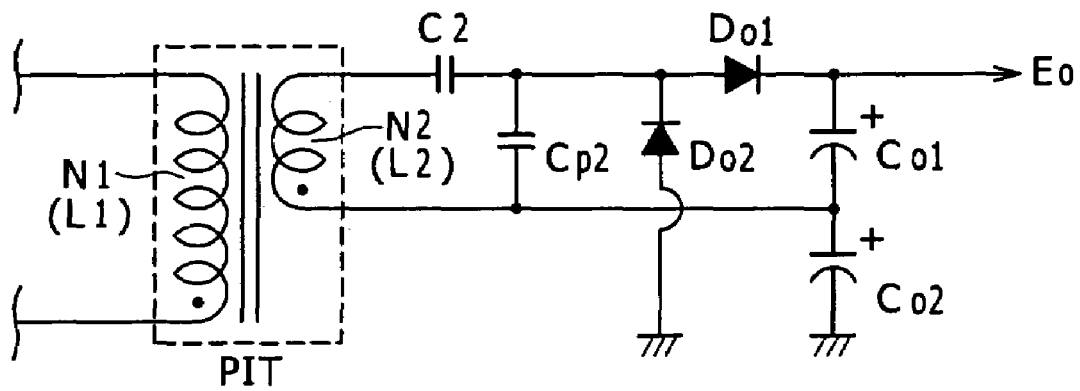

Variations of a secondary-side rectifier circuit as modifications of the second to fourth embodiments will be described below with reference to FIGS. 12A to 14B. FIGS. 12A and 12B illustrate a first modification. FIGS. 13A and 13B illustrate a second modification. FIGS. 14A and 14B illustrate a third modification.

The circuit diagram of FIG. 12A shows a configuration example of the secondary side as the first modification corresponding to the second embodiment. The circuit diagram of FIG. 12B shows a configuration example of the secondary side as the first modification corresponding to the third embodiment.

An isolation converter transformer PIT in the first modification has a structure similar to that shown in FIG. 2 or FIG. 10, and the coupling coefficient k of the isolation converter transformer PIT itself is set to about 0.75. Due to the equivalent parallel connection between a primary winding N1 and a choke coil L10, the total coupling coefficient kt between the primary and secondary sides of the isolation converter transformer PIT is about 0.65. These respects also apply to the power supply circuits in FIGS. 13A, 13B, 14A and 14B to be described later.

Turning now to FIG. 12A, the power supply circuit includes a bridge full-wave rectifier circuit formed of four rectifier diodes Do1, Do2, Do3 and Do4, and one smoothing capacitor Co, as a secondary-side rectifier circuit coupled to the series circuit (secondary-side series resonant circuit) of a secondary winding N2 and a secondary-side series resonant capacitor C2.

The winding-finish end of the secondary winding N2 is coupled via the secondary-side series resonant capacitor C2 to the connecting node between the anode of the rectifier diode Do1 and the cathode of the rectifier diode Do2. The winding-start end of the secondary winding N2 is coupled to the connecting node between the anode of the rectifier diode Do3 and the cathode of the rectifier diode Do4. The cathodes of the rectifier diodes Do1 and Do3 are connected to the positive electrode of the smoothing capacitor Co. The negative electrode of the smoothing capacitor Co is coupled to the connecting node between the anode of the rectifier diode Do2 and the anode of the rectifier diode Do4, at the secondary-side ground potential.

In the thus formed full-wave rectifier circuit, during the periods of half cycles of one polarity (hereinafter, one half cycles) of the alternating voltage induced (excited) in the secondary winding N2, the pair of the rectifier diodes Do1 and Do4 in the bridge rectifier circuit conduct to thereby charge the smoothing capacitor Co with the rectified current. In contrast, during the periods of half cycles of the other polarity (hereinafter, the other half cycles) of the alternating voltage induced in the secondary winding N2, the pair of the rectifier diodes Do2 and Do3 conduct to thereby charge the smoothing capacitor Co with the rectified current.

Due to these operations, generated across the smoothing capacitor Co is the secondary-side DC output voltage Eo having the level equal to that of the alternating voltage induced in the secondary winding N2.

The circuit shown in FIG. 12B has a configuration obtained by adding a secondary-side partial voltage resonant capacitor Cp2 to the secondary-side configuration of FIG. 12A. The secondary-side partial voltage resonant capacitor Cp2 is connected in parallel to the series circuit of a secondary winding N2 and a secondary-side series resonant capacitor C2. Thus, the leakage inductance of the secondary side of an isolation converter transformer PIT and the capacitance of the secondary-side partial voltage resonant capacitor Cp2 form a secondary-side partial voltage resonant circuit. Due to the partial resonant operation of the secondary-side partial voltage resonant circuit, at the turn-on/turn-off timings of the respective pairs of rectifier diodes (Do1, Do4) and (Do2, Do3), a current that is originally directed to these rectifier diodes flows to the secondary-side partial voltage resonant capacitor Cp2, which reduces switching loss at the rectifier diodes Do1, Do2, Do3 and Do4.

FIG. 13A shows the configuration as the second modification corresponding to the second or fourth embodiment. This circuit includes a voltage-doubler full-wave rectifier circuit as its secondary-side rectifier circuit.

In the voltage-doubler full-wave rectifier circuit, a secondary winding N2 is provided with a center tap, and thus the secondary winding N2 is divided into secondary winding portions N2A and N2B on either side of t h e center tap. The secondary winding portions N2A and N2B have the same certain number of turns. The center tap of the secondary winding N2 is coupled to the secondary-side ground.

One end of the secondary winding N2 in the secondary winding portion N2A is connected in series to a secondary-side series resonant capacitor C2A. The other end of the secondary winding N2 in the secondary winding portion N2B is connected in series to a secondary-side series resonant capacitor C2B. Thus, a first secondary-side series resonant circuit is formed of the leakage inductance component of the secondary winding portion N2A and the capacitance of the secondary-side series resonant capacitor C2A, while a second secondary-side series resonant circuit is formed of the leakage inductance component of the secondary winding portion N2B and the capacitance of the secondary-side series resonant capacitor C2B.

The one end of the secondary winding N2 in the secondary winding portion N2A is coupled via the secondary-side series resonant capacitor C2A to the connecting node between the anode of the rectifier diode Do1 and the cathode of the rectifier diode Do2. The other end of the secondary winding N2 in the secondary winding portion N2B is coupled via the secondary-side series resonant capacitor C2B to the connecting node between the anode of the rectifier diode Do3 and the cathode of the rectifier diode Do4.

The cathodes of the rectifier diodes Do1 and Do3 are coupled to the positive electrode of the smoothing capacitor Co. The negative electrode of the smoothing capacitor Co is connected to the secondary-side ground. The connecting node between the anodes of the rectifier diodes Do2 and Do4 is also connected to the secondary-side ground.

This connecting structure forms first and second voltage-doubler half-wave rectifier circuits. The first rectifier circuit is formed of the secondary winding portion N2A, the secondary-side series resonant capacitor C2A, the rectifier diodes Do1 and Do2, and the smoothing capacitor Co, and includes the first secondary-side series resonant circuit. The second rectifier circuit is formed of the secondary winding portion N2B, the secondary-side series resonant capacitor C2B, the rectifier diodes Do3 and Do4, and the smoothing capacitor Co, and includes the second secondary-side series resonant circuit.

In the first voltage-doubler half-wave rectifier circuit, in the periods of half cycles of one polarity of the alternating voltage induced in the secondary winding N2, rectifying operation is implemented in which the rectified current flows through the secondary winding portion N2A, the rectifier diode Do2, the secondary-side series resonant capacitor C2A, and the secondary winding portion N2A in that order. Thus, the secondary-side series resonant capacitor C2A is charged by the potential of the alternating voltage (V2) of the secondary winding portion N2A. In the periods of half cycles of the other polarity, rectifying operation is implemented in which the rectified current flows through the secondary winding portion N2A, the secondary-side series resonant capacitor C2A, the rectifier diode Do1, the smoothing capacitor Co, and the secondary winding portion N2A in that order. Thus, the smoothing capacitor Co is charged by the potential resulting from superposition of the voltage across the secondary-side series resonant capacitor C2A and the alternating voltage of the secondary winding portion N2A.

As for the second voltage-doubler half-wave rectifier circuit, in the periods of half cycles of the other polarity of the alternating voltage induced in the secondary winding N2, rectifying operation is implemented in which the rectified current flows through the secondary winding portion N2B, the rectifier diode Do4, the secondary-side series resonant capacitor C2B, and the secondary winding portion N2B in that order. Thus, the secondary-side series resonant capacitor C2B is charged by the potential of the alternating voltage (equivalent to the voltage V2) of the secondary winding portion N2B. In the periods of half cycles of the one polarity, rectifying operation is implemented in which the rectified current flows through the secondary winding portion N2B, the secondary-side series resonant capacitor C2B, the rectifier diode Do3, the smoothing capacitor Co, and the secondary winding portion N2B in that order. Thus, the smoothing capacitor Co is charged by the potential resulting from superposition of the voltage across the secondary-side series resonant capacitor C2B and the alternating voltage of the secondary winding portion N2B.

According to the above-described rectifying operation, in the periods of half cycles of the one polarity of the alternating voltage of the secondary winding N2, the charging of the smoothing capacitor Co with the rectified current is carried out by the potential resulting from superposition of the voltage induced in the secondary winding portion N2B and the voltage across the secondary-side series resonant capacitor C2B. In addition, in the periods of half cycles of the other polarity, the charging of the smoothing capacitor Co with the rectified current is carried out by the potential resulting from superposition of the voltage induced in the secondary winding portion N2A and the voltage across the secondary-side series resonant capacitor C2A. Thus, the secondary-side DC output voltage Eo, which is the voltage across the smoothing capacitor Co, has the level equal to twice the level of the voltage (v2) induced in the secondary winding portions N2A and N2B. That is, operation of a voltage-doubler full-wave rectifier circuit is achieved.

The circuit shown in FIG. 13B is the second modification corresponding to the third embodiment, and has a configuration obtained by adding a secondary-side partial voltage resonant capacitor Cp2 to the secondary-side configuration of FIG. 13A. The secondary-side partial voltage resonant capacitor Cp2 in this circuit is connected in parallel to a secondary winding N2 via secondary-side series resonant capacitors C2A and C2B. Specifically, one electrode of the secondary-side partial voltage resonant capacitor Cp2 is coupled via the secondary-side series resonant capacitor C2A to the winding-finish end of the secondary winding N2. The other electrode thereof is coupled via the secondary-side series resonant capacitor C2B to the winding-start end of the secondary winding N2.

Due to this connecting structure, the leakage inductance of the secondary side of an isolation converter transformer PIT and the capacitance of the secondary-side partial voltage resonant capacitor Cp2 form a secondary-side partial voltage resonant circuit. In addition, in this circuit configuration, the secondary-side partial voltage resonant circuit implements resonant operation in common to the first voltage-doubler half-wave rectifier circuit and the second voltage-doubler half-wave rectifier circuit. Therefore, also in this circuit, at the turn-on/turn-off timings of the respective rectifier diodes Do1, Do2, Do3 and Do4, a current that is originally directed to these rectifier diodes flows to the secondary-side partial voltage resonant capacitor Cp2 due to the resonant operation of the secondary-side partial voltage resonant circuit. Thus, switching loss at the rectifier diodes is reduced.

FIG. 14A shows the configuration as the third modification corresponding to the second or fourth embodiment. This circuit includes a voltage-doubler rectifier circuit as its secondary-side rectifier circuit. This voltage-doubler rectifier circuit is formed by coupling two rectifier diodes Do1 and Do2 and two smoothing capacitors Co1 and Co2 to the series circuit of a secondary winding N2 and a secondary-side series resonant capacitor C2 as shown in the drawing.

The winding-finish end of the secondary winding N2 is coupled to the anode of the rectifier diode Do1 and the cathode of the rectifier diode Do2. The cathode of the rectifier diode Do1 is connected to the positive electrode of the smoothing capacitor Co1.

The smoothing capacitors Co1 and Co2 are connected in series to each other such that the negative electrode of the smoothing capacitor Co1 is connected to the positive electrode of the smoothing capacitor Co2. The winding-start end of the secondary winding N2 is coupled to the connecting node between the smoothing capacitors Co1 and Co2.

The negative electrode of the smoothing capacitor Co2 and the anode of the rectifier diode Do2 are connected to the secondary-side ground.

In the thus formed voltage-doubler rectifier circuit on the secondary side, in the periods of half cycles of one polarity of the voltage induced in the secondary winding N2, the rectified current flows through the secondary winding N2, the rectifier diode Do1, and the smoothing capacitor Co1 in that order, to thereby charge the smoothing capacitor Co1. In the periods of half cycles of the other polarity of the voltage induced in the secondary winding N2, the rectified current flows through the secondary winding N2, the rectifier diode Do2, and the smoothing capacitor Co2 in that order, to thereby charge the smoothing capacitor Co2. In this manner, the charging of the smoothing capacitor Co1 and the charging of the smoothing capacitor Co2 are alternately carried out in the respective periods of positive and negative half cycles of the voltage induced in the secondary winding N2. Thus, the voltage with the level equal to that of the voltage induced in the secondary winding N2 is obtained across each of the smoothing capacitors Co1 and Co2. Accordingly, as the voltage across the series circuit of the smoothing capacitors Co1 and Co2, a secondary-side DC output voltage Eo having the level equal to twice the level of the voltage induced in the secondary winding N2 is obtained.

When achievement of the secondary-side DC output voltage Eo having the same level as that in the power supply circuit in FIG. 1 is intended, the number of turns of the secondary winding N2 can be reduced to half that in FIG. 1. Thus, the winding process for the secondary winding N2 can be simplified.

The circuit shown in FIG. 14B is the third modification corresponding to the third embodiment, and has a configuration obtained by adding a secondary-side partial voltage resonant capacitor Cp2 to the secondary-side configuration of FIG. 14A. The secondary-side partial voltage resonant capacitor Cp2 is connected in parallel to the series circuit of a secondary winding N2 and a secondary-side series resonant capacitor C2. Thus, the leakage inductance of the secondary side of an isolation converter transformer PIT and the capacitance of the secondary-side partial voltage resonant capacitor Cp2 form a secondary-side partial voltage resonant circuit. Due to the partial resonant operation of this secondary-side partial voltage resonant circuit, a current flows to the secondary-side partial voltage resonant capacitor Cp2 at the turn-on/turn-off timings of the rectifier diodes Do1 and Do2, and thus switching loss at these rectifier diodes is reduced.

It should be noted that the present invention is not limited to the above-described configurations as the embodiments. For example, other configurations are also available as the circuit configuration of details of the primary-side class-E switching converter, and the configuration of the secondary-side rectifier circuit.

In addition, as the main switching element and the auxiliary switching element, e.g. an insulated gate bipolar transistor (IGBT) or a bipolar transistor may be used instead of a MOS-FET. Moreover, although the above-described embodiments employ a separately-excited switching converter, the present invention can also be applied to a configuration employing a self-excited switching converter.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit comprising:
   a main switching element that is supplied with a direct-current (DC) voltage and implements switching; a switching drive unit that switch-drives the main switching element;
   a first inductor that is provided in series to a path through-which the DC voltage is supplied to the main switching element;
   a primary-side parallel resonant capacitor that is connected in parallel to the main switching element so that at least an inductance of the first inductor and a capacitance of the primary-side parallel resonant capacitor form a primary-side parallel resonant circuit having a certain first resonant frequency;
   a second inductor;
   a primary-side series resonant capacitor that is connected in series to the second inductor so that at least an inductance of the second inductor and a capacitance of the primary-side series resonant capacitor form a primary-side series resonant circuit having a certain second resonant frequency regarded as equivalent to the first resonant frequency, and a series circuit of the second inductor and the primary-side series resonant capacitor is connected in parallel to the main switching element;

a converter transformer around which the second inductor as a primary winding and a secondary winding are wound, an output switching obtained in the primary winding inducing an alternating voltage in the secondary winding, a coupling coefficient of the converter transformer being set so that such a requisite total coupling coefficient between a primary side and a secondary side as to offer loose coupling therebetween is obtained;

a secondary-side DC output voltage generating unit that is supplied with the alternating voltage induced in the secondary winding of the converter transformer, and implements rectifying operation to thereby generate a secondary-side DC output voltage; and a constant-voltage control unit that implements constant-voltage control of the secondary-side DC output voltage by controlling the switching drive unit according to a level of the secondary-side DC output voltage and thereby varying a switching frequency of the main switching element.

2. The switching power supply circuit according to claim 1, further comprising a secondary-side series resonant circuit that arises from connecting of a secondary-side series resonant capacitor in series to the secondary winding of the converter transformer, and is formed of at least a leakage inductance component including the secondary winding and a capacitance of the secondary-side series resonant capacitor.

3. A switching power supply circuit comprising:

a rectifying and smoothing circuit that includes at least a rectifier element and a smoothing capacitor, the rectifying and smoothing circuit being supplied with an alternating-current (AC) voltage and implementing rectifying and smoothing operation for the AC voltage, to thereby generate a rectified and smoothed voltage as a voltage across the smoothing capacitor;

a main switching element that is-supplied with the rectified and smoothed voltage as a direct-current (DC) voltage and implements switching;

a switching drive unit that switch-drives the main switching element;

a first inductor that is provided in series to a path through which the rectified and smoothed voltage is supplied to the main switching element;

a primary-side parallel resonant capacitor that is connected in parallel to the main switching element so that at least an inductance of the first inductor and a capacitance of the primary-side parallel resonant capacitor form a primary-side parallel resonant circuit having a certain first resonant frequency;

a second inductor;

a primary-side series resonant capacitor that is connected in series to the second inductor so that at least an inductance of the second inductor and a capacitance of the primary-side series resonant capacitor form a primary-side series resonant circuit having a certain second resonant frequency regarded as equivalent to the first resonant frequency, and a series circuit of the second inductor and the primary-side series resonant capacitor is connected in parallel to the main switching element;

a converter transformer around which the second inductor as a primary winding and a secondary winding are wound, an output switching obtained in the primary winding inducing an alternating voltage in the secondary winding, a coupling coefficient of the converter transformer being set so that such a requisite total coupling coefficient between a primary side and a secondary side as to offer loose coupling therebetween is obtained;

a secondary-side DC output voltage generating unit that is supplied with the alternating voltage induced in the secondary winding of the converter transformer, and implements rectifying operation to thereby generate a secondary-side DC output voltage; and a constant-voltage control unit that implements constant-voltage control of the secondary-side DC output voltage by controlling the switching drive unit according to a level of the secondary-side DC output voltage and thereby varying a switching frequency of the main switching element.

4. The switching power supply circuit according to claim 3, further comprising a secondary-side series resonant circuit that arises from connecting of a secondary-side series resonant capacitor in series to the secondary winding of the converter transformer, and is formed of at least a leakage inductance component including the secondary winding and a capacitance of the secondary-side series resonant capacitor.

5. The switching power supply circuit according to claim 3, further comprising an active clamp circuit that includes an auxiliary switching element and defines an ON period within a period during which the main switching element is in an off-state, the auxiliary switching element being in an on-state in the ON period, the active clamp circuit causing charging and discharging currents to flow through the auxiliary switching element during the ON period, the charging and discharging currents originally flowing to and from the primary-side parallel resonant capacitor in the absence of the active clamp circuit.

* * * * *